Dec. 9, 1952 H. W. BALZER 2,621,258

TOLL SWITCHING TELEPHONE SYSTEM

Filed Aug. 25, 1950 12 Sheets-Sheet 1

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 2

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 3

INVENTOR.
Harvey W. Balzer
BY Smith, Olsen & Bird
Attys.

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 5

INVENTOR.
Harvey W. Balzer
BY Smith, Olsen & Baird
Attys.

INVENTOR.
Harvey W. Balzer
BY Smith, Olsen & Baird.
Attys.

INVENTOR.
Harvey W. Balzer
BY Smith, Olsen & Baird.
Attys.

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 9

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 10

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 11

INVENTOR.
Harvey W. Balzer
BY Smith, Olsen & Baird
Attys.

Dec. 9, 1952 H. W. BALZER 2,621,258

TOLL SWITCHING TELEPHONE SYSTEM

Filed Aug. 25, 1950 12 Sheets-Sheet 12

INVENTOR.
Harvey W. Balzer
BY Smith, Olsen & Baird
Attys.

Patented Dec. 9, 1952 2,621,258

UNITED STATES PATENT OFFICE 2,621,258

TOLL SWITCHING TELEPHONE SYSTEM

Harvey W. Balzer, Downers Grove, Ill., assignor to Automatic Electric Laboratories, Inc., Chicago, Ill., a corporation of Delaware Application August 25, 1950, Serial No. 181,509

36 Claims. (Cl. 179—27)

The present invention relates to multi-office toll switching telephone systems in general and more particularly to improved trunking arrangements and apparatus for interconnecting the various exchanges in such systems.

The invention is particularly applicable to a toll network including at least two widely separated automatic telephone exchanges having toll switchboards of the type disclosed in the copending Balzer application, Serial No. 181,508, filed August 25, 1950. Each of the above exchanges may be geographically located in the toll switching system so that they respectively serve as central toll switching points for the nearby telephone exchanges and so that they also serve as tandem switching points for through toll connections.

In handling toll calls received at the toll switching centers the switching apparatus thereat may be controlled over incoming toll lines to route such calls directly to the local exchange subscribers, or directly to other nearby exchanges, or to an idle operator position at the dial toll switchboard in the associated switching center. In the latter event, the answering operator will control the switching apparatus of the network to complete the connections received thereat to the desired called destination. The dial toll switchboards at the respective toll switching centers each include several operator positions which may be divided into one or more groups to handle different classes of toll calls. Consequently, certain of the positions may be selectively conditioned to handle inward and ring-down toll calls, certain other positions may be selectively conditioned to handle CLR toll calls and the remaining positions may be selectively conditioned to handle TX toll calls. As an alternative arrangement, each of the positions of the switchboard may be selectively conditioned to handle all three classes of toll calls so that each position functions as a universal position to handle inward, CLR and TX toll calls.

In toll switching system of the type briefly described above, it has been necessary heretofore to staff the switchboards provided in the two remotely located toll switching centers with one or more operators twenty-four hours a day. However, during the light traffic periods, all of the toll calls, as well as special service calls, may easily be handled by an operator at the toll switchboard in only one of the toll centers.

Accordingly, one of the main objects of the present invention is to provide in a toll switching system of the character described, improved trunking facilities whereby the two-way toll lines interconnecting the two toll switching centers may be used for normal two-way toll traffic between the two switching centers during heavy traffic periods and whereby the same two-way toll lines may be utilized to automatically route all toll calls and special service calls intended for the toll switchboard and special service position at one of the toll switching centers to the toll switchboard at the other switching center during light traffic periods. With this arrangement, it is not necessary to staff any of the positions of the toll switchboard at one of the toll centers during light traffic periods.

It is another object of the invention to provide in a toll switching system of the character described improved trunk circuits terminating the toll lines interconnecting the toll switching centers which are arranged to discriminate between the regular toll calls directly routed thereover during the heavy traffic periods and the different classes of toll calls, intended for an unstaffed toll switchboard at one of the toll centers, automatically transferred thereover to the staffed other toll switchboard at the toll center during light traffic periods.

It is still another object of the invention to provide in a toll switching system of the character described improved trunk circuits terminating the toll lines interconnecting the toll centers which are arranged to transmit different identifying signals indicative of the different classes of toll calls automatically transferred thereover when one of the toll center switchboards is unstaffed.

It is a still further object of the invention to provide in a toll switching system of the character described improved trunk circuits terminating the toll lines interconnecting the toll centers which are arranged for dial-back operation so the toll calls automatically transferred thereover to an operator at the staffed toll switchboard in one of the toll switching centers may be completed therefrom to the called destination by controlling the switching apparatus in the other toll switching center over the same trunk circuits and toll line utilized in automatically transferring the connection to the staffed position.

It is a further object of the invention to provide in a toll switching system of the character described, an improved transfer allotter for automatically routing the different classes of toll calls, intended for an unstaffed position of the toll switchboard at one toll center to an attended position of the toll center in a predetermined preferential order.

It is still another object of the invention to provide in a toll switching system of the character described an improved concentration switching unit for automatically routing both local and toll special service calls intended for the unstaffed special service position at one of the toll centers over an idle one of a plurality of two-way toll lines to a staffed position of the toll switchboard at the other toll center.

*Description of the drawings*

The invention, both as to its organization and method of operation, together with further objects and advantages thereof, will best be understood by reference to the following specification taken in connection with the accompanying drawings, in which Figs. 1 to 12, inclusive, when assembled in the manner illustrated in Fig. 13, illustrate the details of a toll switching telephone system having incorporated therein the features of the invention briefly outlined above.

Referring now to the drawings, it will be seen that the toll switching system illustrated therein comprises a central office 100, a distant manual office 200, a distant automatic exchange 203 and a distant toll center 206. All of the above noted exchanges are interconnected by means of the usual toll lines and are arranged so that connections may be established between the various exchanges either directly or through one or more tandem exchanges. The automatic switching apparatus in the central office 100, which is schematically illustrated in Figs. 1 and 2, is utilized in extending toll connections from the other exchanges in the system to the automatic dial toll board in the central office 100 and to the subscribers thereat. Also, the switching apparatus in the central office 100 is utilized in extending connections from the dial toll board thereat to the other exchanges in the system and in automatically transferring connections intended for the toll board thereat to the toll board at the distant automatic exchange 203, as will be described hereinafter. The distant manual office 200 serves a plurality of manual subscriber substations and is connected to the central office 100 by means of a plurality of two-way toll lines, such as the toll line 211. Thus the distant manual office 200 and the central office 100 are interconnected over two-way toll lines for handling toll traffic between the two offices. The distant automatic exchange 203 serves a plurality of local subscriber substations and is connected to the central office 100 by means of two-way toll lines, such as the toll line 212. Each toll line terminates in the respective exchanges in two-way trunks, such as the trunks 210 and 204. The distant automatic exchange 203 is also provided with an automatic dial toll board which is substantially the same as the toll board provided in the central office 100. At this point, it may be well to mention that the toll line 212 is accessible in either of the two exchanges by the operators at the respective dial toll boards and by the local subscribers in the respective exchanges. The distant toll center 206 serves a plurality of automatic subscriber substations and is connected to the central office 100 by means of a plurality of toll lines, such as the toll line 213, which are utilized for handling two-way toll traffic between the two exchanges. In addition to the foregoing, the distant toll center 206 is provided with a toll board 207 which may be of the type normally employed in telephone exchanges of the Bell system. From the foregoing, it will be understood that the exchanges 200, 203 and 206 are respectively connected by means of toll lines to the central office 100 and that toll connections may be established between any two of the above noted exchanges by means of the switching apparatus provided in the system and, if necessary, with the assistance of the toll operators at the toll boards in the exchanges.

Figures 1, 13:
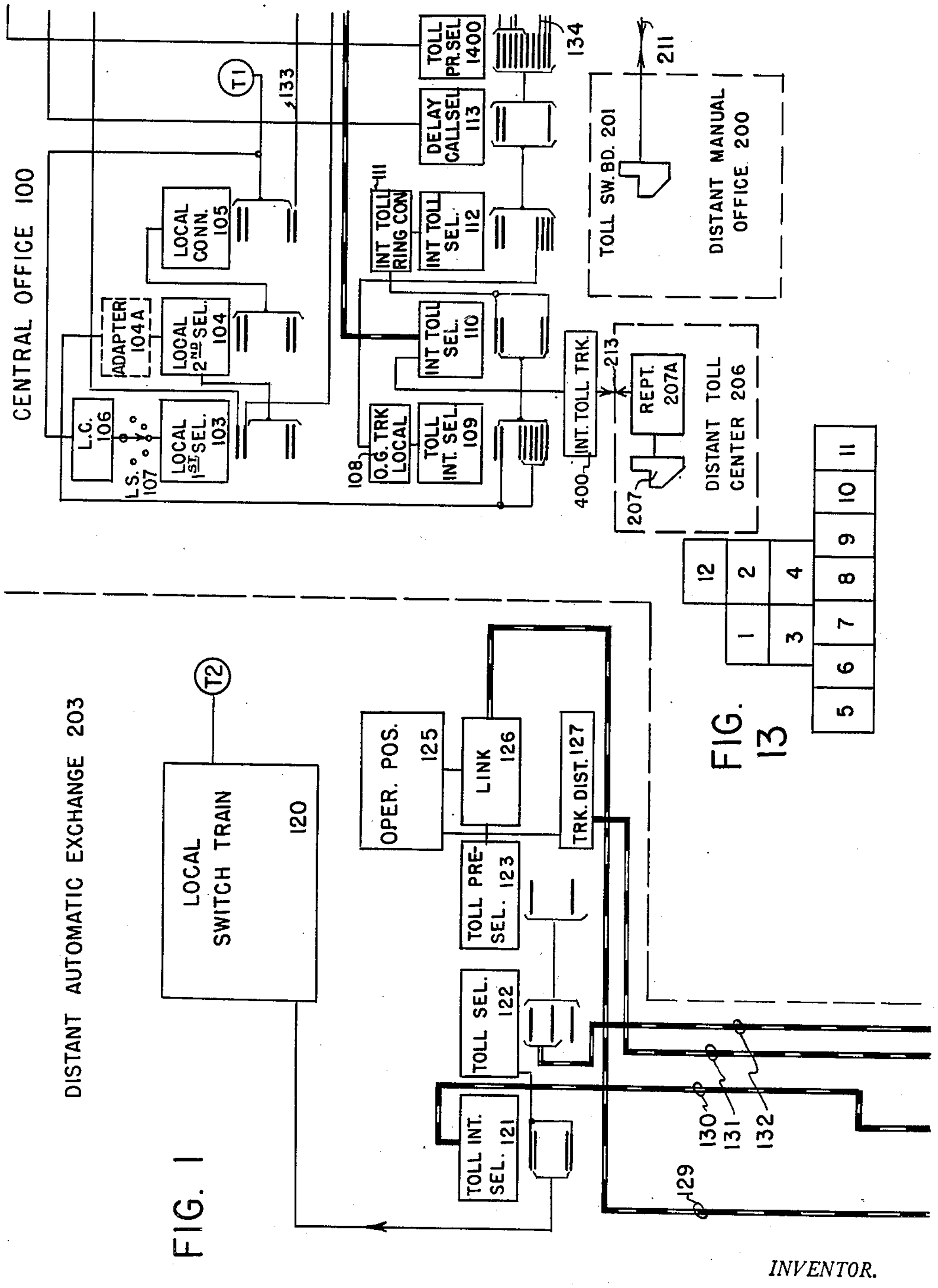

The various links at the operator position 2200 are directly connected to toll preselectors, such as the toll preselector 1400, to enable the operator thereat to extend calls received at her position to any of the other exchanges in the toll switching system and also to the local subscribers in the central office 100. For this purpose each operator position is provided with the usual impulse sender for controlling the operation of the automatic switching apparatus provided in the toll switching network. The switching apparatus included in the distant automatic exchange 203 comprises a local switch train 120 of the Strowger type which is utilized by the local subscribers to complete local connections and which is also utilized to complete toll connections. The toll switch train in the automatic exchange 203 includes the toll selectors 121 and 122 and the toll preselector 123. These selectors are employed in either extending toll connections from the automatic exchange 203 to the central office 100 or in completing toll connections, received from the central office 100 to the local subscribers or to the dial toll board thereat. Finally, the distant automatic exchange 203 includes a dial toll board having a plurality of operator positions, such as the position 125, a plurality of link circuits, such as the link 126, and a plurality of trunk distributors, such as the trunk distributor 127. This dial toll board is substantially the same as the dial toll board provided in the central office 100 and described in detail in the previously mentioned Balzer application.

Figure 3:
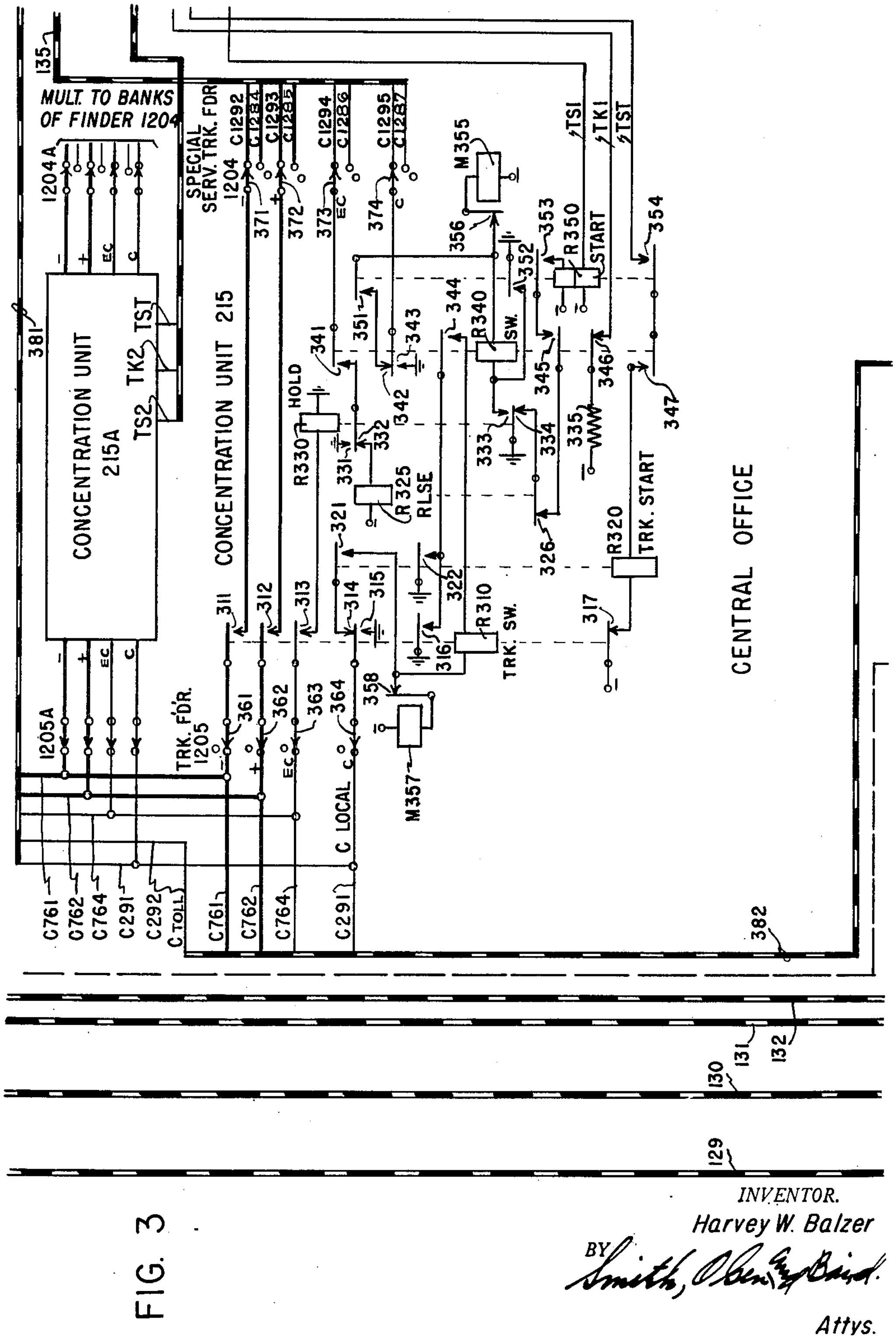

Fig. 3 of the drawings discloses the details of a concentration unit 205 which is utilized in transferring both local and toll information calls, intended for the information operator at the central office 100 to the operator at the dial toll board in the distant automatic exchange 203. The concentration unit 215 is provided with a special service trunk finder 1204 of the rotary type which is adapted to search for a calling information circuit, such as 115 and 116. Also, the concentration unit 205 is provided with a trunk finder 1205 which is utilized to search for an idle two-way trunk extending to the exchange 203 for the purpose of automatically transferring either a local or a toll information call, intended for the information operator position 114 in the central office 100 to the toll operator at the automatic exchange 203 whenever the information operator position 114 is unstaffed.

Figure 4:
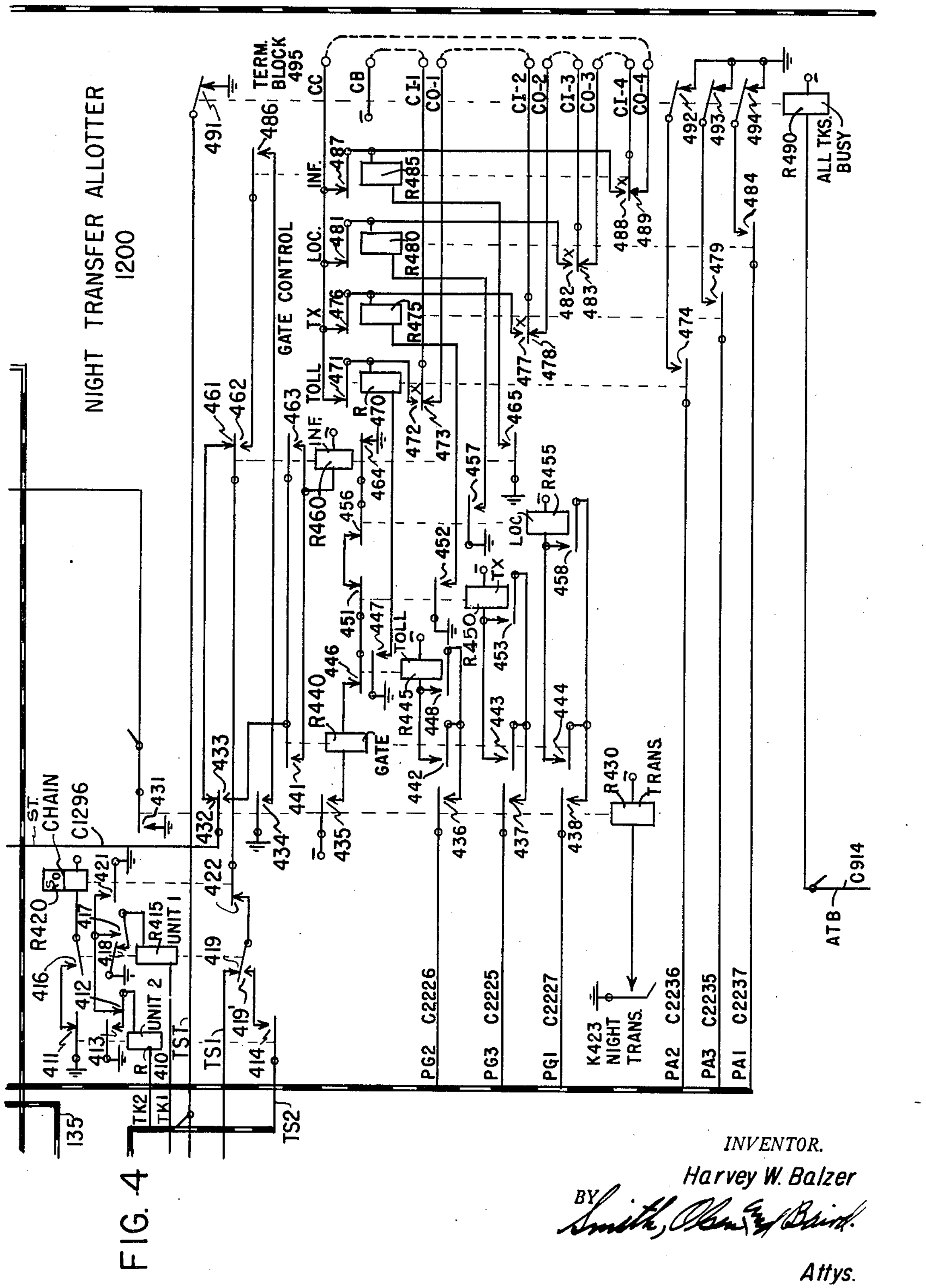

Fig. 4 discloses the night transfer allotter 1200 which is utilized to automatically transfer CLR calls, inward and ringdown toll calls and TX calls, intended for an operator position at the dial toll board in the central office 100, to a toll operator at the dial toll board in the automatic exchange 203. The allotter 1200 is rendered effective to perform the above mentioned automatic transfer operation only when the dial toll board at the central office 100 is unstaffed, for example, during the light traffic periods. With this arrangement, the various classes of toll calls which are normally extended to the dial toll board in the central office 100 will be automatically routed over available interconnecting toll lines to the dial toll board in the automatic exchange 203.

Figure 5:
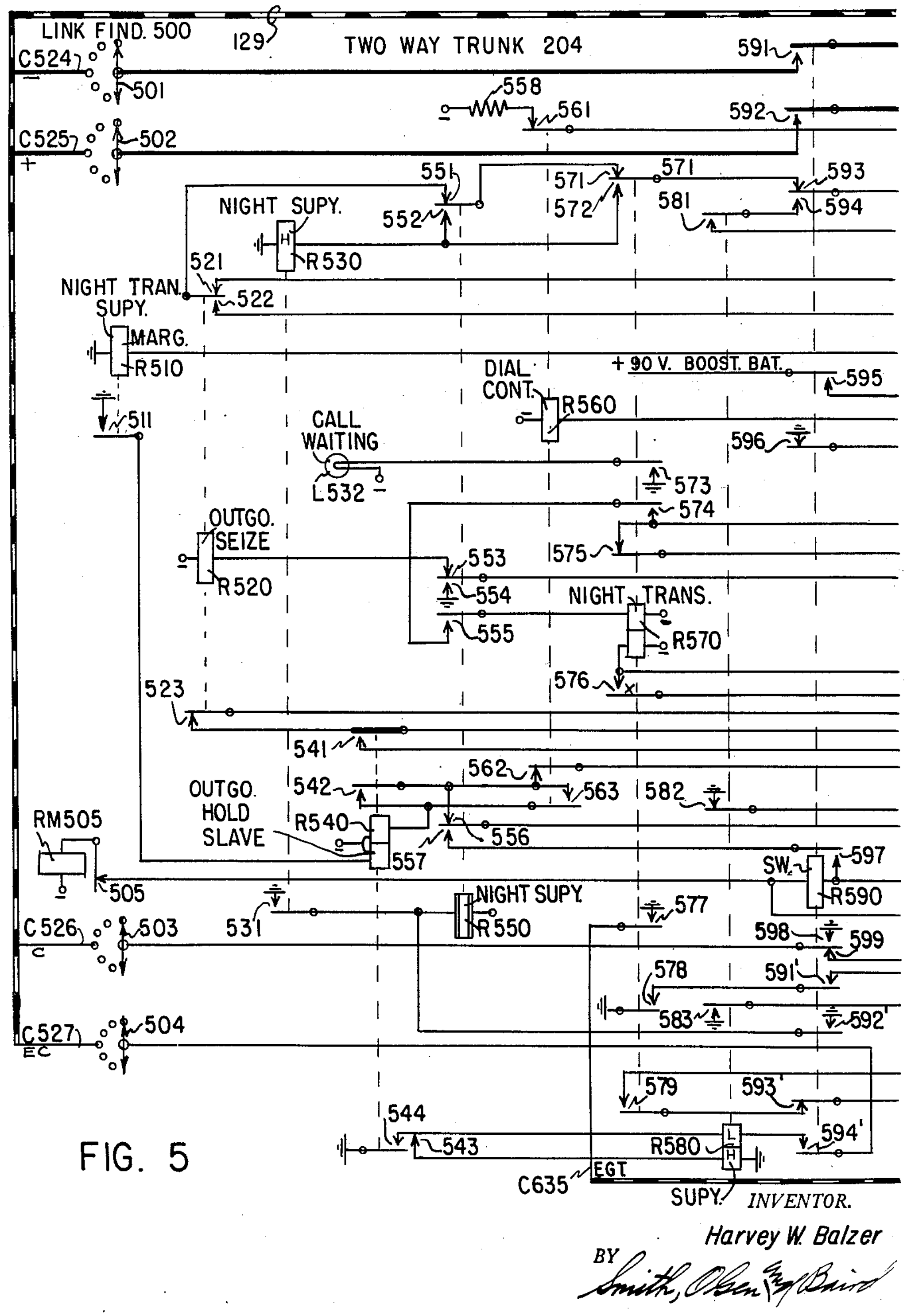
Figure 6:
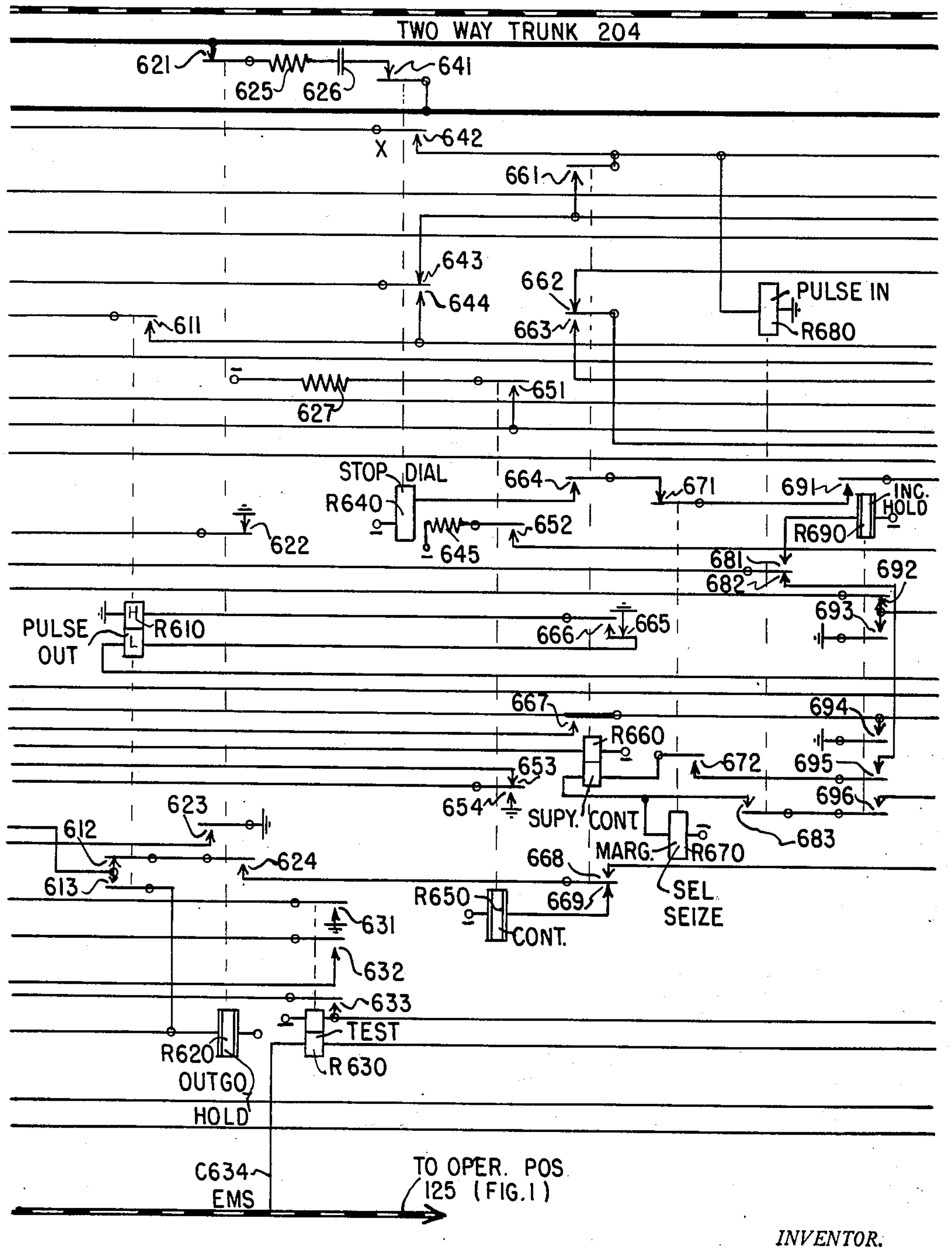
Figure 7:
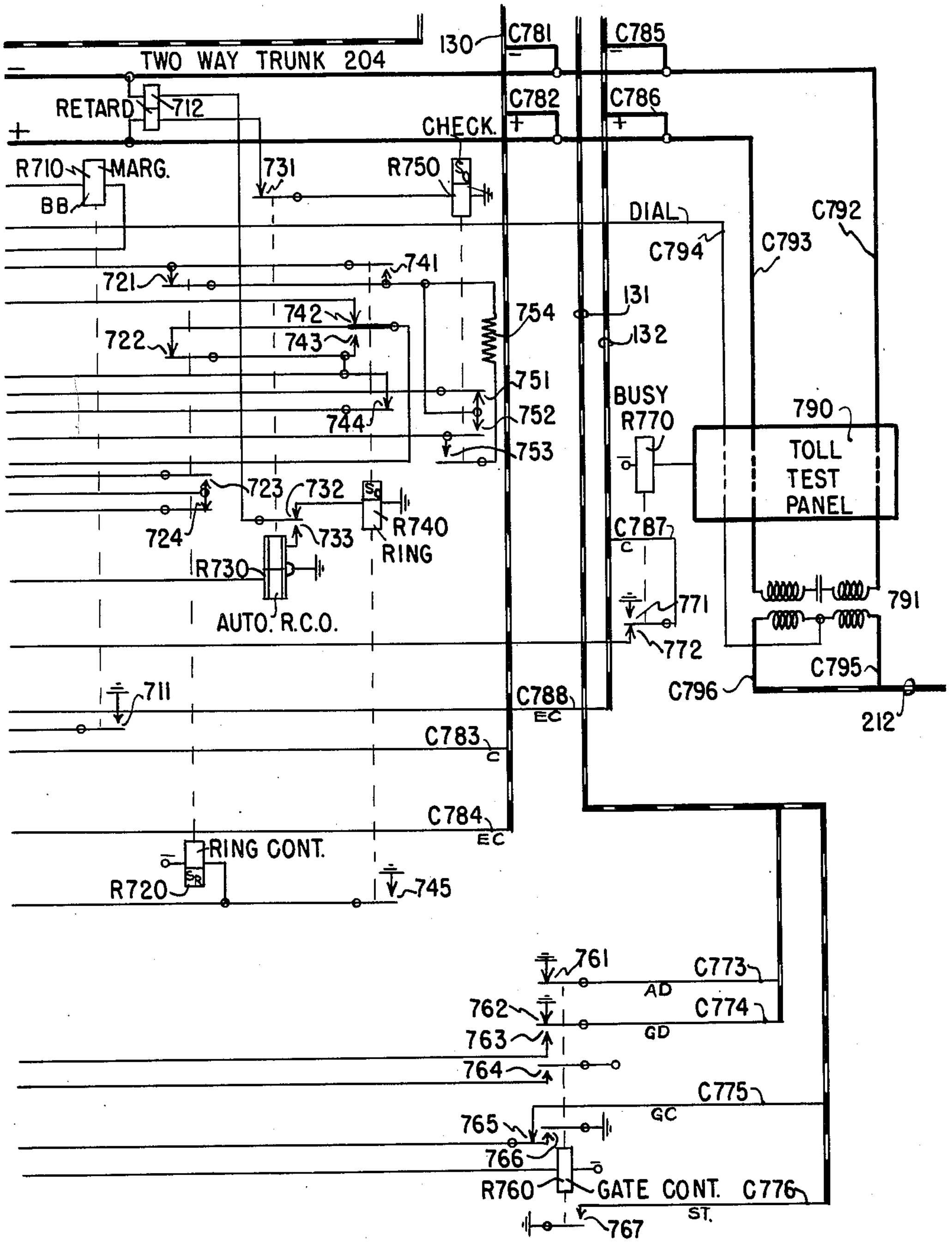
Figure 8:
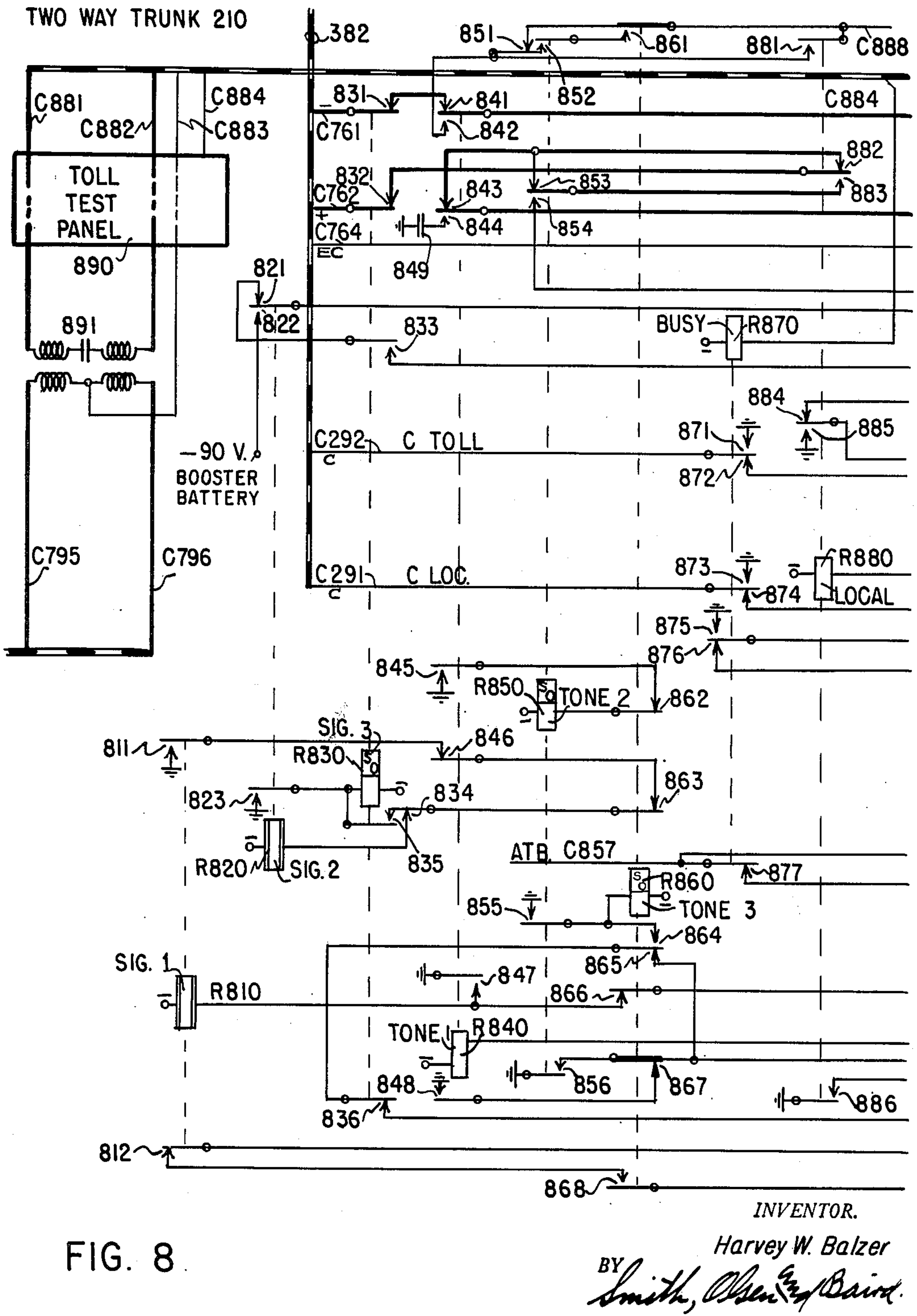
Figure 9:
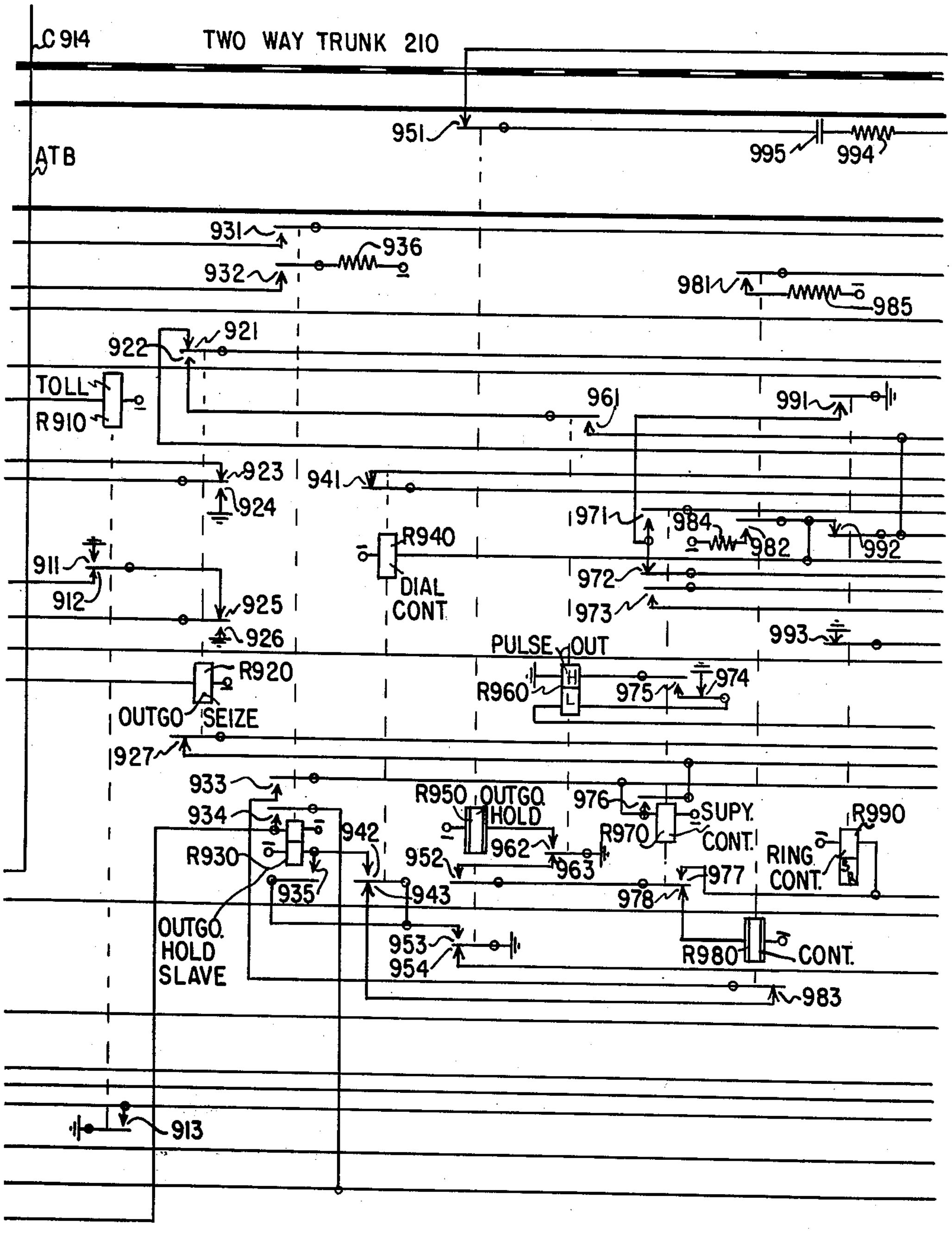
Figure 10:
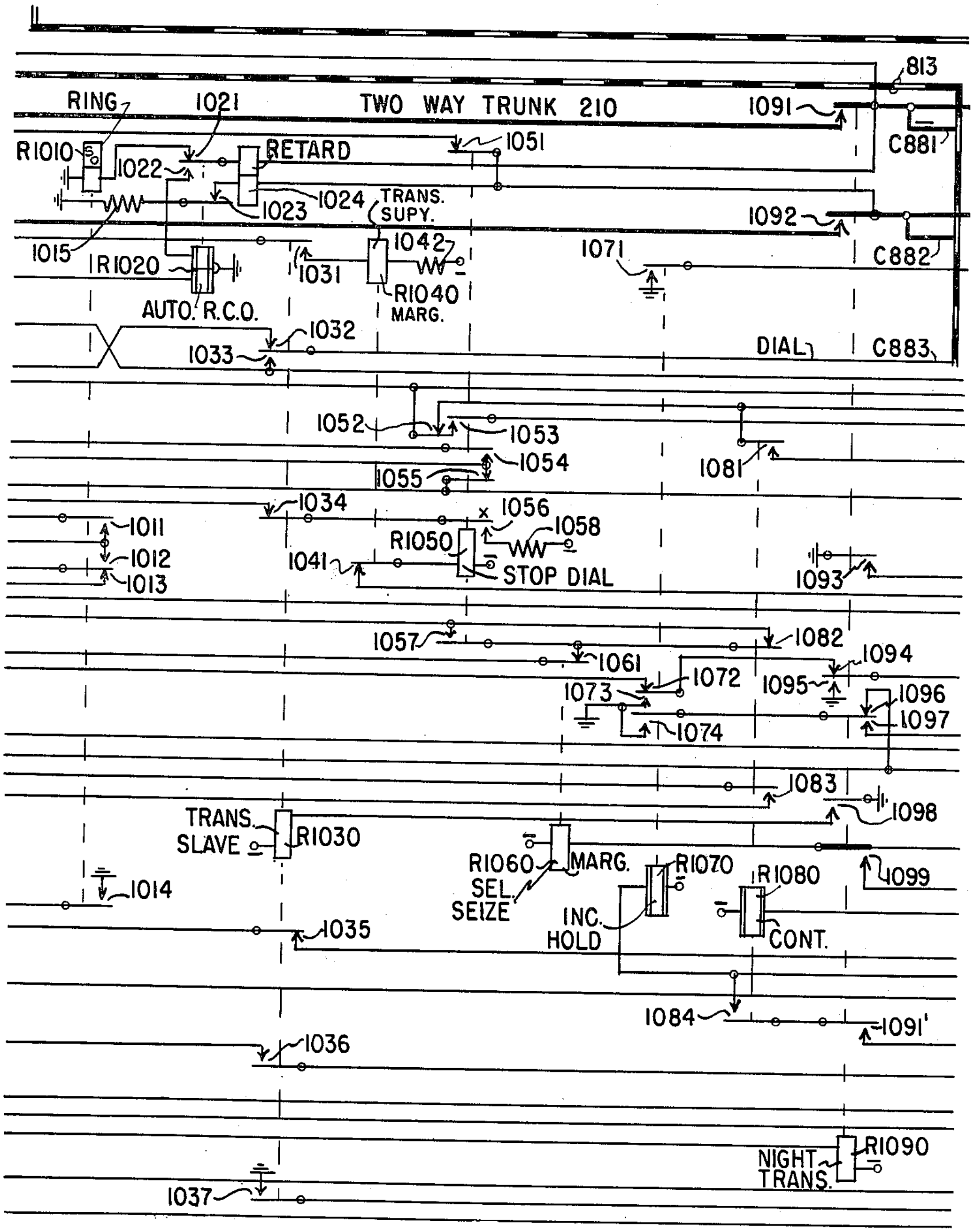
Figure 11:
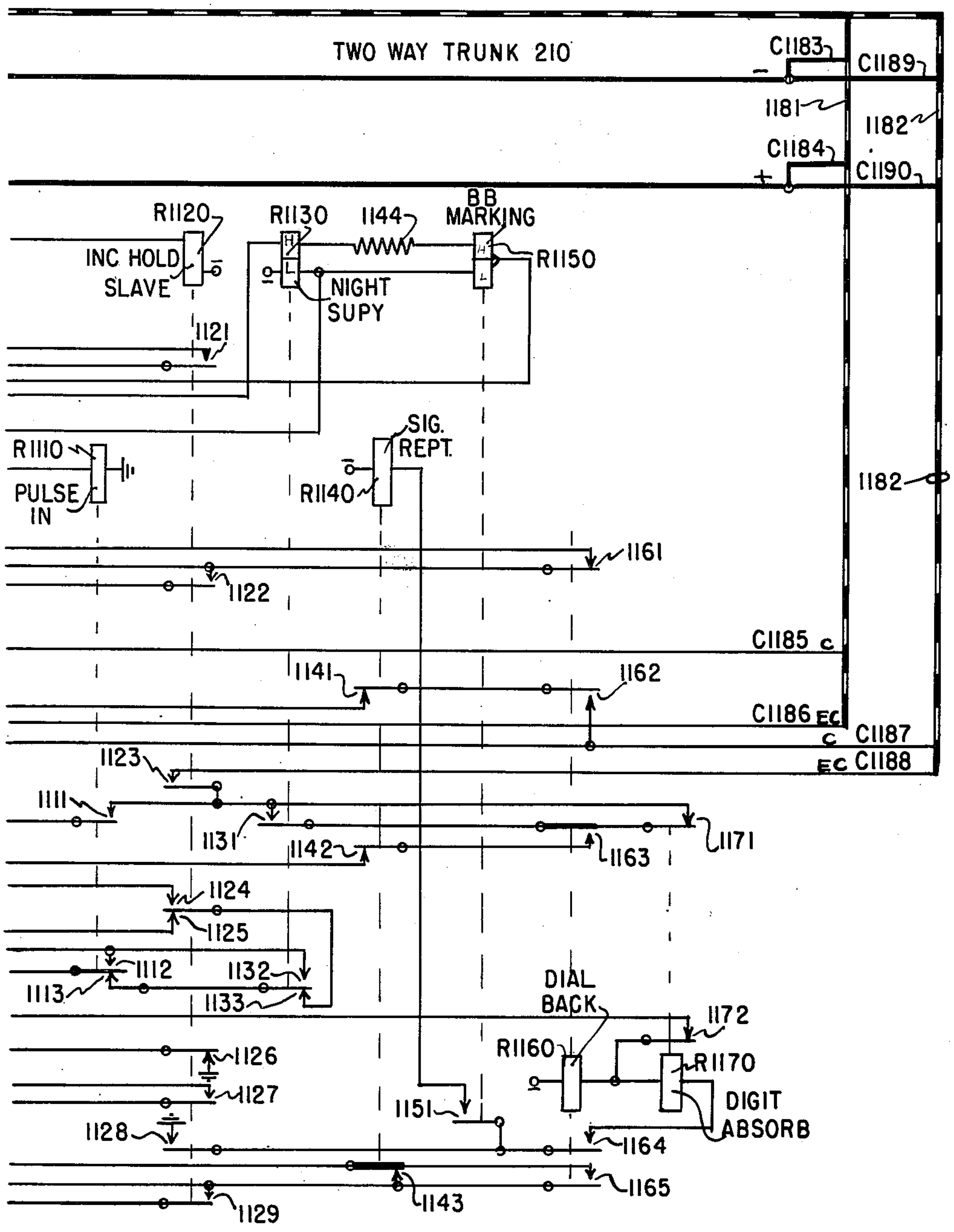

Figs. 5, 6, and 7, disclose the details of a two-way trunk circuit 204 provided in the distant automatic exchange 203 which terminates the toll line 212 extending to the central office 100. This trunk circuit is provided with a rotary type link finder 500 which is utilized to automatically extend night transfer calls received over the toll line 212 to an idle link, such as the link 126, at the operator position 125 of the dial toll board. The trunk 204 is also connected via the cable 130 to the inter-toll selector 121 so that the operator at the dial toll board in the central office 100 may control the switching apparatus in the distant automatic exchange 203 to extend toll connections to the local subscribers thereat and, under certain conditions, to the operator position 125. Finally, the trunk 204 is connected to the banks of the toll selectors 122 and 123 via the cable 132 so that the operator at the operator position 125 may extend connections via the toll preselector 123 to the central office 100.

Figs. 8 to 11, inclusive, disclose the details of the two-way trunk circuit 210 provided in the central office 100 which terminates the toll line 212 extending to the distant automatic exchange 203. The trunk circuit 210 is accessible from the banks of the toll preselector 1400 via the cable 1181 so that the dial toll board operator at position 2200 may extend connections over the toll line 212 to the switching apparatus in the exchange 203 and it is connected via the cable 1182 to the intertoll selector 112 so that the dial toll board operator at the exchange 203 may extend connections over the toll line 212 to the switching apparatus in the central office 100. Finally, the two-way trunk 210 is accessible over the cable 382 to the link finders 700, 701, 301, 900 and 1100 and the trunk finder 1205 for the purpose of automatically transferring calls, intended for the central office toll operator and the central office information operator, over the toll line 212 to the dial toll board operator in the distant automatic exchange 203.

Figure 12:
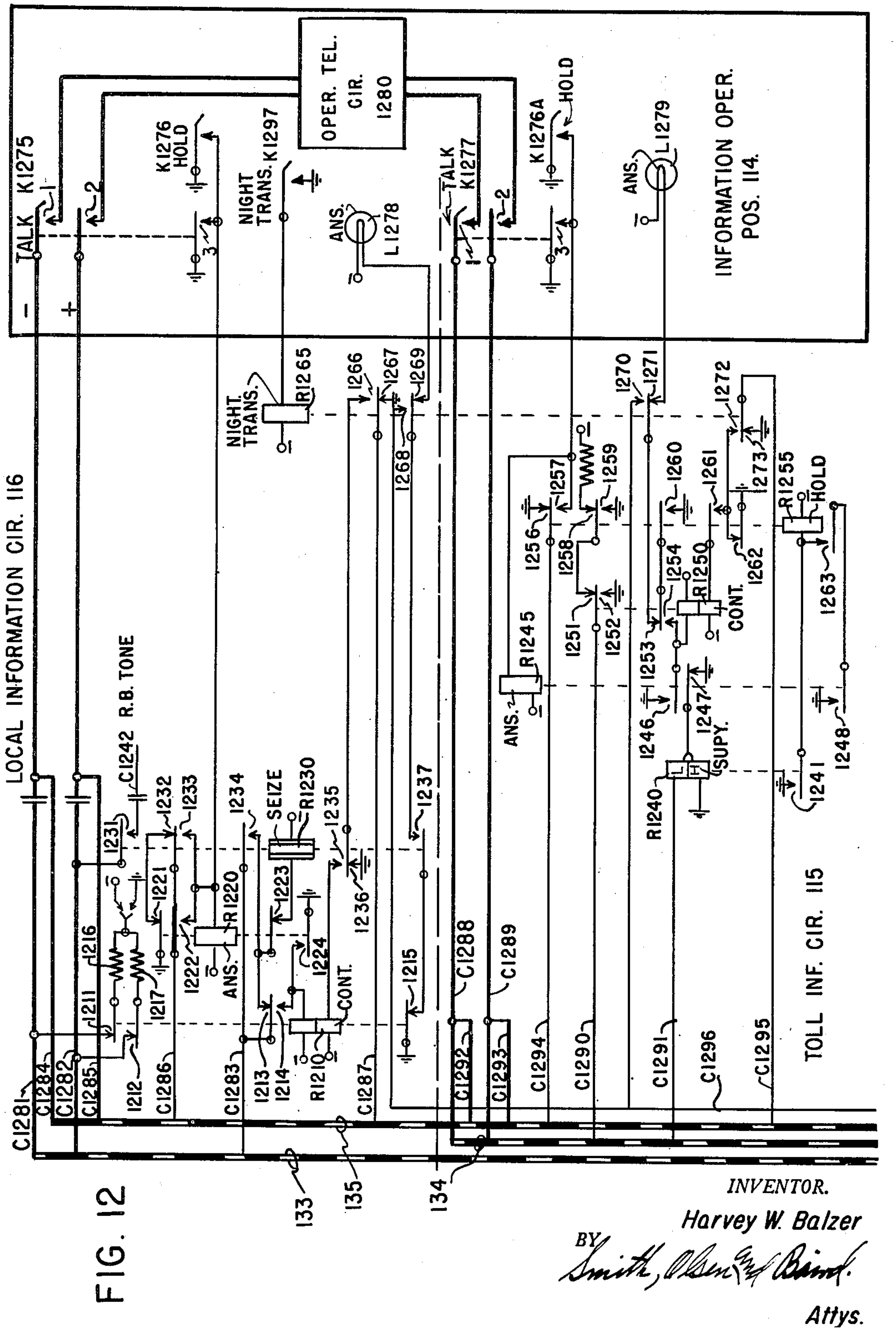

Fig. 12 discloses the details of the toll information circuit 115 and the local information circuit 116 which are utilized respectively to extend information calls to the information operator position 114 provided in the central office 100. During night service the information operator position 114 may be unstaffed as previously noted thereby to control the toll and the local information circuits 115 and 116 so that the information calls normally answered at the position 114 will be automatically transferred via the concentration units 215 or 215A and the two-way toll trunks 210 and 204 to the dial toll board operator in the automatic exchange 203.

A detailed description of the operation of the toll switching telephone system in extending toll calls between the central office 100 in one toll switching center and the distant automatic exchange 203 in another toll switching center will now be given.

*Toll call from the central office operator position 2200 to the distant automatic exchange 203*

Before describing the operations whereby the toll operator at position 2200 controls the switching apparatus to extend a connection to the distant automatic exchange 203, a brief description will be given of the operation of the switching apparatus in the central office 100 whereby calls are extended to the operator position 2200 for completion. For this purpose, it will be assumed that the subscriber at substation T1 desires to extend a connection to the distant automatic exchange 203 and has dialed appropriate digits to control the switching apparatus in the central office 100 to extend a call to the operator position 2200. This connection is extended over a path including the line circuit 106, the line switch 107, the local selector 103, the trunk line 680 and the CLR trunk 600. As soon as the connection is extended to the CLR trunk 600, the CLR trunk distributor 1600A controls the link finder 700 to search for and seize an idle link, such as the link 1300, associated with the operator position 2200. The operator thereat may now answer the call and ascertain the destination thereof from the calling subscriber at substation T1.

Toll calls which originate in a local sub-office in the area served by the central office 100 may be extended to the operator position 2200 by way of the local first selector 103 and the trunk line 680A to the CLR trunk 600A. In response to such a call, the CLR trunk distributor 1600A controls the link finder 701 to search for and find an idle link such as the link 1300, and thus extend the connection to the operator position 2200. The CLR trunk circuits 600 and 600A are substantially identical, but they are separately grouped so that they are utilized respectively to extend local subscriber toll calls and subexchange toll calls to the dial toll board in the central office 100.

By grouping the CLR calls in the manner noted above, the operator at position 2200 receives a signal indicative of the particular calling group of CLR trunks.

A third class of toll call which may be extended to the operator position 2200 includes calls received over either the inward toll trunk 300 or the ring-down toll trunk 800. The inward toll trunks are utilized to extend toll connections from distant automatic exchanges and the ring-down toll trunks are utilized to extend calls from distant manual exchanges. Calls received over these trunks, however, are classified as inward toll calls and the operator at position 2200 handles such calls as inward toll calls whether they are received over the inward trunk or the ring-down trunk. A call originated at the distant toll center 206, either at a subscriber substation or at the toll board 207, may be extended via the repeater 207A, the interconnecting toll line 213 and the intertoll trunk 400, to the intertoll selector 110. Calls received over the above described path may be extended from the intertoll selector 110, to the local subscribers in the central office 100 by way of the local switch train or they may be extended via the intertoll ring control circuit 111, the intertoll selector 112 and the trunk line 390 to the inward toll trunk 300. A call extended via the local switch train to local subscribers in the central office 100 does not require the assistance of the operator at the operator position 2200. However, if a toll call is extended to the inward toll trunk 300, the inward trunk distributor 1600B controls the link finder 301 to search for and find an idle link, such as the link 1300, and thus extends the connection to the operator position 2200. The operator thereat upon ascertaining the destination of the particular toll call may complete the connection in the manner to be described hereinafter.

When the manual operator at the toll switchboard 201 originates a toll call, the ring-down toll trunk 800 is seized over the interconnecting toll line 211. In response to the seizure of the ring-down toll trunk 800, the inward trunk distributor 1600B controls the link finder 900 to search for and find an idle link, such as the link 1300, and thus extends the toll call to the operator position 2200. After ascertaining the destination of the received toll call the toll operator at position 2200 may further extend the connection in the manner to be described hereinafter.

In the above brief description, it was assumed that the toll calls from the distant toll center 206 were extended to the operator position 2200 via the inward toll trunk 300. However, under certain conditions, the operator at the switchboard in the distant toll center 206 may desire to extend the call to the operator position 2200 via the TX trunk 1000 thereby to indicate the fact that the central office toll operator must first locate the desired called subscriber and then recall the operator at the distant toll center 206. TX calls are extended from the distant toll center 206 via the repeater 207A, the interconnecting toll line 213, the intertoll trunk 400, the intertoll selector 110 and the trunk line 1080, to the TX trunk 1000. In response to the extension of the call to the TX trunk 1000, the TX trunk distributor 1600C controls the link finder 1100 to search for and find an idle link, such as the link 1300 and thus extends the connection to the operator position 2200. Upon ascertaining the destination of the call received at her position and the information regarding the number of the calling subscriber the operator at position 2200 will release the connection and then attempt to locate the called subscriber before recalling the calling subscriber.

In view of the foregoing brief description of the manner in which toll calls are extended to the central office toll operator position 2200, it will be understood that all such toll calls must be completed to the desired called destination under control of the operator at position 2200. For a detailed description of the operation of the switching apparatus involved in the above described toll calls, including the details of the link 1300 and the operator position equipment 2200, reference may be had to the previously mentioned Balzer application.

In order to describe the operations of the two-way trunk circuits 204 and 210 interconnecting the toll centers including respectively the distant automatic exchange 203 and the central office 100, it will be assumed that one of the above described toll calls received at the operator position 2200 in the central office 100 is to be extended to the distant automatic exchange 203. Accordingly, the operator at position 2200 actuates the keyset and impulse sender (not shown) associated with her position in accordance with the digits necessary to extend the call to the desired called party. Thereafter, the impulse sender functions, in the manner described in the above mentioned Balzer application, to control the link 1300 included in the connection and the toll preselector 1400. The toll preselector 1400 responds to the impulses of the first digit transmitted by the impulse sender to raise its wipers opposite the level terminating a group of trunks including the trunk line extending to the two-way trunk circuit 210. Thereafter, the toll preselector 1400 will automatically rotate its wipers over the contacts in the banks of the selected level to search for and find a trunk connected to an idle two-way trunk circuit such as the two-way trunk circuit 210.

Referring now to Figs. 8 to 11, inclusive, it will be seen that the two-way trunk circuit 210 is accessible to the toll preselector 1400 via the conductors C1183 to C1186, inclusive, included in the cable 1181. The circuit is marked idle to the toll preselector 1400 by battery potential connected to the C conductor C1185 by way of the winding of the outgoing seizure relay R920. Consequently, when the toll preselector 1400 seizes the two-way trunk 210, it forwards ground potential over the C conductor C1185 in order to operate the relay R920 and it forwards battery potential over the EC conductor C1186 in order to operate the pulse-out relay R960 over a circuit including its low resistance lower winding and ground at contacts 974. In view of the foregoing, it will be understood that the relays R920 and R960 are operated as soon as the toll preselector 1400 seizes the two-way trunk 210. As soon as the relay R920 operates, at its contacts 924 and 926, it applies ground potential to the C-toll conductor C292 and the C-local conductor C291 thereby to mark the two-way trunk 210 busy to night transfer calls.

When the pulse-out relay R960 operates it completes at its contacts 962 an obvious circuit for operating the outgoing hold relay R950 and the latter relay, at its contacts 951, disconnects the line termination network, including the condenser 995 and the resistor 994, from the — and + line conductors C1183 and C1184. As a further result of the operation of relay R960, at its contacts 961, it connects battery potential through the winding of the stop dial control relay R940 to the dial conductor C883 extending to the two-way trunk 204 in the exchange 203. This circuit is involved in various operations between the two-way trunks 204 and 210 and may be traced from battery by way of the winding of relay R940, the contacts 992, 961, 922 and 1032, the dial conductor C883 in the cable 813 extending to Fig. 8, and the midpoint of the lower windings of the repeating coil 891. At this point, the circuit including the dial conductor C883 is extended in parallel over the line conductors C795 and C796 of the toll line 212 to the lower windings of the repeating coil 791 associated with the two-way trunk 204. The circuit is further extended from the mid-point of the lower windings of the repeating coil 791 via the dial conductor C794, the contacts 593, 571, 551, 521 and 643 and the windings of the marginal booster battery relay R710 and the pulse-in relay R680, to ground. In this circuit, the relays R680, R710 and R940 are connected in series but only the pulse-in relay R680 and the dial relay R940 operate. Due to the resistance of the above mentioned relays, the marginal relay R710 does not operate at this time. It may be well to mention, however, that the marginal booster battery relay R710 will operate in series with the pulse-in relay R680 only in the event a pulse of negative booster battery is transmitted over the dial conductor C794 from the two-way trunk 210.

Referring now to the relay R940, it will be noted that when the relay operates over the above traced circuit, it completes, at is contacts 942, an obvious circuit for energizing the lower winding of the outgoing hold slave relay R930. The relay R930 now operates and locks itself in its operated position via its contacts 935 to ground at contacts 953. The two-way trunk 210 is now in condition to repeat the subsequent impulses received from the impulse sender over the EC conductor C1186 to the pulse-in relay R680 in the two-way trunk 204.

Referring now to the pulse-in relay R680 it will be seen that as soon as the relay operates over the above traced circuit including the dial conductor C794, it completes, at its contacts 681, a circuit for operating the incoming hold relay R690. The relay R690 upon operating, applies ground potential via its contacts 693 and the contacts 772 to the C conductor C787 in the cable 132 in order to mark the two-way trunk 204 busy in the banks of the toll selectors 122 and 123 having access thereto. Also, at its contacts 696, the relay R690 connects battery potential by way of the winding of the marginal selector seize relay R670 and the contacts 683 to the EC conductor C784 in the cable 130 extending to the toll selector 121. Simultaneously therewith, as it contacts 694, the relay R690 connects ground potential to the C conductor C783 in the cable 130 extending to the toll selector 121. The application of ground potential to the C conductor C783 seizes the toll selector 121 and in response thereto the toll selector returns a low resistance ground potential over the EC conductor C784 in order to operate the marginal selector seize relay R670. In view of the foregoing, it will be understood that when the pulse-in relay R680 operates over the dial conductor C794, it causes relays R690 and R670 to operate in the order named and it also causes the seizure of the toll selector 121 to prepare the same to respond to subsequent impulses transmitted over the dial conductor C794.

DIALING

The impulse sender at the operator position 2200 now transmits the impulses corresponding to the remaining digits of the called number over the connection including the link 1390, the toll preselector 1400, the EC conductor C1186 and the relay R960 in the two-way trunk 210. The pulse-out relay R960 momentarily restores in response to each impulse and, at its contacts 961, interrupts the dialing circuit including the relay R940 and the relay R680. In this manner, the pulse-in relay R680 follows the impulses repeated thereto by the relay R960 in order to control the toll selector 121 and the switches in the local switch train 120 and thereby complete the connection to the desired called subscriber.

The first time the pulse-out relay R960 restores, i. e., in response to the first impulse of each series of impulses transmitted thereto, it completes a circuit via the contacts 963, 952 and 978 for operating the slow-to-release control relay R980. Due to the slow-to-release characteristics of relays R950 and R980, these relays remain in their operated positions during each series of impulses. However, during the interdigital pause between successive digits the relay R980 restores and the relay R950 remains in its operated position. As soon as the relay R980 operates, it completes, at its contacts 981, an obvious circuit for energizing the lower winding of the automatic ring cut-off relay R1020. The relay R1020 now operates and, at its contacts 1021 and 1023, it disconnects the ring relay R1010 and the resistor 1015 from the line conductors C1183 and C1184. The relay R1020 is arranged to disconnect the ring relay R1010 from the calling line during the dialing of each digit and for a short interval thereafter, in order to prevent an automatic ringing control signal from being repeated to the distant automatic exchange 203 after the dialing of the last digit.

As a further result of the operation of the relay R980, at its contacts 982, it connects battery potential via the resistor 984 to the dial conductor C883 in multiple with the battery potential applied thereto through the winding of the dial control relay R940. With this arrangement, the impedance of the dialing circuit is lowered in order thereby to improve the pulsing circuit for controlling the pulse-in relay R680 in the two-way trunk 204. Finally, at its contacts 983, the relay R980 opens a point in the incomplete circuit for the supervisory control relay R970 in order to prevent its operation when the relay R940 momentarily restores during impulsing.

After each series of impulses, the pulse-out relay R960 is retained in its operated position and, at its contacts 963, opens the circuit for the control relay R980 which slowly restores to normal. As soon as the relay R980 restores, it interrupts, at its contact 981, the previously described circuit for operating the slow-to-release relay R1020. This relay, due to its slow-to-release characteristics, delays restoration long enough to prevent the automatic ring control signal from being transmitted to the ring relay R1010.

Referring now to the pulse-in relay R680 in the two-way trunk 204, it will be understood that this relay restores to normal, in synchronism with the relay R940 in the two-way trunk 210, each time the dialing circuit is interrupted at the contacts 961 by the pulse-out relay R960. Each time the relay R680 restores to normal, it completes, at its contacts 682, a circuit for energizing the lower winding of the supervisory control relay R660 in series with the operated marginal relay R670. This circuit may be traced from ground via the contacts 622, 575, 682, 695 and 672, the lower winding of the relay R660 and the winding of the relay R670, to battery. The relay R660 now operates and, at its contacts 667, completes a locking circuit for itself which includes its upper winding and the contacts 523, 667 and 694. Thus it will be understood that in response to the first impulse transmitted to the pulse-in relay R680, the relay R660 will operate and remain in its operated position until the connection is released. The incoming hold relay R690 due to its slow-to-release characteristics remains in its operated position during impulsing.

As a further result of the operation of the relay R660, at its contacts 661, it short-circuits the winding of the marginal relay R710 thereby to reduce the resistance of the impulsing circuit including the dial conductor C794 and thus improve the impulses transmitted thereover.

Finally, at its contacts 683, the pulse-in relay R680 interrupts the EC conductor C784 extending to the toll selector 121 in order to repeat thereto the impulses of the various digits transmitted over the dial conductor V794. Consequently, the first series of impulses repeated over the EC conductor C784 by the pulse-in relay R680 controls the toll selector 121 to raise its wipers in a vertical direction a number of steps corresponding to the number of impulses included in the digit. Thereafter, the toll selector 121 automatically rotates its wipers over the selected level to select an idle trunk extending to the local switch train 121. Subsequent series of impulses corresponding to the remaining digits transmitted from the impulse sender at the toll operator position 2200 will control the local switch train 120 in a conventional manner to complete the connection to the desired called subscriber line.

Before describing the operations which result from the answering of the call by the called subscriber, a description will be given of the operations which result when a stop dialing condition is encountered by one of the switches in the switch train in the distant automatic exchange 203.

STOP DIALING

If during the setting up of the connection via the incoming switch train including the toll selector 121 and the local switch train 120, a stop-dialing condition is encountered, the low resistance ground potential returned over the EC conductor C784 will be replaced by a high resistance ground potential and cause the marginal relay R670 to restore to normal. Since the supervisory control relay R660 and the incoming hold relay R690 are in their operated positions during pulsing, the relay R670 upon restoring completes a circuit for operating the stop-dial relay R640. This circuit may be traced from battery by way of the winding of the relay R640, the contacts 664, 671, 691, 724 and 596, to ground. As soon as the stop-dial relay R640 operates, it closes its "X" contacts 642 in order to complete a holding circuit for the pulse-in relay R680 from battery through the resistor 558. As a further result of the operation of the relay R640, at its contacts 643 and 644, it transfers the dial conductor C794 from the previously traced circuit including ground potential through the winding of the pulse-in relay R680 to a circuit including battery potential through the winding of the dial control relay R560. When this transfer is made, a circuit is completed from battery via the winding of the relay R560, contacts 722, 644, 521, 551, 571 and 593 and the dial conductor C794 and the previously traced circuit including the winding of the relay R940, to battery.

As soon as the dial conductor C794 in the two-way trunk 204 is transferred from ground potential to battery potential in the manner described above, the relay R940 in the two-way trunk 210 restores to normal. As a result of the restoration of the relay R940, at its contacts 943, it completes a circuit for operating the supervisory control relay R970, which may be traced from ground via the contacts 953, 943, 963 and 933 and the winding of relay R970, to battery. Upon operating, the relay R970, at its contacts 974 and 975, substitutes a high resistance ground potential for the low resistance ground potential on the EC conductor C1186. More specifically, at its contacts 975, the relay R970 connects ground potential, via the high resistance upper winding and the low resistance lower winding of the relay R960, to the EC conductor C1186. The high resistance ground potential returned on the conductor C1186 controls the impulse sender at the operator position 2200 to block further transmission of impulses to the two-way trunk 210. The manner in which the impulse sender is controlled to block further transmission of impulses in response to a stop-dial condition, i. e. the return of a high resistance ground potential in place of the low resistance ground potential on the EC control conductor thereat, is described in detail in the previously mentioned Balzer application.

When the stop-dialing condition is removed by the switch train in the distant automatic exchange 203, the high resistance ground potential applied to the EC conductor C784 is replaced by a low resistance ground potential thereby to reoperate the marginal relay R670. As soon as the relay R670 is reoperated, it interrupts the circuit for the stop-dial relay R640, at its contacts 671. The relay R640 now restores to normal and, at its contacts 643 and 644, disconnects battery potential through the winding of the dial control relay R560 from the dial conductor C794 and it reconnects the ground potential through the winding of the pulse-in relay R680 thereto. Finally, at its contacts 642, the relay R640 interrupts the previously traced holding circuit for the pulse-in relay R680.

As soon as the ground potential through the winding of the pulse-in relay R680 is reapplied to the dial conductor C794, the dial control relay R940 in the two-way trunk 210 is reoperated in series with the pulse-in relay R680 in the two-way trunk 204. When the relay R940 reoperates, it interrupts, at its contacts 943, the previously described circuit for the supervisory control relay R970 which now restores to normal. The relay R970 now disconnects, at its contacts 975, the high resistance upper winding of the pulse-out relay R960 from the EC conductor C1186 and, at its contacts 974, it reconnects ground potential through the low resistance winding of the pulse-out relay R960 to the EC conductor C1186. In response to the return of the low resistance ground potential, in place of the high resistance ground potential, on the EC conductor C1186, the impulse sender at the operator position 2200 is controlled, in the manner described in the above mentioned Balzer application, to remove the stop-dialing condition and continue the transmission of the remaining impulses corresponding to the digits of the called destination.

BLOCKING AUTOMATIC RINGING

The impulse sender provided at the operator position 2200 is arranged to normally transmit an automatic ringing control signal immediately after the last digit of the called number has been transmitted. The present call, however, is routed to the automatic switching apparatus in the distant automatic exchange 203 which is arranged to automatically signal a desired called subscriber after the terminals of the called subscriber line have been selected. Consequently, it is necessary to provide facilities in the two-way trunk 210 for blocking the automatic ringing control signal transmitted thereto by the impulse sender at the operator position 2200.

As previously described, the automatic ring cut-off relay R1020 is operated under control of the control relay R980 and the latter relay, being of the slow-to-release type, remains operated during the transmission of each series of impulses, to the automatic exchange 203. Consequently, the relay R1020 is in its operated position for a short interval of time after the last impulse of the last digit has been transmitted by the impulse sender. Shortly thereafter, the impulse sender transmits a short pulse of negative battery potential over the established connection to the conductor C1183 in the cable 1181. This pulse is further extended via the upper winding of the retard coil 1024, the contacts 1022 and the upper winding of the automatic ring cut-off relay R1020, to ground. Since this pulse is transmitted after the last digit and before the slow-to-release relay R980 has restored, or at least before the slow-to-release relay R1020 has restored, the battery pulse on the conductor C1183 holds the relay R1020 operated over a circuit including its upper winding. As soon as the battery pulse is removed by the impulse sender, the relay R1020 slowly restores to normal and, at its contacts 1021, it reconnects the ringing relay R1010 to the conductor C1183. In this manner, the automatic ring cut-off relay R1020 prevents the relay R1010 from responding to the automotic ringing control signal battery pulse and thus prevents the automatic ringing control signal from being repeated over the interconnecting toll line 212 to the switching apparatus in the automatic exchange 203.

BUSY CONDITION

During the setting up of the above connection, it was pointed out that the impulses transmitted over the toll line 212 are repeated by the two-way trunk 204 in order to control the toll selector 121 and the switches in the local switch train 120 in order to complete the connection to the desired called subscriber. Before describing the operations which occur when the called subscriber answers the connection, a description will first be given of the operations which occur as a result of a busy condition encountered by the switching apparatus during the setting up of the connection or a busy condition encountered on the called subscriber line. In either event, alternate high and low resistance ground pulses will be returned over the EC conductor C784 to cause the intermittent restoration and operation of the marginal selector seize relay R670. At this point, it may be well to mention the fact that the alternate high and low resistance ground pulses will be transmitted at the rate of 120 impulses per minute in the event that the switching apparatus in the automatic exchange 203 encounters an all-trunks-busy condition, and that the pulses will be transmitted at the rate of 60 impulses per minute in the event that the particular called subscriber line is busy when the connection is established therewith. Each time the relay R670 restores under control of the busy indicating pulses returned over the EC conductor C784, it completes, at its contacts 671, the previously described circuit for operating the stop-dial relay R640. Consequently, the relay R640 will now operate and restore at the same rate as the relay R670. Each time the relay R640 operates and restores, it momentarily completes, at its contacts 642, the previously described circuit for retaining the pulse-in relay R680 in its operated position and, at its contacts 643 and 644, it alternately connects battery potential through the winding of the dial control relay R560 and ground potential through the winding of the pulse-in relay R680 to the dial conductor C794 over the previously described circuit. In this manner, the relay R640 alternately connects battery and ground potential to the dial conductor C794 at the same rate at which the marginal relay R670 restores and reoperates and thus transmits a flashing busy signal at 60 or 120 impulses per minute, depending upon the type of busy encountered, to the two-way trunk 210 in the central office 100.

Referring now to the dial control relay R940 in the two-way trunk 210, it will be recalled that this relay is normally held in its operated position from ground potential through the winding of the pulse-in relay R680 in the two-way trunk 204. Consequently, each time the battery potential is connected to the dial conductor C794, the relay R940 will restore, and each time ground potential is reconnected thereto, the relay R940 will reoperate. Accordingly, the relay R940 restores and reoperates at the same rate as the relay R640 in the two-way trunk 204. Each time the relay R940 restores, it completes, at its contacts 943, the previously described circuit for operating the supervisory control relay R970 and each time the relay R940 reoperates, it interrupts the circuit for the relay R970. Consequently, the relay R970 follows the flashing busy impulses and, at its contacts 974 and 975, it alternately connects ground potential through the high resistance upper winding and the low resistance lower winding of the relay R960 to the EC conductor C1186 extending to the operator position 2200. However, the pulse-out relay R950 remains in its operated position during the transmission of the flashing busy signal over the conductor C1186. The alternate high and low resistance ground pulses transmitted back over the EC conductor C1186 control the operator's position equipment to give her a flashing busy signal indicative of either an all-trunks-busy condition or a called subscriber line busy condition encountered during the establishment of the connection previously described. The calling operator at position 2200 may now release the connection and attempt to complete the same at a later time.

CALLED PARTY ANSWERS

It will now be assumed that the previously described connection is completed to the called subscriber at substation T2 in the automatic exchange 203 and is answered by the subscriber thereat. In response to answering the call, the switching apparatus in the automatic exchange 203 operates to substitute a steady high resistance ground potential for the low resistance ground potential applied to the EC conductor C784. The steady high resistance ground potential returned over the conductor C784 causes the marginal relay R670 to restore to normal and thus complete, at its contacts 671, the previously described circuit for operating the stop-dial relay R640. Upon operating, the relay R640, at its contacts 642, completes the holding circuit for the pulse-in relay R630 and, at its contacts 643 and 644, it disconnects ground potential through the winding of the relay R630, from the dial conductor C794 and substitutes, in place thereof, battery potential through the winding of the dial control relay R560.

The substitution of the battery potential for the ground potential on the dial conductor C794 causes the dial control relay R940 in the two-way trunk 210 to resore to normal. At its contacts 943, the relay R940 completes the previously described circuit for operating the supervisory control relay R970 and the relay R970, in turn, at its contacts 974 and 975, replaces the low resistance ground potential on the EC conductor C1186 with a high resistance ground potential through the upper and lower windings of relay R960. In this manner, a steady high resistance ground potential substituted for the steady low resistance ground potential on the EC conductor C1186 in order to give the calling operator at position 2200 an "off hook" supervisory signal indicating that the called subscriber has answered the connection.

The calling toll operator at position 2200 may now interconnect the calling and called subscribers and simultaneously disconnect her position equipment from the established connection in the manner described in the previously mentioned Balzer application. The conversational path which is now completed from the calling party through the central office 100 to the called subscriber line in the automatic exchange 203 includes the switching apparatus in the central office 100 over which the calling end of the connection is completed to the link 1300, the toll preselector 1400, the cable 1181 extending to the two-way trunk 210, the − and + conductors C1183 and C1184, the − and + conductors C881 and C882 in the cable 813, the inductively coupled windings of the repeating coil 891, the conductors C795 and C796 of the toll line 212, the inductively coupled windings of the repeating coil 791, the − and + conductors C792 and C793, the − and + conductors C781 and C782 in the cable 130, the toll first selector 121, the local switch train 120, and the called subscriber at substation T2.

In the above described connection, it was assumed that the toll selector 121 and the local switch train 120 in the exchange 203 were utilized in completing the connection to the called subscriber substation, but it should be understood that the connection could also be directed via the toll selector 121 and a link, such as the link 126, to the operator position 125 at the dial toll board in the automatic exchange 203 in the manner described in the previously mentioned Balzer application. It should be understood that the switching apparatus and trunking arrangement provided at the automatic exchange 203 is substantially the same as that provided in the central office 100.

SUPERVISION

If the called subscriber at substation T2 desires to recall the toll operator at the operator position 2200, the switchhook at the substation may be actuated one or more times in the usual manner in order to transmit a switchhook signal. Each time the switchhook is momentarily actuated, the switching apparatus included in the automatic exchange 203 operates to replace the high resistance ground potential on the EC conductor C784 with a low resistance ground potential in order to reoperate the marginal relay R670 in the two-way trunk 204. It may be well to mention at this time that the marginal relay R670 was restored to normal, when the called subscriber answered the call, by the substitution of a high resistance ground potential for the low resistance ground potential on the EC conductor C784. Consequently, when the low resistance ground potential is returned over the EC conductord C784 to reoperate the marginal relay R670, the relays R640, R660, R580 and R690 in the two-way trunk 204 are in their operated positions and battery potential is connected through the winding of the dial control relay R560 to the dial conductor C794.

Upon operating under the influence of the switchhook supervisory signal, the relay R670 interrupts, at its contacts 671, the circuit for the relay R740 which now restores to normal. Upon restoring, the relay R640 reconnects ground potential through the winding of the pulse-in relay R630 to the dial conductor C794 and it disconnects battery potential through the winding of the relay R560 from the dial conductor C794.

In the two-way trunk 210 the substitution of the ground potential for the battery potential on the dial conductor C794 recompletes the previously described circuit for operating the dial control relay R940. At its contacts 943, the relay R940 interrupts the circuit for the supervisory control relay R970 which relay now restores to normal and, at its contact 974 and 975, substitutes a low resistance ground potential for the high resistance ground potential applied through the windings of the pulse-out relay R960 to the EC conductor C1186. The substitution of the low resistance ground potential for the high resistance ground potential applied to the EC conductor C1186 controls the link circuit 1300 associated with the operator position 2200 to give the operator thereat an "on hook" supervisory signal.

The above series of operations all result from the momentary actuation of the called subscriber switchhook to transmit "on hook" supervisory signal, should be noted that when the switchhook is released to an "off hook" position, the marginal relay R670 will restore to normal and reoperate the stop-dial relay R640 in the manner previously described. The latter relay, in turn, will again replace battery potential through the winding of the relay R560, for the ground potential, on to the dial conductor C794 in order to restore the relay R940 in the two-way trunk 210. The latter relay, at its contacts 943, recompletes the operating circuit for the relay R970 thereby to again replace the high resistance ground potential on the EC conductor C1186. The toll operator at the position 2200 may now control the associated link 1300 to reconnect her headset to the established connection and converse with the called subscriber.

Under certain conditions the calling operator at position 2200 in the central office 100 may find it necessary to rering the called subscriber at substation T2 or the toll operator at position 125 in the distant automatic exchange 203 over an established connection. This operation is performed by the toll operator at position 2200 by momentarily operating a ring key at her position. The operation of the ring key applies battery potential to the negative conductor C1183 in the cable 1181 in order to operate the ring relay R1010 over the circuit including the upper winding of the retard coil 1024 and the contacts 1021. The relay R1010 operates over this circuit and, at its contacts 1014 completes an obvious circuit for operating the slow-to-release ring control relay R990. Also, at its contacts 1012, the relay R1010 completes a circuit, which is independent of the contacts 992, for retaining the dial control relay R940 connected to the dial conductor C883 during the operated period of the ring control relay R990.

The toll operator at position 2200 now restores her ring key and thereby removes battery potential from the winding of the ring relay R1010 in order to restore the relay to normal. As soon as the relay R1010 restores, it interrupts the circuit for the slow-to-release relay R990, at its contacts 1014, and at its contacts 1011, it substitutes ground potential on the dial conductor C883 for the battery potential connected thereto through the winding of relay R940. This ground potential is applied to the conductor C883 by way of the contacts 991, 971, 1011, 961, 922 and 1032. Shortly after the ground potential is applied to the EC conductor C883, the slow-to-release relay R990 fully restores to normal and, at its contacts 992, replaces battery potential through the winding of relay R940 on the EC conductor C883 for the ground potential applied thereto via the contacts 991. As previously noted, the battery potential is connected to the dial conductor C883 via the winding of the relay R940, the contacts 992, 961, 922 and 1032. In this manner a short pulse of ground potential, determined by the slow-to-release time period of the relay R990, is applied to the dial conductor C883 in order to momentarily operate the dial control relay R560 in the two-way trunk 204.

Referring now to the two-way trunk 204, it will be seen that when the short ground pulse is applied to the dial conductor C883 in the two-way trunk 210, a circuit is completed via the dial conductor C794, the contacts 593, 571, 551, 521, 644 and 722 and the winding of dial control relay R560, to battery. The relay R560, momentarily operates and at its contacts 561, momentarily interrupts the holding circuit for the pulse-in relay R680 and the latter relay, at its contacts 683, momentarily disconnects the EC conductor C784 from the winding of the marginal relay R670. It may be well to mention at this time that the pulse-in relay R680 also interrupts the circuit for the incoming holding relay R690, at its contacts 681, but due to the slow-to-release characteristics of relay R690, it remains in its operated position during the momentary restoration of the pulse-in relay R680. The momentary interruption of the circuit including the EC conductor C784 controls the succeeding switches in the automatic exchange 203 to rering the called subscriber or, if the called party is the toll operator at position 125, to transmit an "on hook" supervisory signal. The called subscriber will answer the call in the usual manner. If the recall is to the operator at position 125, the operator thereat may now reconnect her headset to the connection in the usual manner and converse with the toll operator at position 2200 in the central office 100.

RELEASE

The above described connection including the two-way trunks 210 and 204 is held under control of the calling operator at position 2200 in the central office 100. Consequently, the release of the switching apparatus and the two-way trunks 210 and 204 included in the connection is under the exclusive control of the calling toll operator. When the called subscriber at substation T2 releases the connection, by replacing the receiver on the switchhook of the associated telephone instrument, an "on hook" supervisory signal is transmitted to the calling toll operator at position 2200 in the manner described above. It will be recalled that the "on hook" supervisory signal is transmitted as a result of the substitution of a low resistance ground potential for the high resistance ground potential applied to the EC conductor C784. This causes the operation of the marginal relay R670 and the latter relay at its contacts 671, causes the restoration of the stop-dial relay R640. The last mentioned relay, at its contacts 643 and 644, transfers the dial conductor C794 from battery potential through the winding of the dial control relay R560 to ground potential through the winding of the pulse-in relay R680. The substitution of ground potential on the dial conductor C794 in the two-way trunk 204 operates the relay R940 in the two-way trunk 210. The relay R940, in turn, at its contacts 943, interrupts the circuit for the supervisory control relay R970 and the latter relay, upon restoring, replaces the low resistance ground potential for the high resistance ground potential applied through the windings of the relay R960 to the EC conductor C1186. As soon as the low resistance ground potential is placed on the EC conductor C1186 the toll operator at position 2200 will receive a steady "on hook" supervisory signal indicative of the fact that the called subscriber has disconnected.

The operator at position 2200 now releases the connection in the manner described in the previously mentioned Balzer application and thereby interrupts the circuit, including the EC conductor C1186, for the pulse-out relay R960. The relay R960 now restores to normal and, at its contacts 962, interrupts the circuit for the outgoing hold relay R950 which also restores to normal. During the restoration of the slow-to-release relay R950, a circuit is completed via its contacts 952 for momentarily operating the relay R980. However, the momentary operation of the relay R980 is of no importance at the present time. As a further result of the restoration of the relay R950, at its contacts 953, it interrupts the locking circuit for the lower winding for the outgoing hold slave relay R930 which also restores to normal.

As a further result of the restoration of the pulse-out relay R960 as noted above, at its contacts 961, it disconnects the dial control relay R940 from the circuit including the dial conductor C883 over which the pulse-in relay R680 in the two-way trunk 204 is operated. Consequently, the pulse-in relay R680 and the dial control relay R940 are restored to normal. Finally, the release of the connection by the operator at position 2200 removes ground potential from the C conductor C1185 in the two-way trunk 210 and thereby interrupts the circuit for the outgoing seizure relay R920. The latter relay now restores and, at its contacts 924 and 926, removes the busy marking ground potential from the C-toll and C-local conductors C292 and C291 in the cable 382. The two-way trunk 210 is now fully restored and is available for other calls.

Referring now to the two-way trunk 204, it will be seen that when the pulse-in relay R680 restores to normal as described above, it interrupts, at its contacts 681, the circuit for the relay R690 and, at its contacts 683, it disconnects the marginal relay R670 from the EC conductor C784. The relay R690 now restores to normal and, at its contacts 691, it interrupts a circuit for the relay R640 which also restores to normal. At its contacts 693, the relay R690 removes the busy marking ground potential from the C conductor C787 in the cable 132 and at its contacts 694, it removes the holding ground potential from the C conductor C783 and the locking ground potential from the upper winding of the relay R660. As a result of the interruptions of the circuits including the C and EC conductors C783 and C784 in the cable 130, the switching apparatus in the automatic exchange 203 which has been utilized in the above described telephone connection now restore to normal and the two-way trunk 204 is rendered available for an additional call.

*Toll call from the distant automatic exchange operator position 125 to the central office 100*

As previously noted, the distant automatic exchange 203 includes automatic switching apparatus and a dial toll board of substantially the same type as that disclosed in the central office 100 and described in detail in the previously mentioned Balzer application. Accordingly, it will be assumed that a calling subscriber in the distant automatic exchange 203 has extended a CLR toll call to a link, such as the link 126, associated with the operator position 125 and that the operator thereat has answered the call. It will also be assumed that the call is to be completed to a subscriber located in the central office 100. The operator at position 125 now actuates the keyset and the impulse sender (not shown) associated with her position in accordance with the digits necessary to route the call to the desired called subscriber. The first digit transmitted by the impulse sender from the operator position 125 operates the toll preselector 123 to select a trunk line terminating in an idle two-way trunk circuit such as the two-way trunk 204.

Referring now to Figs. 5 to 7, inclusive, it will be seen that the two-way trunk 204 is accessible to the toll preselector 123 via the conductors C785 to C788, inclusive, in the cable 132. This circuit is marked idle in the banks of the toll preselector 123 by battery potential connected to the C conductor C787 through the winding of the outgoing seizure relay R520. Consequently, when the toll preselector 123 rotates its wipers over the associated bank contact and seizes the idle two-way trunk 204, it forwards ground potential over the C conductor C787 and thus operates the relay R520. In addition to the foregoing, the toll preselector 123 connects battery potential via the EC conductor C788 and the low resistance lower winding of the pulse-out relay R610 to ground at contacts 665. The last mentioned circuit causes the relay R610 to operate. In view of the foregoing, it will be seen that the two-way trunk 204, upon being seized by the toll preselector 123, causes the operation of the relays R520 and R610.

As soon as the relay R520 operates, it prepares, at its contacts 522, a point in the circuit for connecting the dial control relay R560 to the dial conductor C794, extending to the two-way trunk circuit 210 in the central office 100. As soon as the pulse-out relay R610 operates, it completes, at its contacts 613, an obvious circuit for operating the outgoing hold relay R620. As a further result of the operation of the relay R610, at its contacts 611, it completes the circuit for connecting the dial control relay R560 to the dial conductor C794. This circuit may be traced from battery via the winding of the relay R560, the contacts 722, 611, 522, 551, 57: and 593, and the dial conductor C794 connected to the mid-point of the lower windings of the repeating coil 791 at this point, the circuit including the dial conductor C974 is extended in parallel over the conductors C795 and C796 of the toll line 212 to the lower windings of the repeating coil 891 associated with the two-way trunk 210. The dial conductor C893 in the two-way trunk 210 is connected to the mid-point of the repeating coil 891 and thus completes the circuit in the two-way trunk 210 via the contact 1032, 921 and 1055 and the winding of the pulse-in relay R1110, to ground. It will be seen from the above traced circuit that the dial control relay R560 in the two-way trunk 204 and the pulse-in relay R1110 in the two-way trunk 210 are connected in series and consequently both relays operate as soon as the contacts 611 are closed in response to the operation of the pulse-out relay R610.

Referring now to relay R560, it will be noted that when the relay operates it completes, at its contacts 563, a circuit for operating the outgoing hold slave relay R540. This circuit may be traced from ground at the contacts 623 of the operated relay R620 and then via contacts 556 and 563 and the upper winding of relay R540, to battery. In response to the operation of relay R540, at its contacts 542, a locking circuit is completed for its upper winding via the contacts 556 and 623. Since the locking circuit is independent of the contacts 563, restoration of the relay R560 will not cause the restoration of relay R540. The two-way trunk 204 is now in condition to repeat impulses, received over the EC conductor C788, to the pulse-in relay R1110 in the two-way trunk 210.

Referring now to the pulse-in relay R1110, it will be seen that when the relay operates, it completes, at its contacts 1112, a circuit including ground at contacts 954 for operating the incoming hold relay R1070. As soon as the relay R1070 operates, it applies ground potential via the contacts 1073 and 1094 to the C conductor C1185 in the cable 1181 in order to mark the two-way trunk 210 busy in the banks of the toll selectors, such as the selector 1400, having access thereto. Also, at its contacts 1074, the relay R1070 connects ground potential, via the contacts 1096, to the C conductor C1187 in the cable 1182 extending to the intermediate toll selector 120. Finally, at its contacts 1071, the relay R1070 completes an obvious circuit for operating the incoming hold slave relay R1120. As soon as the relay R1120 operates, it completes, at its contacts 1123, a circuit for connecting battery potential, via the winding of the marginal selector seize relay R1060 and the contacts 1111, to the EC conductor C1188 in the cable 1182 extending to the intermediate toll selector 110.

In response to the application of ground potential to the C conductor C1187, the intermediate toll selector 110 operates and it thereupon returns a low resistance ground potential over the EC conductor C1188 in order to operate the marginal relay R1060. In view of the foregoing, it will be understood that when the pulse-in relay R1110 operates over the dial conductor C883, it causes the relays R1070 and R1120 to operate in the order named to seize the intermediate toll selector 110.

DIALING

The impulse sender at the operator position 125 now transmits the impulses corresponding to the remaining digits of the called number over the connection including the link 126, the toll preselector 123, the EC conductor C788 and the relay R610 in the two-way trunk 204. The pulse-out relay R610 momentarily restores in response to each impulse and, at its contacts 611, it interrupts the dialing circuit including the relay R560 and the relay R1110. In this manner, the pulse-in relay R1110 follows the impulses, repeated thereto by the relay R610, in order to control the intermediate toll selector 110 and the subsequent switches in the switch train and thereby complete the connection to the desired called subscriber.

The first time the relay R610 restores, i. e., in response to the first impulse of each series of impulses transmitted thereto, it completes a circuit via the contacts 582, 612, 624 and 669 for operating the slow-to-release control relay R650. Due to the slow-to-release characteristics of relays R620 and R650, these relays remain in their operated positions during each series of impulses received by the relay R610. However, during the interdigital pause between successive digits, the relay R650 restores and the relay R620 remains in its operated position. As soon as the relay R650 operates, it completes, at its contacts 652, an obvious circuit for energizing the lower winding of the automatic ring cut-off relay R730. The relay R730 now operates and, at its contacts 731 and 732, it disconnects the check relay R750 and the ring relay R740 from the line conductors C785 and C786. The relay R730 is arranged to disconnect the ring relay R740 and the check relay R750 from the calling line conductors during the dialing of each digit and for a short interval thereafter, in order to prevent an automatic ring control signal from being repeated to the central office 100 after the dialing of the last digit.

As a further result of the operation of the relay R650, at its contacts 651, it connects battery potential via the resistor 627 to the dial conductor C794 in multiple with the battery potential applied thereto through the winding of the dial control relay R560. With this arrangement, the impedance of the dialing circuit is lowered in order thereby to improve the pulsing circuit for controlling the pulse-in relay R1110 in the two-way trunk 210. Finally, at its contacts 653, the relay R650 opens a point in the incomplete circuit for the upper winding of the supervisory control relay R660 in order to prevent its operation when the dial control relay R560 momentarily restores during pulsing.

After each series of impulses, the pulse-out relay R610 is retained in its operated position and, at its contacts 612, opens the circuit for the control relay R650 which slowly restores to normal. As soon as the relay R650 restores, it interrupts, at its contacts 652, the previously described circuit for operating the slow-to-release relay R730. This relay, due to its slow-to-release characteristics, delays restoration long enough to prevent the automatic ring control signal from being transmitted to the ring relay R740.

Referring now to the pulse-in relay R1110 in the two-way trunk 210, it will be understood that this relay restores to normal, in synchronism with the relay R560 in the two-way trunk 210, each time the dialing circuit is interrupted at the contacts 611 of the pulse-out relay R610. Each time the relay R1110 restores to normal, it completes, at its contacts 1113, a circuit for operating the control relay R1080. This circuit may be traced from battery via the winding of the relay R1080, the contacts 1124, 1133, 1113 and 954, to ground. The relay R1080 now operates, and completes at its contacts 1083, a circuit for operating the supervisory control relay R970. The last mentioned circuit may be traced from battery by way of the winding of relay R970, the contacts 1083, 927, 1096 and 1074, to ground. The relay R970 upon operating, at its contacts 976, completes a locking circuit for itself which is independent of the contacts 1083. Finally, at its contacts 1082, the relay R1080 interrupts the point in the circuit for the stop dial relay R1050 in order to prevent the lastmentioned relay from operating during the time the relay R1060 is controlled to repeat the pulses over the EC conductor C1188. Thus, it will be understood that in response to the first impulse transmitted by the relay R1110, the relay R1080 will operate, followed by the operation of relay R970, and the latter relay will remain in its operated position during the dialing of the remaining digits. The relays R1070 and R1080, due to their slow-to-release characteristics, will remain in their operated positions during impulsing.

Finally, at its contacts 1111, the pulse-in relay R1110 interrupts the circuit including the EC conductor C1188 extending to the intermediate toll selector 110 in order to repeat thereto the impulses of the various digits transmitted over the dial conductor C883. Consequently, the first series of impulses repeated over the EC conductor C1188 by the pulse-in relay R1110 controls the intermediate selector 110 to raise its wipers in a vertical direction a number of steps corresponding to the number of impulses included in the digit. Thereafter, the intermediate toll selector 110 automatically rotates its wipers over the selected level in order to select an idle trunk extending to idle selector, such as the selector 104. Subsequent series of impulses corresponding to the remaining digits transmitted from the impulse sender at the toll operator position 125 will control a connector, such as the connector 105, in a conventional manner to complete the connection to the desired called subscriber line.

Before describing the operations which result from the answering of the call by the called subscriber, a description will be given of the operations which result when a stop dialing condition is encountered by one of the switches in the switch train in the central office 100.

STOP DIALING

If, during the setting up of the connection via the intermediate toll selector 110 and the subsequent switches in the switch train, a stop dialing condition is encountered, the low resistance ground potential returned over the EC conductor C1188 will be replaced by a high resistance ground potential and cause the marginal selector seize relay R1060 to restore to normal. A stop dial control signal of the type noted will be returned over the EC conductor C1188 during the interdigital pause between the transmission of successive digits. Consequently, the control relay R1080 will be in its restored position and the relays R970 and R1120 will be in their operated positions. Therefore, when the marginal relay R1060 is restored in response to the high resistance ground potential indicative of a stop dialing condition, it completes, at its contacts 1061, a circuit for operating the stop dial relay R1050. This circuit may be traced from battery by way of the winding of the relay R1050, the contacts 1041, 1122, 973, 1082, 1061 and 993, to ground. As soon as the stop dial relay R1050 operates, it closes its "X" contacts 1056 in order to complete a holding circuit for the pulse-in relay R1110 from battery through the resistor 1058 and then via the contacts 1056, 1034 and 941 and the winding of relay R1110, to ground. As a further result of the operation of the relay R1050, at its contacts 1054 and 1055, it transfers the dial conductors C883 from the previously traced circuit including ground potential through the winding of the pulse-in relay R1110 to a circuit including battery potential through the winding of the dial control relay R940. When this transfer is made, a circuit is completed from battery via the winding of relay R940, the contacts 992, 1054, 921 and 1032, the dial conductor C883 and the previously traced circuit including the winding of the dial control relay R560, to battery.

As soon as the dial conductor C883 is transferred from ground potential to battery potential in the manner described above, the dial control relay R560 in the two-way trunk 204 restores to normal. As a result of the restoration of the relay R560, at its contacts 562, it completes a circuit for operating the supervisory control relay R660 which may be traced from ground via the contacts 623, 556, 562, 653 and 541 and the upper winding of relay R660, to battery. It should be noted at this time that the control relay R650 is operated in response to the first impulse of each series received by the pulse-out relay R610 and that it remains operated until the end of each series of impulses included in each digit. During the interdigital pause between the transmission of each digit the relay R650 restores to normal. Consequently, when the stop dial signal is transmitted and causes the restoration of the dial control relay R560, the contacts 653 of the relay R650 are closed to complete the above traced circuit for the upper winding of the supervisory control relay R660. As soon as the relay R660 operates, it substitutes, at its contacts 665 and 666 a high resistance ground potential for the low resistance ground potential on the EC conductor C788. More specifically, at its contacts 666, the relay R660 connects ground potential, via the high resistance upper winding and the low resistance lower winding of the relay R610, to the EC conductor C784. The substitution of a high resistance ground potential for the low resistance ground potential on the EC conductor C788 controls the impulse sender at the operator position 125 to block further transmission of impulses to the two-way trunk 204. The manner in which the impulse sender is controlled to block further transmission of impulses corresponds to a stop dial condition, i. e. the return of a high resistance ground potential in place of the low resistance ground potential on the EC control conductor thereat, is described in detail in the previously mentioned Balzer application.

When the stop dialing condition is removed by the intermediate toll selector 110, or any subsequent switch in the switch train in the central office 100, the high resistance ground potential applied to the EC conductor C1188 is replaced by a low resistance ground potential thereby to reoperate the marginal relay R1060. The relay R1060, upon operating, interrupts the circuit for the stop dial relay, R1050, at its contacts 1061. The relay R1050 now restores to normal and, at its contacts 1054, it disconnects battery potential through the winding of the dial control relay R920 from the dial conductor C883 and it reconnects thereto, at its contacts 1055, the ground potential through the winding of the pulse-in relay R1110. Finally, at its contacts 1056, the relay R1050 interrupts the previously traced holding circuit for the pulse-in relay R1110.

As soon as the ground potential through the winding of the pulse-in relay R1110 is reapplied to the dial conductor C883, the dial control relay R560 in the two-way trunk 204 is reoperated in series with the relay R1110 in the two-way trunk 210. Upon reoperating, the dial control relay R560 interrupts, at its contacts 562, the previously traced circuit for the supervisory control relay R660 which now restores to normal. Upon restoring, the relay R660 disconnects, at its contacts 666, ground potential through the high resistance upper winding of relay R610 from the EC conductor C788 and it reconnects, at its contacts 665 ground potential through the low resistance lower winding of the relay R610 to the EC conductor C788. In response to the return of the low resistance ground potential, in place of the high resistance ground potential, on the EC conductor C788, the impulse sender at the operator position 125 is controlled, in the manner described in the above mentioned Balzer application to remove the stop dialing condition and continue the transmission of the remaining impulses corresponding to the digits of the called destination.

BLOCKING AUTOMATIC RINGING

The impulse sender provided at the operator position 125 is arranged to normally transmit an automatic ringing control signal immediately after the last digit of the called number has been transmitted. The present call, however, is routed to the automatic switching apparatus in the central office 100 which is arranged to automatically signal the desired called subscriber after the terminals of the called subscribed line have been selected. Consequently, it is necessary to provide facilities in the two-way trunk 204 for blocking the automatic ringing control signal transmitted thereto by the impulse sender at the operator position 125.

As previously described, the automatic ring cut-off relay R730 is operated under control of the control relay R650 and the latter relay, being of the slow-to-release type, remains operated during the transmission of each series of impulses to the central office 100. Consequently, the relay R730 is in its operated position for a short interval of time after the last impulse of the last digit has been transmitted by the impulse sender. Shortly thereafter, the impulse sender transmits a short pulse of negative battery potential over the established connection to the — conductor C785 in the cable 132. This pulse is further extended via the upper winding of the retard coil 712, the contacts 733 and the upper winding of the automatic ring cut-off relay R730, to ground. Since this pulse is transmitted after the last digit and before the slow-to-release relay R650 has restored, or at least before the slow-to-release relay R730 has restored, the momentary battery pulse on the conductor C785 holds the relay R730 operated over a circuit including its upper winding. As soon as the battery pulse is removed by the impulse sender, the relay R730 slowly restores to normal and, at its contacts 732, it reconnects the ringing relay R740 to the conductor C785. In this manner, the automatic ring cut-off relay R730 prevents the relay R740 from responding to the automatic ringing control signal battery pulse and thus prevents the automatic ringing control signal from being repeated over the interconnecting toll line 212 to the switching apparatus in the central office 100.

BUSY CONDITION

During the setting up of the above connection, it was pointed out that the impulses transmitted over the toll line 212 are repeated by the two-way trunk 210 in order to control the intermediate toll selector 110, the local second selector 104 and the local connector 105 in order to complete the connection to the desired called subscriber. Before describing the operations which occur when the called subscriber answers the connection, a description will first be given of the operations which occur as a result of a busy condition encountered by the above named switching apparatus during the setting up of the connection or a busy condition encountered on the called subscriber line. In either event, alternate high and low resistance ground pulses will be returned over the EC conductor C1188 to cause the intermittent restoration and operation of the marginal selector seize relay R1060. At this point, it may be well to mentioned the fact that the alternate high and low resistance ground pulses will be transmitted at the rate of 120 impulses per minute in the event that the switching apparatus in the central office 100 encounters an all-trunks-busy condition, and that the pulses will be transmitted at the rate of 60 impulses per minute in the event that the particular called subscriber line is busy when the connection is established therewith. Each time the relay R1060 restores, under control of the busy indicating pulses returned over the EC conductor C1188, it completes, at its contacts 1061, the previously described circuit for operating the stop dial relay R1050. Consequently, the relay R1050 will now operate and restore at the same rate as the relay R1060. Each time the relay R1050 operates and restores it momentarily completes, at its contact 1056, the previously described circuit for retaining the pulse-in relay R1110 in its operated position and, at its contacts 1054 and 1055, it alternately connects battery potential through the winding of the dial control relay R940 and ground potential through the winding of the pulse-in relay R1110 to the dial conductor C883 over the previously described circuit. In this manner, the relay R1050 alternately connects battery and ground potential to the dial conductor C883 at the same rate at which the marginal relay R1060 restores and reoperates and thus transmits a flashing busy signal at 60 or 120 impulses per minute, depending upon the type of busy encountered, to the two-way trunk 204 in the distant automatic exchange 203.

Referring now to the dial control relay R560 in the two-way trunk 204, it will be recalled that this relay is normally held in its operated position from ground potential through the winding of the pulse-in relay R1110 in the two-way trunk 210. Consequently, each time the battery potential is connected to the dial conductor C883, the relay R560 will restore, and each time ground potential is reconnected thereto the relay R560 will reoperate. Accordingly, the relay R560 restores and reoperates at the same rate as the relay R1050 in the two-way trunk 210. Each time the relay R560 restores, it completes, at its contacts 562, the previously described circuit for operating the supervisory control relay R660 and each time the relay R560 reoperates, it interrupts the circuit for the relay R660. Consequently, the relay R660 follows the flashing busy impulses and at its contacts 665 and 666, it alternately connects ground potential through the high resistance upper winding and the low resistance lower winding of the relay R610 to the EC conductor C788 extending to the operator position 125. However, the pulse-out relay R610 remains in its operated position during the transmission of the flashing busy signal over the conductor C788. The alternate high and low resistance ground impulses transmitted back over the EC conductor C788 control the operator's position equipment to give her a flashing busy signal indicative of either an all-trunks-busy condition or a called subscriber line busy condition encountered during the establishment of the connection previously described. The calling operator at position 125 may now release the connection and attempt to complete the same at a later time.

CALLED PARTY ANSWERS

It will now be assumed that the previously described connection is completed to the called subscriber at substation T1 in the central office 100 and that it is anwered by the subscriber thereat. In response to answering the call, the switching apparatus in the central office 100 operates to substitute a steady high resistance ground potential for the low resistance ground potential applied to the conductor C1188. The steady high resistance ground potential returned over the conductor C1188 causes the marginal relay R1060 to restore to normal and thus complete, at its contacts 1061, the previously described circuit for operating the stop dial relay R1050. Upon operating, the relay R1050, at its contacts 1056, completes the holding circuit for the pulse-in relay R1110 and, at its contacts 1054 and 1055, it disconnects ground potential through the winding of relay R1010, from the dial conductor C883 and substitutes, in place thereof, battery potential through the winding of the dial control relay R940.

The substitution of battery potential for the ground potential on the dial conductor C883 causes the dial control relay R560 in the two-way trunk 204 to restore to normal. At its contacts 562, the relay R560 completes the previously described circuit for operating the supervisory control relay R660 and the relay R660, in turn, at its contacts 666 and 665, replaces the low resistance ground potential on the EC conductor C788 with a high resistance ground potential through the upper and lower windings of relay R610. In this manner, a steady high resistance ground potential is substituted for the steady low resistance ground potential on the EC conductor C788 in order to give the calling operator at position 125 an "off hook" supervisory signal indicating that the called subscriber has answered the connection.

The calling toll operator at position 125 may now interconnect subscribers and simultaneously disconnect her position equipment from the established connection in the manner described in the previously mentioned Balzer application.

The conversational path which is now completed from the calling party in the exchange 203 to the called subscriber line in the central office 100, includes the switching apparatus in the distant automatic exchange 203 over which the calling end of connection is completed to the link 126, the toll preselector 123, the cable 132 extending to the two-way trunk 204, the — and + conductors C785 and C786 the —and + conductors C792 and C793, the inductively coupled windings of the repeating coil 791, the conductors C795 and C796 of the toll line 212, the inductively coupled windings of the repeating coil 891, the — and + conductors C881 and C882 in the cable 813, the — and + conductors C1189 and C1190 in the cable 1182, the intertoll selector 110, the local second selector 104, the local connector 105, and the called subscriber at substations T1.

In the above described connection, it was assumed that the intertoll selector 110, the selector 104 and the connector 105 were utilized in completing the connection to the called subscriber substation, but it should be understood that the connection could also be directed via the intertoll selector 110, the intertoll selector 112, an inward toll trunk, such as the trunk 300, and a link, such as the link 1300, to the operator position 2200 at the dial toll board in the central office 100 in the manner described in the previously mentioned Balzer application.

SUPERVISION

If the called subscriber at substation T1 desires to recall the toll operator at the operator position 125, the switchhook at the substation may be actuated one or more times in the usual manner in order to transmit a switchhook signal. Each time the switchhook is momentarily actuated, the switching apparatus included in the central office 100 operates to replace the high resistance ground potential on the EC conductor C1188, with a low resistance ground potential in order to reoperate the marginal relay R1060 in the two-way trunk 210. It may be well to mention at this time that the marginal relay R1060 was restored to normal, when the called subscriber answered the call, by the substitution of a high resistance ground potential for the low resistance ground potential on the EC conductor C1188. Consequently, when the low resistance ground potential is returned over the EC conductor C1188 to reoperate the marginal relay R1060, the relays R970, R1050, R1070, R1110 and R1120 in the two-way trunk 210 are in their operated positions and battery potential is connected through the winding of the dial control relay R940 to the dial conductor C883.

In response to the operation of the relay R1060 under the influence of the switchhook supervisory signal, at its contacts 1061, it interrupts the previously described circuit for the stop dial relay R1050 which now restores to normal. Upon restoring, the relay R1050, at its contacts 1055, reconnects ground potential through the winding of the pulse-in relay R1110 to the dial conductor C883 and, at its contacts 1054, it disconnects battery potential through the winding of the relay R940 from the dial conductor C883.

In the two-way trunk 204, the substitution of ground potential for the battery potential on the dial conductor C883 recompletes the previously described circuit for operating the dial control relay R560. At its contacts 562, the relay R560 now interrupts a circuit for the supervisory control relay R660 which relay now restores to normal and, at its contacts 665 and 666, substitutes a low resistance ground potential for the high resistance ground potential applied through the windings of the pulse-out relay R610 to the EC conductor C788. The substitution of the low resistance ground potential for the high resistance ground potential applied to the EC conductor C788 controls the link circuit 126 associated with the operator position 125 to give the operator thereat an "on hook" supervisory signal.

The above series of operations all result from the momentary actuation of the called subscriber switchhook to transmit an "on hook" supervisory signal. It should be noted that when the switchhook is released to an "off hook" position, the marginal relay R1060 will restore to normal and reoperate the stop dial relay R1050, in the manner previously described. The latter relay, in turn, will again replace battery potential through the winding of the relay R940, for the ground potential, on to the dial conductor C883 and in order to restore the relay R560 in the two-way trunk 204. The latter relay, at its contacts 562, recompletes the operating circuit for the relay R660 thereby to again replace the high resistance ground potential on the EC conductor C788. The toll operator at position 125 may now control the associated link 126 to reconnect her headset to the established connection and converse with the called subscriber.

Under certain conditions, the calling operator at position 125 in the distant automatic exchange 203 may find it necessary to rering the called subscriber at substation T1 or the toll operator at position 2200, in the central office 100, over an established connection. This operation is performed by the toll operator at position 125 by momentarily operating the ring key at her position. The operation of the ring key applies battery potential to the negative conductor C785 in the cable 132 in order to operate the ring relay R740 over a circuit including the winding of the retard coil 712 and the contacts 732. The relay R740 operates over this circuit and, at its contacts 745, completes an obvious circuit for operating the slow-to-release ring control relay R720. Also, at its contacts 743, the relay R740 completes a circuit, which is independent of the contacts 722, for retaining the dial control relay R560 connected to the dial conductor C794 during the operated period of the ring control relay R720.

The toll operator at position 125 now restores her ring key and thereby removes battery potential from the winding of the ring relay R740 in order to restore the relay to normal. As soon as the relay R740 restores, it interrupts the circuit for the slow-to-release relay R720, at its contacts 745, and, at its contacts 744, it substitutes ground potential on the dial conductor C794 for the battery potential connected thereto through the winding of the relay R560. This ground potential is applied to the conductor C794 by way of contacts 596, 723, 663, 744, 611, 522, 551, 571 and 593. Shortly after the ground potential is applied to the EC conductor C794, the slow-to-release relay R720 fully restores to normal and, at its contacts 722, it replaces battery potential through the winding of the relay R560 on the EC conductor C794 for the ground potential applied thereto via the contacts 723. As previously noted, the battery potential is connected to the dial conductor C794 via the winding of relay R560, the contacts 722, 611, 522, 551, 571 and 593. In this manner, a short pulse of ground potential, determined by the slow-to-release time period of relay R720, is applied to the dial conductor C794 in order to momentarily operate the dial control relay R940 in the two-way trunk 210.

Referring now to the two-way trunk 210, it will be seen that when the short ground pulse is applied to the dial conductor C794 in the two-way trunk 204, a circuit is completed via the dial conductor C883, the contacts 1032, 921, 1054 and 992 and the winding of the dial control relay R940, to battery. The relay R940 momentarily operates and, at its contacts 941, momentarily interrupts the holding circuit for the pulse-in relay R1110 and the latter relay, at its contacts 1111 momentarily disconnects the EC conductor C1188 from the winding of the marginal relay R1060. It may be well to mention at this time that the pulse-in relay R1110 also interrupts the circuit for the incoming hold relay R1070, at its contacts 1112, but due to the slow-to-release characteristics of relay R1070, it remains in its operated position during the momentary restoration of the pulse-in relay R1110. The momentary interruption of the circuit including the EC conductor C1188 controls the succeeding switches in the central office 100 to rering the called subscriber or, if the called party is the toll operator at position 2200 to transmit an "on hook" supervisory signal. The called subscriber will answer the call in the usual manner. If the recall is to the operator at position 2200, the operator thereat may now reconnect her headset to the connection in the usual manner and converse with the toll operator at position 125 in the distant automatic exchange 203.

RELEASE

The above described connection including the two-way trunks 204 and 210 is held under control of the calling operator at position 125 in the distant automatic exchange 203. Consequently, the release of the switching apparatus and the two-way trunks 204 and 210 included in the connection is under the exclusive control of the calling toll operator. When the called subscriber at substation T1 releases the connection, by replacing the receiver on the switchhook of the associated telephone instrument, an "on hook" supervisory signal is transmitted to the calling toll operator at position 125, in the manner described above. It will be recalled that the "on hook" supervisory signal is transmitted as a result of the substitution of a low resistance ground potential for the high resistance ground potential applied to the EC conductor C1188. This causes the operation of the marginal relay R1060 and the latter relay, at its contacts 1061, causes the restoration of the stop dial relay R1050. The last mentioned relay, at its contacts 1054 and 1055, transfers the dial conductor C883 from battery potential through the winding of the dial control relay R940 to ground potential through the winding of the pulse-in relay R1110. The substitution of ground potential on the dial conductor C883 in the two-way trunk 210 operates the relay R560 in the trunk 204. The relay R560, in turn, at its contacts 562, interrupts the circuit for the supervisory control relay R660 and the latter relay, upon restoring, relaces the low resistance ground potential for the high resistance ground potential applied through the windings of relay R610 to the EC conductor C788. As soon as the low resistance ground potential is placed on the EC conductor C788, the toll operator at position 125 will receive a steady "on hook" supervisory signal indicative of the fact that the called substriber has disconnected.

The operator at position 125 now releases the connection in the manner described in the previously mentioned Balzer application and thereby interrupts the circuit, including the EC conductor C788, for the pulse-out relay R610. The relay R610 now restores to normal and, at its contacts 613, interrupts the circuit for the outgoing hold relay R620 which also restores to normal. During the restoration of the slow-to-release relay R620, a circuit is completed via its contacts 624 for momentarily operating the relay R650. However, the momentary operation of the relay R650 is of no inmportance at the present time. As a further result of the restoration of the relay R620, at its contacts 623, it interrupts a locking circuit for the upper winding of the outgoing hold slave relay R540 which also restores to normal.

As a further result of the restoration of the pulse-out relay R610, as noted above, at its contacts 611, it disconnects the dial control relay R560 from the circuit including the dial conductor C794 over which the pulse-in relay R1110 in the two-way trunk 210 is operated. Consequently, the pulse-in relay R1110 and the dial control relay R560 are restored to normal. Finally, the release of the connection by the operator at position 125 removes ground potential from the C conductor C787 in the two-way trunk 204 and thereby interrupts the circuits for the outgoing seizure relay R520. The latter relay now restores to normal. The two-way trunk 204 is now fully restored and is available for other calls.

Referring now to the two-way trunk 210, it will be seen that when the pulse-in relay R1110 restores to normal as described above, it interrupts, at its contacts 1112, the circuit for the incoming hold relay R1070 and, at its contacts 1111, it disconnects the marginal relay R1060 from the EC conductor C1188. The relay R1070 now restores to normal and, at its contacts 1073, it removes the busy marking ground potential from the C conductor C1185 in the cable 1181; at its contacts 1074, it removes the holding ground potential from the C conductor C1187 and the locking ground potential from the winding of the supervisory control relay R970; and at its contacts 1071, it interrupts the operating circuit for the incoming hold slave relay R1120. In response to the interruptions of the circuits including the C and EC conductors C1187 and C1188 in the cable 1182, the switching apparatus in the central office 100 which has been utilized in the above described telephone connection now restore to normal. As soon as the incoming hold slave relay R1120 restores, it interrupts, at its contacts 1122, the circuit for the stop dial relay R1050 and the latter relay, if it is in its operated position at the present time, will now restore to normal. Finally, at its contacts 1124, the relay R1120 interrupts the circuit for the control relay R1080 which also restores to normal if it has been operated. The two-way trunk 210 is now fully restored to normal and is available for other calls.

*Night transfer of calls from the central office 100*

Figure 2:
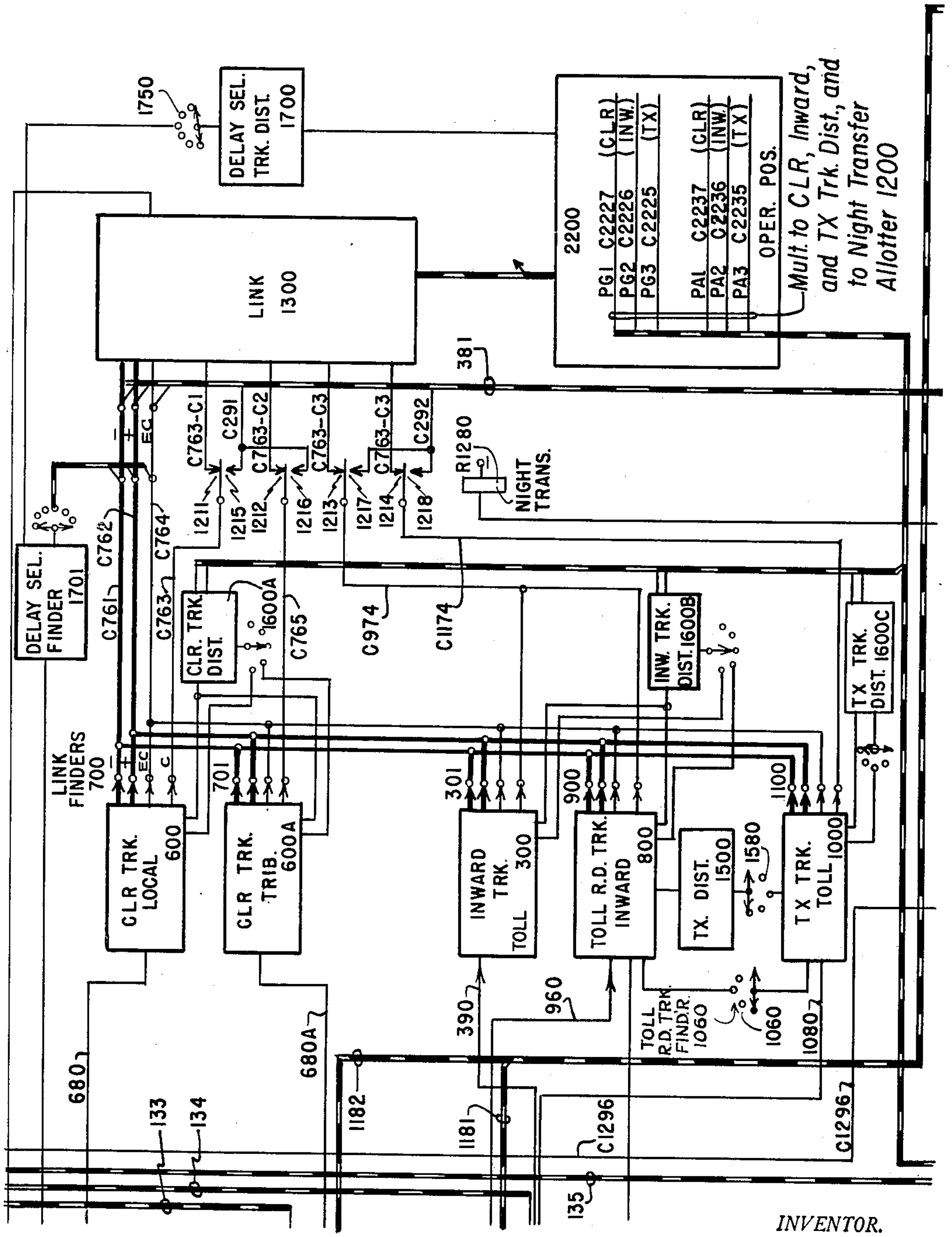
Referring now to Fig. 2 of the drawings, it should be understood that the dial toll switchboard in the central office 100 includes a plurality of operator positions such as the operator position 2200 and each position includes a plurality of link circuits, such as the link 1300. It should also be understood that each operator position may be selectively conditioned to handle one or more of three different classes of toll service or may be selectively conditioned to handle all three classes of toll service. More specifically, each operator position, when selectively conditioned for universal operation may answer connections received over the CLR trunks, such as the trunks 600 and 600A, from the local subscribers in the central office 100; it may also handle toll calls received over the inward and toll ring-down trunks, such as the trunks 300 and 800, from the distant exchanges, and it may also handle TX calls which are received over the TX trunks, such as the trunk 1000. Each of the trunks noted above are provided with link finders, such as 700, 701, 301, 900 and 1100 which are governed in accordance with the trunk distributors 1600A, 1600B and 1600C to distribute the calls to the operator position 2200 by means of the links associated with the position. More specifically the CLR trunk distributor 1600A is arranged to distribute the CLR calls received on the CLR trunks 600 and 600A by way of the link finders 700 and 701 and the link 1300 to the operator position 2200. Also, the inward trunk distributor 1600B is arranged to distribute both inward toll and ring-down toll calls received on the inward trunk 300 and the toll ring-down trunk 800 by way of the link finders 301 and 900 and the link 1300 to the operator position 2200. Finally, the TX trunk distributor 1600C is arranged to distribute TX calls received on the TX trunk 1000 via the link finder 1100 and the link 1300 to the operator position 2200.

The operation of the circuits in the central office 100 to automatically transfer toll calls, intended for the operator at position 2200, to the toll operator at position 125 in the distant automatic exchange 203 will now be described. During the light traffic periods, for example, during the early morning hours, the dial toll board including the operator position 2200 in the central office 100 may be removed from service by the actuation of the night transfer key K423 shown in Fig. 4. During the normal operation of the switching apparatus in the central office 100, the link finders associated with the various toll trunk circuits having access to the dial toll board are automatically operated to route toll calls received on the toll trunks to idle links, such as the link 1300, associated with the operator position 2200. All of the link finders associated with the toll trunks also have access via associated bank contacts to the two-way trunk circuits, such as the two-way trunk 210, provided in the central office 100. However, during normal daytime traffic, the night transfer relay R1210 (Fig. 2) is in its normal position and the C conductors C763, C765, C974 and C1174, accessible to the link finders 700, 701, 301, 900 and 111, are connected respectively via the contacts 1211 to 1214 inclusive, of the night transfer relay R1210 to the conductors C763–C1 to C763–C4, inclusive, extending to the link 1300. The individual C conductors are connected in the manner illustrated and described in the previously mentioned Balzar application to signal the toll operator at position 2200 and give her a distinct indication of the different classes of the toll call received at her position. Also, the three trunk distributors 1600A to 1600C, inclusive, are normally governed to distribute the various classes of toll calls received on the above mentioned toll trunk circuits to the operator positions at the toll board that are conditioned to handle the different classes.

When the night transfer key K423 is operated, the transfer relay F340 completes a circuit, at its contacts 431, for operating the night transfer relay R1210. At its contacts 1215 to 1218, inclusive, the relay R1210 transfers the C conductors C763, C765, C974 and C1174 from the link 1300 to the cable 321 extending to the two-way trunk 210. It should be understood, however, that only the two-way trunk circuit 210 has been illustrated and that the link finders 700, 701, 301, etc. associated with the trunks 600, 600A, 300 etc. have access via the associated bank contacts to other two-way trunk circuits in the central office 100. Consequently, other night transfer relays, such as relay R1210, are provided to transfer the corresponding C conductors to the other two-way trunk circuits in the exchange.

As a further result of the operation of the transfer relay R430, it prepares, at its contacts 433 and 436 to 438, inclusive, circuits for controlling respectively the information, toll, TX and local, relays R460, R445, R450 and R455. The last mentioned relays are provided for the purpose of controlling respectively the information, toll, TX and local gate control relays R485, R470, R475 and R480 so that the above mentioned classes of calls will be routed over a two-way trunk, such as the two-way trunk 210, to the toll operator at position 125 in the distant automatic exchange 203 in a predetermined order. Consequently, the night transfer allotter 1200 will operate to distribute the different classes of calls over the two-way trunks in a definite predetermined order.

As a further result of the operation of the transfer relay R430, at its contacts 435, it completes an obvious circuit for operating the gate relay D440. The gate relay R440 at its contacts 442, 443, and 444, connects the windings of the relays R445, R450 and R455 to the PG2 conductor C2226, the PG3 conductor C2225 and the PG1 conductor C2227 respectively. Also, at its contacts 441, the relay R440 connects the information relay R460 by way of the contacts 433 to the start conductor C1296. In response to the above described operations, the night transfer allotter 1200 is conditioned to control the trunk distributors 1600A, 1600B and 1600C to distribute calls received on the associated trunk circuits to the idle two-way trunk circuits, such as the two-way trunk circuit 210. Also the night transfer alotter is conditioned to distribute both local and toll information calls received on the information circuits 115 and 116 via the concentration units 215 and 215A to idle two-way trunk circuits.

*Transfer of toll calls intended for the dial toll board in the central office 100*

When an incoming toll call is received on any one of the toll trunks 600, 600A, 300 etc. it is marked for answering in the banks of the associated trunk distributor. The trunk distributor is then controlled in the manner described in the previously mentioned Balzer application to locate the calling toll trunk and it applies ground potential to one of the PG conductors C2227, C2226 or C2225, depending upon whether the trunk distributor utilized in finding the calling trunk is associated with the CLR trunks 600 and 600A, the inward and ring toll trunks 300 and 800 or the TX trunk 1000. In other words, the PG1 and PG2 and PG3 conductors C2227, C2226 and C2225 correspond respectively to the CLR trunk distributor 1600A, the inward trunk distributor 1600B and the TX trunk distributor 1600C. The ground potential applied to any one of the above mentioned PG conductors via the associated trunk distributor completes an operating circuit for the corresponding local, toll or TX relay R455, R445 or R450. As soon as one of the above named relays is operated, it completes a locking circuit for itself, which is independent of the contacts on the gate relay R440, to the PG conductor which has been grounded by the corresponding trunk distributor.

It will be assumed for the present description that a call has been received on the inward toll trunk 300 and that the inward trunk distributor 1600B has applied ground potential to the PG2 conductor C2226. This ground potential completes an operating circuit for the toll relay R445 via the contacts 436 and 442. In response to its operation, the relay R445 locks itself via its contacts 448 and the contacts 446 to the grounded PG2 conductor C2226. As a further result of the operation of relay R445, it interrupts the circuit for the gate control relay R440, at its contacts 446, and, at its contacts 447, it completes a circuit for operating the toll gate control relay R470. The gate relay R440 now restores to normal and, at its contacts 442, 443 and 444, it disconnects the PG1, PG2 and PG3 leads from the relays R455, R445 and R450 thereby to prevent the marking of calls on another class in the night transfer allotter 1200 until those already marked for answering on the inward trunks, such as the inward trunk 300, have been transferred via a two-way trunk to a toll operator in the distant automatic exchange 203. Also, at its contacts 441, the relay R440 interrupts the circuit for the information relay R460 to prevent the latter relay from being operated to transfer either a local or a toll information call to an idle two-way trunk.

The circuit for operating the toll gate control relay R470 may be traced from ground via the contacts 447, the winding of the relay R470, the contacts 471, and then via the chain circuit including all of the terminals on the terminal block 495 and the normally closed contacts 473, 478, 483 and 489 and battery potential connected to the CB terminal on the terminal block 495. As soon as the relay R470 begins to operate, it closes its "X" contacts 472 before opening its contacts 471 and thereby completes a locking circuit for itself which includes the CI-1 and CB terminals on the terminal block 495. As soon as the relay fully operates, the contacts 471 and 473 are opened thereby to interrupt the previously described chain circuit including the normally closed contacts on the relays R475, R480 and R485. Finally, at its contacts 474, the relay R470 applies ground potential via the contacts 492 to the PA2 conductor C2236 extending to the trunk distributor 1600B. The ground potential applied to the PA2 conductor C2236 causes the trunk distributor 1600B to control the inward trunk 300 on which the call is waiting to be transferred and thus indicates that an outgoing two-way trunk 210 is available.

It should be noted that the all-trunks-busy relay R490 in the night transfer allotter 1200 is retained in its operated position by ground potential applied to the common all-trunks-busy conductor C914 by idle ones of the two-way trunk circuits, such as the two-way trunk circuit 210. In the two-way trunk 210 ground potential is maintained on the ATB conductor C914 by way of the contacts 954, 1113, 1133, 1125, 1035 and 877 as long as the trunk circuit is in an idle condition. In addition to the foregoing, the ATB conductor C857 is multipled to the other two-way trunk circuits in the central office 100, in the same manner as illustrated in the two-way trunk 210. Consequently all idle two-way circuits apply ground potential to the ATB conductor C914 in order to retain the all-trunks-busy relay R490 in its operated position. When all of the two-way trunks are busy the relay R490 restores and thus prevents the allotter 1200 from distributing any calls.

Before describing the operation of the inward toll trunk 300 whereby it controls the associated link finder 700 to search for and find an idle outgoing two-way trunk, such as the trunk 210, a description will be given of the operations of the gate control relays R470 to R485 for allotting the different classes of toll calls in a preferential order. When the night transfer allotter 1200 is conditioned for operation by actuation of the night transfer key K423, the toll, TX, local and information relays R445, R450, R455 and R460 are conditioned to respond when a call is received and is to be distributed by the CLR, inward and TX trunk distributors 1600A to 1600C and when a local or a toll information call is received on the information circuits 116 and 115. Any one of the four relays when operated in response to a call, immediately disconnects the remaining three relays to prevent their operation. In this manner, the operated one of the relays R445 to R460 locks-in the corresponding class of calls so that all calls in that class awaiting to be answered will be distributed before a call of another class can be brought in to the allotter 1200. Under certain conditions calls may simultaneously be received for distribution on the trunk distributors 1600A, 1600B and 1600C or any combination of these distributors, as well as on the information circuits 116 and 115. In any event, it is possible to simultaneously operate two or more of the relays R445 to R460 over their associated control circuits. When two or more of these relays are simultaneously operated, the remaining unoperated relays are disconnected from the associated control conductors. In order to provide preferential distribution of the different classes of toll calls that may be simultaneously locked into the allotter in the manner described above, the toll, TX, local and information gate control relays R470 to R485 are provided. These relays are individually controllable as previously noted by contacts provided on the relays R445 to R460. However, the operating circuits for the relays R470, R475, R480 and R485 including the chain circuit previously described in connection with the operation of the relay R470. In the present example, this chain circuit is connected and arranged so that the different classes of toll calls which are to be transferred over the two-way trunk 210, or like two-way trunks, are transferred in the following order: toll calls received on the inward and toll ring-down trunks 300 and 800 are first choice and are all distributed first; TX calls received on the TX trunk 1000 are second choice and are distributed after all of the inward and toll ring-down calls have been distributed; the local calls received on the CLR trunks 600 and 600A are third choice and are distributed after the above two named classes of toll calls have been distributed; and finally the toll and local information calls received on the toll and local information circuits 115 and 116 are fourth choice and are distributed after all of the foregoing classes of calls have been distributed.

Consequently, when two or more of the gate control relays R470, R475, R480 and R485 are simultaneously operated, the particular higher rated class gate control relay will open the operating circuits for the succeeding lower rated class gate control relays. For example, if the toll, TX and local relays R470, R475 and R480 are operated simultaneously, the relay R470 being of the first choice class will lock itself in its operated position and, at its contacts 473, will open the operating chain circuits for the second and third choice classes of service in order to restore the last mentioned relays. Consequently, the operated and locked toll relay R470 will control the distribution of all toll calls awaiting to be answered on the inward and toll ring-down trunk circuits, such as 300 and 800. The same cycle of operation is performed by the remaining gate control relays to distribute the remaining classes of toll calls after the relay R470 has restored to normal. It should be understood, however, that the chain circuit including the various terminals on the terminal block 495 may be connected and arranged so that any one of the four classes of toll service may be made the first choice on the gate control relays.

Returning again to the description of operation as a result of the control of the relay R445 over the PG2 conductor C2226 by the inward trunk distributor 1600 B, it will be recalled that when the relay R445 operated it caused the gate control toll relay R470 to operate and close its contacts 474. In response to the latter operation, ground potential is applied to the PA2 conductor C2236 in order to control the inward trunk distributor 1600B to transmit a signal to the inward toll trunk 300 to indicate that an idle outgoing two-way trunk circuit, such as the trunk 210, is available. When this signal is received by the inward trunk 300, the link finder 700 is operated so that it rotates its associated wipers to search for the conductors in the associated bank contacts terminating an idle two-way trunk.

Referring now to the two-way trunk 210, it will be seen that the conductors C761, C762, C764, C291 and C292 therein are connected via the cable 382 and the cable 381 to the bank contacts accessible to the wipers of all of the link finders 700, 701, 301, 900, and 1100. It should be noted that the −, +, and EC conductors C761, C762 and C764 are also multiple connected to the link 1300 at the toll operator position 2200. It should also be noted that the C-local conductor C291 is connected via the contacts 1215 and 1216 of the operated night transfer relay R1210 to the C conductor C763, terminating in the bank contacts accessible to the link finder 700, and to the C conductors C765, terminating in the bank contacts of the link finder 701. Finally, the C toll conductor C292 is connected via the contacts 1217 and 1218 of the operated night transfer relay R1210 to the C conductor C974, terminating in the bank contacts of the link finders 301 and 900, and to the C conductor C1174, terminating in the bank contacts of the link finder 1100. In this manner, the C-local conductor C291 is only utilized in transferring local and tributary CLR toll calls received respectively on the CLR trunks 600 and 600A and that the C-toll conductor C292 is utilized in transferring toll calls received on the inward, toll ring-down, and TX trunks 300, 800 and 1100.

SEIZURE OF THE TWO-WAY TRUNK 210 IN RESPONSE TO A NIGHT TRANSFER CALL

In the two-way trunk 210, the C-local and C-toll conductors C291 and C292 are connected respectively to the local relay R880 and the toll relay R910. The trunk 210 is marked as idle as long as these conductors are not marked with ground potential.

In view of the foregoing, it will be assumed that the link finder 301 associated with the calling inward trunk 300 in searching for an idle two-way trunk engages the contacts in the associated contact bank terminating the conductors C761, C762, C764 and C974 extending to the two way trunk 210. When this occurs, ground potential is applied via the C conductors C974 to the C-toll conductor C292 extending to the two-way trunk 210. The ground potential applied to the conductor C292 is further extended via the contacts 872, 923 and 884 and the winding of the relay R910, to battery. The relay R910 now operates and, at its contacts 911, applies ground potential via the contacts 925 and 874 to the C-local conductor C291 in order to mark the two-way trunk 210 busy to the link finders 700 and 701. As a further result of the operation of the relay R910, at its contacts 913, it completes an obvious circuit for operating the night transfer relay R1090. As soon as the relay R1090 operates, it connects the − and + conductors C761 and C762 in the cable 382 from the calling inward trunk 300 to the − and + conductors C881 and C882 in the cable 813 extending to the repeating coil 891. As a further result of the operation of relay R1090, at its contacts 1093, it completes an obvious circuit for operating the dial stop relay R1050; at its contacts 1095, it applies ground potential to the C conductor C1185 in order to mark the two-way trunk 210 busy in the banks of the selectors having access thereto; and, at its contacts 1098, it completes an obvious circuit for operating the transfer slave relay R1030. In response to the operation of the transfer slave relay R1030, at its contacts 1035, it interrupts a point in the all-trunks-busy chain circuit thus indicating that the two-way trunk 210 is no longer available and, at its contacts 1036, it completes an obvious circuit for operating the signal-1 relay R810. As soon as the stop dial relay R1050 operates, it removes, at its contacts 1051, the line termination network including the resistor 994 and the condenser 995 from across the line conductors C881 and C882.

Referring now to the signal-1 relay R810, it will be seen that when it operates it completes a circuit including the contacts 811, 846, 863 and 834 for operating the signal-2 relay R820. As soon as the signal-2 relay R820 is operated, it completes, at its contacts 823, an obvious circuit for operating the slow-to-operate signal-3 relay R830 and, at its contacts 822, it connects the negative 90 volt booster battery via the contacts 1033 to the dial conductor C883 in the cable 813. It will be recalled that the dial conductor C883 is connected over a simplex circuit including the conductors C795 and C796 of the toll line 212 to the dial conductors C794 in the two-way trunk 204 in the automatic exchange 203.

As soon as the slow-to-operate signal-3 relay R830 operates, it interrupts, at its contacts 834, the circuit for the slow-to-release signal-2 relay R820 and, at its contacts 835, it locks itself in its operated position to ground at contacts 811. The slow-to-release signal-2 relay R820 now slowly restores to normal and when it is fully restored, it removes the negative 90 volt booster battery potential, at its contacts 822, from the dial conductor C883.

From the foregoing, it will be understood that a short pulse of negative 90 volt booster battery potential is applied to the conductor C883 for a time interval which is jointly determined by the operating time of the slow-to-operate signal-3 relay R830 and the release time of the slow-to-release signal-2 relay R820. This short pulse of negative 90 volt booster battery controls the two-way trunk 204 in the distant automatic exchange 203 to signal the toll operator at position 125. However, before describing the operation of the two-way trunk 204, it should be noted that when the signal-2 relay R820 restores, at its contacts 821, it connects the dial conductor C883 via the contacts 833 and 1053, the upper winding of the night supervisory relay R1130, the resistor 1144, the upper and lower windings of the marginal booster battery relay R1150 and the lower winding of the night supervisory relay R1130, to battery. Consequently, the relays R1130 and R1150 are connected to the dial conductor C883 after the transmission of the negative 90 volt booster battery so that they may respond when the operator at position 125 in the automatic exchange 203 answers the call.

Referring now to the two-way trunk 204, it will be seen that when the pulse of negative 90 volt booster battery is applied to the dial conductor C794, a circuit is completed via the contacts 593, 571, 551, 521 and 643 and the windings of the relays R710 and R680 in series, to ground. The marginal relay R710 and the pulse-in relay R680 operate as a result of the above traced circuit. The relay R680, upon operating, at its contacts 681, completes an obvious circuit for operating the incoming hold relay R690 and the latter relay, at its contacts 694, applies ground potential to the C conductor C783 and, at its contacts 696, connects battery potential via the winding of the marginal selector, seize relay R670 to the EC conductor C784. These conductors as previously described, are connected via the cable 130 to the intertoll selector 121 in the automatic exchange 203. Consequently, the selector 121 is momentarily seized in the manner previously described but performs no function on a night transfer call of the type being described. As a further result of the operation of relay R690, at its contacts 693, it applies ground potential via the contacts 772 to the C conductor C787 in the cable 132 in order to mark the two-way trunk 204 busy to the selectors having access hereto.

When the marginal booster battery relay R710 operates, it completes, at its contacts 711, an obvious circuit for operating the night transfer relay R570. As soon as the relay R570 operates it closes its "X" contacts 576 thereby to complete a locking circuit for its lower winding from ground at contacts 694. As a further result of the operation of relay R570, at its contacts 571 and 572, it transfers the dial conductor C794 from the circuit including the relays R680 and R710 to a circuit including the grounded winding of the night supervisory relay R530. At its contacts 573, the relay R570 completes an obvious circuit for illuminating the call waiting lamp L532 in order to indicate to the toll operator at position 125 that a night transfer call has been received on the two-way trunk 204 that is to be distributed to the operator position 125 for answering. At its contacts 575, the relay R570 interrupts the circuit for the incoming hold relay R690 which slowly restores to normal. Although the busy marking ground potential will be removed from the C conductor C787, when the relay R690 fully restores to normal, it will be seen that by the time the slow-to-release relay R690 has fully restored, ground potential will be retained on the C conductor C787 from contacts 554. Finally, the relay R570, at its contacts 579, connects the winding of the gate control relay R760 to the GC conductor C775 in the cable 131 extending to the trunk distributor 127 associated with the operator position 125 and the links thereat, such as the link 126.

When the short pulse of negative 90 volt booster battery is removed from the dial conductor C883 and the previously traced circuit including the upper and lower windings of the relays R1130 and R1150 is connected to the dial conductor C883 the night transfer relay R570 in the two-way trunk 204 will have been operated to connect the night supervisory relay R530 to the dial conductor C883. Consequently, the night supervisory relay R530 will now operate in series with the relays R1130 and R1150 over the dial conductor but due to the high resistance of the winding of relay R530 the relays R1130 and R1150 do not operate at this time.

Before describing the control of the night supervisory relay R530, it should be noted that the pulse-in relay R680 and the booster battery marginal relay R710 restore to normal either as a result of the removal of the negative 90 volt booster battery from the dial conductor C883 in the two-way trunk 210 or as a result of the interruption of the circuit at the contacts 571. When the night supervisory relay R530 is operated in the manner noted above, it completes an obvious circuit, at its contacts 531, for operating the night supervisory slave relay R550. The latter relay, at its contacts 554, applies ground potential via the contacts 692 and 772 to the C conductor C787 in order to retain the busy marking ground potential thereon when the slow-to-release relay R690 restores. Also at its contacts 555, the relay R550 completes a locking circuit, including the contacts 574 and 622, for retaining the relay R570 in its operated position. It should be noted at this time that the above noted locking circuit, including the upper winding of the relay R570, is completed before the slow-to-release relay R690 opens its contacts 694.

When the night transfer relay R570 initially operated and closed its contacts 579, it connected battery potential through the winding of the gate control relay R560 to the GC conductor C775 extending to the trunk distributor 127. When the trunk distributor 127 is in condition to allot the call, received on the two-way trunk 204, to a preselected link at an idle operator position, it returns ground potential over the conductor C775 in order to operate the gate control relay R760. As soon as the relay R760 operates, it completes a locking circuit for itself from ground at contacts 766 and, at its contacts 765, it disconnects the grounded conductor C775. As a further result of the operation of relay R760, at its contacts 762 and 763, it transfers the GD conductor C774 from ground to battery potential through the upper winding of the test relay R630. Also, at its contacts 761, the relay R760 removes the busy marking ground potential from the AD conductor C773 and, at its contacts 767, it applies ground potential to the start conductor C776. At this point it should be noted that the AD conductor C773 and the GD conductor C774 are connected to the bank contacts of a rotary switch in the trunk distributor 127 and that the conductors are normally grounded to mark the two-way trunk 204 busy. However, when a call is waiting to be answered on the two-way trunk 204, the busy marking ground potential is removed from the conductor C773 and a resistance battery potential is substituted for the ground potential on the conductor C774. In this manner, the two-way trunk 204 is marked as the calling two-way trunk in the banks of the rotary switch in the distributor 127. When the ground potential is applied to the start conductor C776, the trunk distributor 127 is controlled so that the rotary switch thereat operates to find the calling trunk circuit marked by the resistance battery potential applied to the conductor C774 and the absence of ground potential on the conductor C773. The rotary switch in the trunk distributor 127 stops its searching operation as soon as its wipers engage the conductors C773 and C774.

When the operator at position 125 becomes available to handle the call waiting on the two-way trunk 204 and is associated with an idle link, such as the link 126, at her position, the trunk distributor 127 is controlled to return ground potential over the GD conductor C774. The test relay R630 now operates and, at its contacts 632, it connects the C wiper 503 of the link finder 500 via the contacts 599 and the interrupter contacts 506 to the winding of the rotary magnet RM505. Also, at its contacts 631, the relay R630 connects ground potential by way of the winding of the switching relay R590 and the interrupter contacts 506 to the windings of the magnet RM505.

SEARCHING FOR AN IDLE LINK AT THE OPERATOR POSITION 125

At the outset it should be noted that the link finder 500, individually associated with the two-way trunk 204, has access via the contacts associated with the wipers 501 to 504, inclusive, to all of the links, such as the link 126, associated with the different positions of the switchboard in the automatic exchange 203. It will be assumed for the purpose of this description that the link 126 has been preselected by the operator at position 125 and that as a result thereof the C conductor C526, individual to the link, has ground potential removed therefrom to indicate that the link 126 is to be used to answer the call. It will also be assumed that all of the remaining links have a busy marking ground potential applied to their associated C conductors. Each time a busy marking ground potential is encountered by the wiper 503, a self-interrupting circuit is completed via the contacts 599, 632 and 506 for operating the magnet RM505. The magnet RM505 operates and restores in order to advance the wipers 505 to 504, inclusive, step-by-step in the well-known manner. However, when the wiper 503 engages the contact terminating the ungrounded C conductor C526, the previously described circuit including the winding of the switching relay R590 and the winding of the magnet RM505 becomes effective. As long as the wiper 503 engages a grounded contact, the above mentioned circuit for the relay R590 is short-circuited. The switching relay R590 now operates in series with the magnet RM505 but, due to the resistance of the relay, the magnet does not operate. As soon as the relay R590 operates, it completes, at its contacts 594′, a circuit including the high resistance lower winding and the low resistance upper winding of the supervisory relay R580, the wiper 504 and the EC conductor C527 in the cable 129 extending to the link 126. As a result of this circuit, the operator position equipment associated with the link 126 operates and transmits a zip-zip tone signal to the operator thereat to indicate that she is now connected to the two-way trunk 204 on which a night transfer call is waiting to be answered. At its contacts 598, the relay R590 applies ground potential via the wiper 503 to the C conductor C526 in the cable 129 in order to control the operator position equipment to illuminate a class of service lamp at the operator position and also to mark the link 126 which is now connected to the two-way trunk 204 busy to other link finders having access thereto. At its contacts 591′, the relay R590 completes an obvious locking circuit for the upper winding of the test relay R630; at its contacts 592′, it completes a holding circuit for the night supervisory slave relay R550; and, at its contacts 591 and 592, it connects the − and + line conductors C524 and C525 in the cable 129 from the operator's headset to the − and + conductors C792 and C793 of the interconnecting toll line. Also, at its contacts 593′, the relay R590 interrupts the circuit of the gate control relay R760 which now restores to normal and, at its contacts 593, it disconnects the night supervisory relay R530 from the dial conductor C794. The relay R530 accordingly, restores to normal.

As soon as the gate control relay R760 restores to normal as noted above, it removes ground potential, at its contacts 767, from the start conductor C776 and it replaces ground potential on the conductors C773 and C774, at its contact 761 and 762. As a result of the foregoing, the trunk distributor 127 is released. If other calls are waiting to be answered, the trunk distributor 127 will search for the next two-way trunk, such as the two-way trunk 204, on which a call is waiting.

TOLL OPERATOR AT POSITION 125 ANSWERS

As previously noted, the high resistance ground potential connected through the windings of the supervisory relay R580 to the EC conductor C527 controls the position equipment at the operator position 125 to give the operator thereat the zip-zip tone signal. Shortly thereafter, the position equipment returns battery potential over the EC conductor C527 in order to operate the supervisory relay R580 and thus indicate that the toll operator at position 125 has answered the call waiting on the two-way trunk 204. In response to the operation of relay R580, a circuit is completed, at its contacts 583, for operating the outgoing hold relay R620 and, at its contacts 581, it connects the dial conductor C794 to a circuit including the winding of the marginal night transfer supervisory relay R510. This circuit may be traced from the dial conductor C794 and then via the contacts 594, 581, 721 and 751 and the winding of the marginal relay R510, to ground. At the present time, the dial conductor C883 in the two-way trunk 210 is connected to battery over a circuit including the upper and lower windings of the relays R1130 and R1150. Due to the high resistance of the windings of relays R1130 and R1150, the marginal relay R510 and the booster battery relay R1150 do not operate at the present time but the relay R1130 operates. The relay R1150 is arranged to operate only in response to the application of a positive 90 volt booster battery applied to the dial conductor C883 from the two-way trunk 204.

In response to the operation of the outgoing hold relay R620, the circuit for the upper winding of the relay R570 is interrupted at the contacts 622 in order to restore the last mentioned relay to normal. As a further result of the operation of relay R620, at its contacts 623, it completes a circuit including the contacts 557 and 597 for retaining the switching relay R590 operated in series with the magnet RM505 and, at its contacts 621, it disconnects the line termination network including the resistor 625 and condenser 626 from across the − and + line conductors C792 and C793. As soon as the night transfer relay R570 restores to normal, it extinguishes the call waiting lamp L532, at its contacts 573, and, at its contacts 578, it interrupts the locking circuit for the upper winding of the test relay R630, which now restores to normal. At the present time, the two-way trunk 204 is held under control of the toll operator at position 125 over a circuit including the EC conductor C527 and the windings of the supervisory relay R580.

Referring now to the two-way trunk 210, it will be understood that when the toll operator position 125 in the automatic exchange 203 answers the call and the low resistance ground through the winding of the relay R510 is connected to the dial conductor C794 in order to operate the night supervisory relay R1130. As soon as relay R1130 operates, it completes, at its contacts 1132, a circuit including the contacts 954 and 1113 for operating the incoming hold relay R1070. The relay R1070, in turn, at its contacts 1071 completes an obvious circuit for operating the incoming hold slave relay R1120. As soon as the relay R1120 operates, it interrupts, at its contacts 1126, the previously described holding circuit for the signal-1 relay R810 which now restores to normal. Also, at its contacts 1121, the relay R1120 completes an alternate circuit, including the contacts 1033, 1121 and 1053, for connecting the windings of the relays R1130 and R1150 to the dial conductor C883. This circuit is independent of the contacts 821 and 833 on the signal relays R820 and R830. Accordingly, the low resistance ground potential returned over the dial conductor C883 is now extended via the contacts 1033, 1121 and 1053, the upper winding of relay R1130, the resistor 1144, the upper and lower windings of the marginal relay R1150 and the lower winding of the night supervisory relay R1130, to battery. The relay R1130 is retained in its operated position but the marginal relay R1150 remains in its restored position.

Referring now to the restoration of the signal-1 relay R810, it will be seen that, at its contacts 811, it interrupts the circuit for the signal-3 relay R830 which also restores to normal. At its contacts 831 and 832, the relay R830 reconnects the line conductors C761 and C762 in the cable 382 to the two-way trunk 210. Finally, at its contacts 836, the relay R830 completes a circuit for operating the tone-1 relay R840. This circuit may be traced from battery via the winding of relay R840, the contacts 1127, 865, 836, 1143 and 1037, to ground. Upon operating the relay R840, completes a locking circuit for itself including the contacts 848, 867 and 1127. As a further result of the operation of the tone-1 relay R840, at its contacts 842 and 844, it completes a circuit for transmitting a dial tone signal over the toll line 212 to the toll operator at position 125. This tone signal is transmitted via the dial tone conductor C888, the contacts 851, 842 and 1091, the — conductor C881 in the cable 813, the upper windings of the repeating coil 891, the + conductor C882 in the cable 813, the contacts 1092 and 844 and the condenser 849, to ground. In this circuit the dial tone signal is induced into the lower winding of the repeating coil 891 and transmitted over the toll line 212 to the lower windings of the repeating coil 791 in the two-way trunk 204. At this point, the tone signal is induced into the upper windings of the repeating coil 791 and transmitted over the — and + conductors C792 and C793, the contacts 591 and 592, the wipers 501 and 502 and the — and + conductors C524 and C525 in the cable 129 to the headset of the operator at position 125.

It will be seen from the following description of the operation of the tone relays R840, R850 and R860 that two relatively short pulses of dial tone are transmitted over the above described circuit to indicate to the operator at position 125 that the call that has been transferred to her position has been received from the inward trunk 300, the toll ring-down trunk 800 or the TX trunk 1000 and is accordingly classified as a toll call. Subsequently, a description will be given of the operation of these relays to transmit a single long pulse of dial tone signal to indicate to the operator at position 125 that the call transferred to her position is from the CLR trunk 600, the CLR trunk 600A or the special service information circuits 115 or 116 and is classified as a local call.

Accordingly, when the tone-1 relay R840 operates to transmit the dial tone signal to the toll line 212, it completes, at its contacts 845, an obvious circuit for operating the slow-to-operate tone-2 relay R850, and, at its contacts 847, it completes an obvious circuit for reoperating the slow-to-release signal-1 relay R810. As soon as the slow-to-operate relay R850 operates, it terminates the first pulse of the dial tone signal transmitted over the toll line 212, at its contacts 851; it completes, at its contacts 856, a further holding circuit via the contacts 1127 for the tone-1 relay R840; and, at its contacts 855, it completes an obvious circuit for operating the slow-to-operate tone-3 relay R860. As soon as the relay R860 operates, it completes, at its contacts 864, a holding circuit for itself which includes the contacts 836, 1143 and 1027. As a further result of the operation of relay R860, at its contacts 861, it again connects the dial tone conductor C888 via the contacts 852 and the previously described circuit in order to begin the transmission of the second pulse of the tone signal to the toll operator at position 125. Also, at its contacts 867, the relay R860 opens one of the holding circuits for the relay R840. Finally, at its contacts 862, the relay R860 interrupts the circuit for the tone-2 relay R850. The relay R850 now restores to normal and interrupts, at its contacts 856, the remaining holding circuit for the tone-1 relay R840 which also restores to normal. As soon as the tone-1 relay R840 restores, at its contacts 842 and 844, it terminates the transmission of the second pulse of dial tone signal to the toll operator at position 125. As a further result of the restoration of the relay R840, at its contacts 847, it interrupts the circuit for the signal-1 relay R810 which now restores to normal and completes, at its contacts 812, a circuit for operating the outgoing hold slave relay R930. At this time, it should be noted that the tone-3 relay R860 is retained in its operated position over a circuit including its contacts 864, the contacts 836, 1143 and 1037.

The circuit for operating the outgoing slave relay R930 may be traced from battery via its upper winding, the contacts 868, 812, 1129 and 1037, to ground. Upon operating, the relay R930 completes a locking circuit for its upper winding which includes the contacts 934, 1129 and 1037 and which is independent of the contacts 812 and 868 included in its original operating circuit. As a further result of the operation of relay R930, it completes, at its contacts 931, a circuit including the contacts 1031, the winding of the marginal transfer supervisory relay R1040 and the resistor 1042 for connecting battery potential to the EC conductor C674 in the cable 382 in order to transmit an "off hook" supervisory signal over the calling end of the connection to indicate that the called operator at position 125 has answered the call.

As previously described, the tone relays R840, R850 and R860 cooperate to transmit two short pulses of dial tone to indicate that the toll operator at position 125 that the call transferred to her position is classified as a toll call. The length of time that the first dial tone pulse is transmitted is determined by the operating time of the slow-to-operate relay R850. The interval of time between the termination of the first tone pulse and the transmission of the second tone pulse is determined by the operating time of the slow-to-operate relay R860. The length of time that the second pulse of dial tone is transmitted is determined by the combined releasing periods of the relays R850 and R840.

CHECKING THE TONE SIGNAL

If the toll operator position 125 should for any reason desire to recheck the tone signals which have been transmitted to her position to indicate the class of the call transferred thereto she may operate a tone check key at her position. When the toll operator operates the tone check key, battery potential is returned to the two-way trunk 204 via the + conductor C525, the wiper 502, the contacts 592, the lower winding of the retard coil 712, the contacts 731 and the winding of the slow-to-operate check relay R750, to ground. The relay R750 now operates and, at its contacts 752, it connects positive 90 volt booster battery to the dial conductor C794 in order to condition the two-way trunk 210 to repeat the transmission of the two tone signals. The positive 90 volt booster battery is transmitted over a circuit which may be traced via the contacts 595, 752, 721, 581 and 594, the dial conductor C794 and then over the simplex circuit including the toll line 212 to the dial conductor C883 in the two-way trunk 210. As soon as the positive 90 volt booster battery is applied to the dial conductor C883, the booster battery marginal relay R1150 is operated in series with the operated night supervisory relay R1130 over the previously described circuit. The relay R1150, upon operating, at its contacts 1151, completes a circuit from ground at contacts 1128 for operating the signal repeat relay R1140. At its contacts 1143, the relay R1140 interrupts the holding circuit for the tone-3 relay R860 which now restores to normal. Accordingly, the two-way trunk 210 is now in condition to control the tone relays R840, R850 and R860 in the manner previously described to repeat the transmission of the two pulses of the tone signal. However, before the repeating operation takes place, the toll operator position 125 must restore the tone check key to normal.

When the toll operator 125 restores the tone check key at her position to normal, the battery potential is removed from the + conductor C525 thereby to restore the check relay R750 to normal. When the relay R750 restores, it disconnects the positive 90 volt booster battery from the dial conductor C794, at its contacts 752, and, at its contacts 751, it reapplies ground potential through the low resistance marginal relay R510 to the dial conductor C794.

As soon as the positive 90 volt booster battery is removed from the dial conductor, the booster battery marginal relay R1150 in the two-way trunk 210 restores to normal. However, the substitution of the low resistance ground potential on the dial conductor retains the night supervisory relay R1130 in its operated position as previously noted. Upon restoring, the relay R1150 interrupts, at its contacts 1151, the circuit for the relay R1140 and the latter relay, upon restoring, at its contacts 1143, recompletes the previously described circuit for reoperating the tone-1 relay R840. In response to the reoperation of the tone-1 relay R840, the previously described cycle of operation of the relays R840, R850 and R860 is repeated to transmit the two pulses of dial tone signal over the toll line 212. At the end of the transmission of the two pulses, the tone-3 relay R860 will again be locked in its operated position, over the previously traced circuit, to ground at contacts 1037.

The toll operator at position 125 may now converse with the calling end of the connection and, if required, will complete the connection, via the link 126 and the switching apparatus in the automatic exchange 203, to the desired called subscriber. If the call is to be completed to a subscriber in the central office 100, the toll operator at position 125 may complete the connection by dialing back over the established connection including the two-way trunk 204 and 210 in order to control the switching apparatus in the central office 100.

DIAL-BACK OPERATION

It will now be assumed that the call intended for the toll operator position 2200 in the central office 100 and automatically transferred to the operator position 125 in the automatic exchange 203 is to be completed to a subscriber in the central office 100. As previously noted, the operator position 125, the link circuit 126 and the impulse sender associated with the dial toll board in the automatic exchange 203 is substantially identical to the corresponding apparatus provided in the central office 100 and is described in detail in the previously mentioned Balzer application. In order to condition the two-way trunk 210 in the central office 100 for dial-back operation, the toll operator at position 125 must control her associated impulse sender to first transmit a preliminary digit 1 followed by the numerical digits of the directory number of the called subscriber line in the central office 100. The preliminary digit 1 is registered in the impulse sender so that a single impulse will be transmitted therefrom over the EC conductor C527 to the two-way trunk 204 against a stop dialing condition thereon, which, in the present call, is the high resistance ground potential through the upper and lower windings of the operated supervisory relay R580. Consequently, the single impulse corresponding to the digit 1 transmitted by the impulse sender at the operator position 125 will cause the supervisory relay R580 to momentarily restore and open, at its contacts 581, the circuit including the winding of the marginal relay R510 and the dial conductor C794. In this manner, the preliminary digit 1 is repeated from the two-way trunk 204 to the two-way trunk 210 in the central office 100. The following impulses correspond respectively to the digits of the called subscriber directory number will also be repeated by the relay R580 from the two-way trunk 204 to the two-way trunk 210.

Referring now to the two-way trunk 210, it will be seen that in response to the first impulse transmitted over the dial conductor C794 to the dial conductor C883, the night supervisory relay R1130 will momentarily restore to normal. At its contacts 1133, the relay R1130 completes a circuit including the contacts 954, 1113, 1133 and 1124 for operating the control relay R1080. In response to the operation of relay R1080, at its contacts 1084, it prepares a point in the circuit for operating the dial-back relay R1160. At the end of the first impulse, the relay R1130 reoperates and interrupts, at its contacts 1133, the previously described circuit for the relay R1080 and, at its contacts 1132, it recompletes the circuit for the operated incoming hold relay R1080. Due to the slow-to-release characteristics of relays R1070 and R1080 they remain in their operated positions during the momentary interruption of their circuits at the contacts 1132 and 1133.

As a further result of the reoperation of relay R1130, ground potential which is extended via the contacts 954, 1113 and 1132 for retaining the relay R1070 in its operation position is also extended via the contacts 1084 (before the slow-to-release relay R1080 restores) 1091' and 1172 and the winding of the dial-back relay R1160, to battery. Relay R1160 operates over the above traced circuit and, at its contacts 1164, prepares a holding circuit for itself which includes the contacts 1128 and the winding of the digit absorbing relay R1170. The last mentioned circuit, however, is ineffective until the slow-to-release relay R1080 restores to normal and opens, at its contacts 1084, the initial operating circuit for the relay R1160.

As a further result of the operation of relay R1160, at its contacts 1163, it connects battery potential through the low resistance winding of the marginal selector seize relay R1060, the contacts 1099, 1142 and 1163 and in multiple with the contacts 1131 and 1171 to the EC conductor C1188 in the cable 1182 extending to the intermediate toll selector 110 in the central office 100. At its contacts 1161, the relay R1160 interrupts the circuit for the stop dial relay R1050 which now restores to normal and, at its contacts 1162, it completes a circuit for operating the supervisory control relay R970. The last mentioned circuit may be traced from battery through the winding of relay R970, the contacts 1083 (before the relay R1080 restores at the end of the first impulse), 927, 1162, 1141, 1097 and 1074, to ground. Upon operating, the relay R970, at its contacts 976, completes a locking circuit for itself over the previously traced circuit, which is independent of the contacts 1083.

When the marginal relay R1060 is connected to the EC conductor C1188, as noted above, the intermediate toll selector 110 is seized and a low resistance ground potential is returned over the conductor C1188 in order to operate the relay R1060. Since the stop dial relay R1050 has been restored to normal, the opening of the contacts 1061 in response to the operation of relay R1060 performs no function at the present time. In response to the restoration of relay R1050 as previously noted, at its contacts 1052, it connects the dial conductor C883 via the contacts 1033, 1121 and 1052 and the lower windings of the relays R1150 and R1130, to battery thereby to remove the resistance of the upper windings of the relays R1130 and R1150 and the resistor 1144 from the impulsing circuit and improve the speed of operation of the relay R1130. In response to the operation of the supervisory control relay R970, as previously noted, at its contacts 973, it prepares a point in an alternate circuit for subsequently reoperating the stop dial relay R1050.

When the slow-to-release control relay R1080 restores to normal at the end of the first impulse transmitted to the relay R1030, it interrupts at its contacts 1084, the previously described circuit for operating the dial-back relay R1160. As a result thereof, the short-circuit is removed from the digit absorbing relay R1170 and it now operates in series with the relay R1160. Upon operating, the relay R1170 interrupts, at its contacts 1172, an additional point in the original operating circuit for the relay R1160 and, at its contacts 1171, it interrupts a point in the multiple circuit over which the relay R1060 is connected to the EC conductor C1188. Consequently, if the toll operator at position 125 transmits a preliminary digit greater than the digit 1, the relay R1130 will follow the pulses in the manner noted above and, on the first pulse, it will operate relays R1080 and R1160 as described. However, during the subsequent pulses of the preliminary digit, the control relay R1080 remains in its operated position due to its slow-to-release characteristics and, at its contacts 1084, it will retain the short-circuit on the digit absorbing relay R1170. The relay R1170 will therefore remain in its unoperated position during the pulsing of the relay R1130 and, at its contacts 1171, will retain a short circuit on the contacts 1131 so that the pulsing of the last mentioned contacts by the relay R1130 will not cause the intermediate toll selector 110 to be falsely operated in a vertical direction in response to any of the pulses of the preliminary digit.

During the interdigital pause between the transmission of the preliminary digit 1 and the remaining impulses corresponding to the digits of the called subscriber number, the relay R1170 will be in its operated position in order to remove the short-circuit from the contacts 1131, at its contacts 1171. Each of the digits following the preliminary digit will be repeated over the EC conductor C1188 by the contacts 1131 in order to control the intertoll selector 110, the local second selector 104 and the connector 105 in the well-known manner to complete the connection to the called subscriber substation in the central office 100. In response to the first impulse of every series of digits, the relay R1080 is operated in the manner previously described and it is retained in its operated position until the end of the last impulse of each series. In its operated position, the relay R1080, at its contacts 1082, opens the circuit for the stop dial relay R1050 so that the relay R1050 will be operated in response to each restoration of the relay R1060 during impulsing. Also, at its contacts 1081, the relay R1080 short-circuits the low resistance lower winding of the relay R1150 in order further to improve the impulses transmitted over the dial conductor C883 to the relay R1130.

In the above description it was pointed out that the stop dial relay R1050 restored to normal when the preliminary pulse was transmitted to the night supervisory relay R1130 and that it completed, at its contacts 1052, a pulsing circuit for the relay R1130 which includes only its low resistance lower winding. Since the high resistance upper windings of the relays R1130 and R1150 and the resistor 1144 are now removed from the impulsing circuit including the dial conductor C883, a low resistance battery potential is returned to the two-way trunk 204 over its dial conductor C794 and operates the marginal night transfer supervisory relay R510. It should be noted that this relay is operated from the two-way trunk 210 as soon as the preliminary digit has been received thereat.

Upon operating, the relay R510, at its contacts 511, completes an obvious circuit for operating the outgoing hold slave relay R540. In response to the operation of relay R540, at its contacts 543 and 544, it substitutes a low resistance ground potential, including the upper winding of relay R580, for the high resistance ground potential, including the two windings of relay R580, on the EC conductor C527. The substitution of the low resistance ground potential for the high resistance ground potential on the EC conductor C527 returns a start dialing signal to the impulse sender at the operator position 125 instead of the stop dial signal. Consequently, the impulses of the digits following the preliminary digit will be transmitted in a normal manner and not against a stop dial condition as was the case when the preliminary digit 1 was transmitted.

In response to the first impulse of each series transmitted to the supervisory relay R580, it completes, at its contacts 582, the circuit including the contacts 612, 624 and 669 for operating the control relay R650. Due to the slow-to-release characteristics of the relay R650, it remains in its operated position during pulsing. During the interdigital pause, when the relay R580 remains in its operated position, the relay R650 slowly restores to normal. During the operated period of relay R650 it completes, at its contacts 652, the previously described circuit for operating the automatic ring cut-off relay R730; and, at its contacts 654, it completes a circuit including the contacts 562 and 542 for holding the relay R540 operated during the pulsing of relay R510. As previously described, relay R730 remains in its operated position for a short interval after the transmission of the last digit in order to prevent an automatic ring signal from being repeated to the two-way trunk circuit 210. The operations of relays R730, R740 and R720 whereby the transmission of an automatic ring signal is blocked has been described previously in connection with the setting up of a connection from the automatic exchange 203 to the central office 100.

ERROR IN DIALING

If the toll operator at position 125 makes a mistake in controlling the impulse sender to transmit the impulses of the digits of the called number or if she desires to release the switching apparatus in the central office 100 for any reason, she may operate the tone check key at her position. Operation of the tone check key connects battery potential to the positive conductor C525 and thereby operates the check relay R750. More specifically, the negative battery potential applied to the conductor C525 is extended via the wiper 502, the contacts 592, the lower winding of the retard coil 712, the contacts 731 and the winding of relay R750, to ground. In response to the operation of relay R750, at its contacts 751 and 752, it transfers the dial conductor C794 from ground potential through the winding of the marginal relay R510 to the positive 90 volt booster battery via the contacts 595. As a result of the above mentioned operations, the relay R510 restores to normal and interrupts, at its contacts 5113, the circuit for the relay R540. The relay R540 will restore to normal when the locking circuit for its upper winding is opened, at contacts 654, at the end of a series of impulses. At its contacts 544 and 543, the relay R540 now substitutes the high resistance ground potential including the two windings of relay R580 to the EC conductor C527 in place of the low resistance ground potential. The high resistance ground potential on the EC conductor C527 constitutes a stop dialing condition in the impulse sender at the operator position 125 and thereby prevents transmission of any additional impulses.

The positive 90 volt booster battery potential applied to the conductor C794 in the two-way trunk 204 is transmitted over the toll line 212 to the dial conductor C883 in the two-way trunk 210.

Referring now to the two-way trunk 210, it will be seen that during the interdigital pause between the transmission of successive digits, the control relay R1080 will be in its restored position as previously described. Consequently, when the positive 90 volt booster battery is substituted for the low resistance ground potential on the dial conductor C883, a circuit is completed via the contacts 1033, 1121 and 1052, the lower winding of the marginal relay R1150 and the lower winding of the relay R1130, to battery. In this circuit the positive 90 volt booster battery retains the relay R1130 in its operated position and it causes the operation of the marginal relay R1150. Upon operating, the relay R1150, at its contacts 1151, completes a circuit including ground at contacts 1128 for operating a signal repeat relay R1140. When the relay R1140 is operated at this stage in the setting up of a connection, it disconnects, at its contacts 1141 and 1142, ground potential from the C conductor C1187 and battery potential through the winding of the marginal relay R1060 from the EC conductor C1188. In this manner, the intermediate toll selector 110 and the subsequent switches in the switch train that have been operated now restore to normal. It should be noted that at this stage of the setting up of a connection and the release thereof in the manner explained above, the operation of the relay R1140 will not control the two-way trunk 210 to retransmit the identifying tone signal indicative of the class of toll call transferred to the operator at position 125, due to the fact that a multiple circuit including the contacts 1165 has been completed for retaining the tone-3 relay R860 in its operated position. Accordingly, the contacts 1143 on the signal repeat relay R1140 perform no function when the relay R1140 is controlled to release a partially established connection.

The toll operator at position 125 may now restore the tone check key at her position to normal and thus remove the negative battery potential from the positive conductor C525 extending to the two-way trunk 204. When this occurs, the check relay R750 restores to normal and, at its contacts 751 and 752, it again reconnects the low resistance ground potential through the winding of the marginal relay R510 to the dial conductor C794 and it removes the positive 90 volt booster battery therefrom. The relay R510 now reoperates in series with the lower windings of the marginal relay R1150 and the night supervisory relay R1130 in the two-way trunk 210 but the marginal relay R1150 now restores to normal. As soon as the relay R1150 restores, it interrupts the circuit for relay R1140, at its contacts 1151. Relay R1140, in turn, now restores and, at its contacts 1141 and 1142, again seizes the intermediate toll selector 110, in the manner previously described. The toll selector 110 is now in condition to respond to subsequent impulses and the marginal relay R1060 is reoperated.

Returning again to the two-way trunk 204, it will be seen that reoperation of the marginal relay R510 operates the relay R540 and the latter relay, at its contacts 544, substitutes a low resistance ground potential for the high resistance ground potential on the EC conductor C527 thereby to transmit a start dial signal to the impulse sender at the operator position 125. It should be noted that since the operator has actuated the tone check key to release the partially established connection she also releases the impulse sender at her position and again registers therein the correct digits of the called subscriber number. However, due to the fact that the two-way trunks 204 and 210 have been previously prepared for repeating impulses, the operator need not transmit the preliminary digit 1 to the two-way trunk 204.

Before describing the operations which result from the answering of the call by the called subscriber, a description will be given of the operations which result when a stop dialing condition is encountered by one of the switches included in the central office 100.

STOP DIALING ON DIAL-BACK CONNECTION

If during the setting up of the dial-back connection via the intermediate toll selector 110 or the subsequent switches in the switch train, a stop dialing condition is encountered, the low resistance ground potential returned over the EC conductor C1177 will be replaced by a high resistance ground potential. This high resistance ground potential will cause the marginal selector seize relay R1060 to restore to normal. A stop dial control signal of the type noted will be returned over the EC conductor during the interdigital pause between the transmission of successive digits. Consequently, the relays R1080 and R1050 will be in their restored positions. Therefore, when the marginal relay R1060 restores to normal in response to the stop dial signal, it completes, at its contacts 1061, a circuit for operating the stop dial relay R1050. This circuit may be traced from battery by way of the winding of relay R1050, contacts 1041, 1022, 973, 1082, 1061 and 993 to ground. As soon as the stop dial relay R1050 operates, it transfers, at its contacts 1052 and 1053, the dial conductor C883 from the previously traced circuit including battery potential through the low resistance lower windings of relay R1130 and R1150 to a circuit including battery potential through the high resistance windings of relay R1130, the windings of relay R1150 and the resistor 1144. When this transfer is made, the high resistance battery potential returned over the dial conductor C883 causes the marginal relay R510 in the two-way trunk 204 to restore to normal. Upon restoring, the relay R510, at its contacts 511, opens a circuit for the relay R540 and the latter relay, upon restoring, at its contacts 543 and 544, substitutes a high resistance ground potential including the two windings of the relay R580 on the EC conductor C527 for the low resistance ground potential applied thereto through the upper winding of the relay R580. The substitution of the high resistance ground potential for the low resistance ground potential on the EC conductor C527 controls the impulse sender at the operator position 125 to block further transmission of impulses to the relay R580 in the two-way trunk 204. The detail operation of the impulse sender to block further transmission of impulses is described in detail in the previously mentioned Balzer application.

When the stop dialing condition is removed by the intermediate selector 110 or any subsequent switch in the switch train in the central office 100, the high resistance ground potential applied to the EC conductor C1188 is replaced by a low resistance ground potential thereby to reoperate the marginal relay R1060. Upon operating, the relay R1060, at its contacts 1061, interrupts the circuit for the stop dial relay R1050. The relay R1050 now restores to normal and, at its contacts 1052 and 1053, it replaces the low resistance battery potential through the lower windings of relays R1130 and R1150 on the dial conductor C883 and it disconnects the previously traced circuit including the four windings of the above mentioned relays. As a result of the foregoing, the low resistance battery potential applied to the dial conductor C883 causes the marginal relay R510 in the two-way trunk 204 to reoperate in series with the lower windings of relays R1130 and R1150. The relay R1130 is thus retained in its operated position and the relay R1150 is retained in its restored position.

In response to the reoperation of relay R510, the relay R540 is reoperated and, at its contacts 543 and 544, it substitutes the low resistance ground potential through the upper winding of the relay R580 for the high resistance ground potential through the two windings of relay R580 on the EC conductor C527. In response to the return of the low resistance ground potential in place of the high resistance ground potential on the EC conductor C527, the impulse sender at the operator position 125 is controlled, in the manner described in the above mentioned Balzer application, to continue the transmission of the remaining impulses corresponding to the digits of the called subscriber number.

BLOCKING AUTOMATIC RINGING CONTROL ON A DIAL-BACK CONNECTION

As previously stated, the impulse sender at the operator position 125 is arranged to transmit an automatic ringing control signal immediately after the last digit of the called number has been transmitted. Since the present call is dialed back over the two-way trunk 204 to the two-way trunk 210 and the switching apparatus in the central office 100, the called subscriber is automatically signalled when the final switch in the switch train selects the terminals of the called subscriber line. Consequently, the automatic ring blocking facilities provided in the two-way trunk 204 are employed in the dial-back connection to block the automatic ringing signal transmitted from the impulse sender.

Since the slow-to-release relay R730 is in its operated position for a short interval of time after the last digit has been transmitted by the impulse sender, the short automatic ring control pulse of negative battery transmitted over the — conductor C524 holds the relay R730 in its operated position. As soon as the battery pulse is removed by the impulse sender, the relay R730 restores to normal and, at its contacts 732, reconnects the ringing relay R740 to the negative conductor C524. In this manner, the automatic ring cut-off relay R730 prevents the relay R740 from responding to the automatic ringing control signal battery pulse transmitted over the negative conductor C524 and thus prevents the automatic ringing signal from being repeated over the toll line 212 to the two-way trunk 210 in the central office 100.

BUSY CONDITION ENCOUNTERED DURING A DIAL-BACK CONNECTION

During the setting up of the dial-back connection, it was pointed out that the impulses transmitted over the toll line 212 were repeated by the two-way trunk 210 in order to control the intermediate toll selector 110, the local selector 105 and the local connector 105 to complete the connection to the desired called subscriber. Before describing the operations which occur when the called subscriber answers a dial-back connection, a description will now be given of the operation which occurs as a result of a busy condition encountered by the above named switching apparatus during the setting up of the connection or a busy condition encountered on the called subscriber line. In either event, alternate high and low resistance ground pulses will be returned over the EC conductor C1188 to cause the intermediate restoration and operation of the marginal selector seize relay R1060. As previously noted, the alternate high and low resistance ground pulses will be transmitted at the rate of 120 impulses per minute in the event the switching apparatus encounters an all-trunks-busy condition and the pulses will be transmitted at the rate of 60 impulses per minute in the event the particular called subscriber line is busy. Each time the relay R1060 restores under control of the busy indicating pulses returned over the EC conductor C1188, it completes at its contacts 1061, the previously described circuit for operating the stop dial relay R1050. The relay R1050 also operates and restores at the same rate as the relay R1060 and, at its contacts 1052 and 1053, it alternately connects low resistance and high resistance battery potential by way of the windings of relays R1130 and R1150 to the dial conductor C883. Accordingly, alternate high and low resistance battery potential pulses are returned over the dial conductor C883 at the same rate at which the marginal relay R1060 restores and reoperates and thus transmits a flashing busy signal at 60 or 120 impulses per minute, depending upon the type of busy encountered, to the two-way trunk 204 in the distant automatic exchange 203.

Referring now to the marginal relay R510 in the two-way trunk 204, it will be recalled that this relay is normally held in its operated position from the low resistance battery potential through the lower windings of the relays R1130 and R1150 in the two-way trunk 210. Each time the high resistance battery pulse is transmitted over the dial conductor C883, the marginal relay R510 restores to normal and each time the low resistance battery potential is transmitted over the dial conductor C883, the marginal relay R510 reoperates. Each time the relay R510 restores and reoperates it momentarily interrupts the circuit for relay R520, which relay, in turn, at its contacts 543 and 544, alternately connects ground potential through the high resistance lower winding and the low resistance upper winding of the relay R580 to the EC conductor C527 extending to the operator position 125. The alternate high and low resistance pulses, transmitted back over the EC conductor C527, control the operator position equipment to give her a flashing busy signal indicative of either an all-trunks-busy condition or a called subscriber line busy condition encountered during the establishment of the dial-back connection. The calling operator at position 125 may now release the connection and attempt to complete the same at a later time.

CALLED PARTY ANSWERS THE DIAL-BACK CONNECTION

It will now be assumed that the above described dial-back connection is completed to the desired called subscriber in the central office 100 and that it is answered by the subscriber thereat. In response to the called subscriber answering the call, the switching apparatus in the central office 100 operates to substitute a steady high resistance ground potential for the low resistance ground potential applied to the EC conductor C1188. The marginal relay R1060 in the two-way trunk 210 now restores to normal and, at its contacts 1061, completes the circuit for operating the stop dial relay R1050. Upon operating the relay R1050, at its contacts 1053, substitutes a high resistance battery potential, including the four windings of relays R1130 and R1150, for the low resistance battery potential, including the low resistance lower windings of relays R1130 and R1150, on the dial conductor C883.

As a result of the foregoing, the marginal relay R510 in the two-way trunk 204 restores to normal and interrupts the circuit for the relay R540 which also restores to normal. At its contacts 543 and 544, the relay R540 replaces the low resistance ground potential, through the upper winding of relay R580, with a high resistance ground potential, through the two windings of relay R580, on the EC conductor C527. In this manner, a steady high resistance ground potential is substituted for the steady low resistance ground potential on the EC conductor C527 in order to give the operator at position 125 an "off hook" supervisory signal indicating that the called subscriber has answered the dial-back connection.

The toll operator at position 125 in the automatic exchange 203 is now connected over the toll line 212 to the two-way trunk 210 and the calling and called subscribers are interconnected through the two-way trunk 210 and to the toll line 212. Accordingly, a three way conversational connection is established between the calling and called subscriber and the toll operator position 125 through the common junction point, comprising the two-way trunk 210. In this type of dial-back connection, the toll operator at position 125 retains her link circuit 126 connected to the two-way trunk 204 so that various supervisory signals transmitted from either the calling end or the called end of the connection to the two-way trunk 210 will be repeated over the toll line 212 and the two-way trunk 204 to her position. However, the operator may disconnect her position equipment from the connection so that she may handle additional calls distributed to other links at her position.

The first branch of the conversational connection from the calling subscriber may, for example, include the switching apparatus in the distant toll center 206, the repeater 207A, the interconnecting toll line 213, the intertoll trunk 400, the intertoll selector 110, the intertoll ring control circuit 111, the intertoll selector 112, the inward trunk 300, the link finder 301, the — and + conductors C761 and C762 in the cable 381 and the cable 382 extending to the two-way trunk 210. In the two-way trunk 210 the — conductor C761 is connected via the contacts 831, 841, and 1091 to a second branch circuit including the — conductor C881 in the cable 813 and to a third branch circuit including the — conductor C1189 in the cable 1182. The + conductor C762 in the two-way trunk 210 is connected by way of the contacts 832, 882, 843 and 1092 to the second branch circuit including the + conductor C882 in the cable 813 and to the third branch circuit including the + conductor C1190 in the cable 1182. The second branch circuit including the — and + conductors C881 and C882 in the cable 813 is connected by way of the toll line 212 extending to the two-way trunk 204 the — and + conductors C792 and C793, the contacts 591 and 592, the wipers 501 and 502 and the — and + conductors C524 and C525 in the cable 129 extending to the link 126 at the operator position 125. Consequently, the operator position 125 and the calling subscriber in the distant toll center 206 may converse over the above traced talking circuit. The third branch including the — and + conductors C1189 and C1190 in the cable 1182 is connected by way of the intermediate toll selector 110, the local second selector 104 and the local connector 105 to the called subscriber substation in the central office 100.

SUPERVISION OVER A NIGHT TRANSFER DIAL-BACK CONNECTION

If the called subscriber at the central office 100 in the night transfer dial-back connection desires to recall the toll operator at the operator position 125 in the automatic exchange 203, the switchhook at the called substation may be actuated one or more times in the usual manner in order to transmit a switchhook supervisory signal. Each time the switchhook is momentarily actuated, the switching apparatus included in the central office 100 operates to replace the high resistance ground potential on the EC conductor C1188 with a low resistance ground potential in order to reoperate the marginal relay R1060 in the two-way trunk 210. It will be recalled that the marginal relay R1060 restored to normal when the called subscriber answered the call. As soon as relay R1060 operates, it interrupts, at its contacts 1061, the circuit for the dial control relay R1050 which now restores to normal. Upon restoring, the relay R1050, at its contacts 1052 and 1053, replaces the high resistance battery potential, including the four windings of relay R1130 and R1150, on the dial conductor C883 with a low resistance battery potential, including only the lower windings of these relays. Each time the switchook at the called substation is released, the high resistance ground potential is returned over the EC conductor C1188 in order to restore the marginal relay R1060. Upon restoring, the relay R1060 reoperates the stop dial relay R1050 and the latter relay, at its contacts 1052 and 1053, again replaces the high resistance battery potential on the dial conductor C883 in place of the low resistance battery potential. In this manner, the called subscriber may alternately cause low resistance and high resistance battery pulses to be transmitted over the dial conductor C883 to the marginal relay R510 in the two-way trunk 204.

The marginal relay R510 in the two-way trunk 204 operates in response to each low resistance pulse and restores in response to each high resistance pulse transmitted over the dial conductor C883 from the two-way trunk 210. As previously described, each operation of the marginal relay R510 causes the relay R540 to operate and thereby substitute, at its contacts 543 and 544, the low resistance ground potential for the high resistance ground potential applied to the EC conductor 527. The replacement of the low resistance for the high resistance ground potential on the EC conductor C527 controls the link 126 at the operator position 125 to give the operator thereat an "on hook" supervisory signal. Upon noting the "on hook" supervisory signal, the toll operator at position 125 may control the associated link 126 to reconnect her headset to the established connection and converse with both the calling and called subscribers.

If the toll operator connected to the calling end of the connection by way of the inward trunk 300 in the central office 100 desires to signal the toll operator at position 125 an "on hook" supervisory signal received at the inward trunk 300 will replace the high resistance ground potential on the EC conductor C764 in the cable 382 with a low resistance ground potential. In the two-way trunk 210, the EC conductor C764 is connected via the contacts 931 and 1031, the winding of the marginal transfer supervisory relay R1040 and the resistor 1042, to battery. The substitution of the low resistance ground potential for the high resistance ground potential on the conductor C764 operates the marginal relay R1040 and the latter relay, at its contacts 1041 interrupts the circuit for the stop dial relay R1050. At this point, it may be well to mention that an "on hook" supervisory signal transmitted from the calling end of the connection controls the marginal relay R1060 to restore the stop dial relay R1050 and that an "on hook" supervisory signal transmitted from the calling end of the connection controls the marginal relay R1040 to also restore the stop dial relay R1050. Consequently, an "on hook" supervisory signal transmitted from either the called or calling end of a night transfer dial-back connection controls the stop dial relay, in the manner described above, to substitute a low resistance battery potential, including the lower windings of relays R1130 and R1150 for the high resistance battery potential, including the four windings of relays R1130 and R1150 on the dial conductor C883. The remaining operations in the two-way trunk 204 whereby the "on hook" supervisory signal is transmitted to the link 126 at the operator position 125 is exactly the same as has been described above in transmitting an "on hook" supervisory signal from the called end of the night transfer dial-back connection.

RERINGING CALLED STATION ON A DIAL-BACK CONNECTION

If the operator at position 125 should, for any reason, find it necessary to rering the called subscriber in the central office 100, she may do so by momentarily operating the ring key at her position. The ring key momentarily applies battery potential to the — conductor C524 in the cable 129 and thereby operates the ring relay R740 in the two-way trunk 204. Upon operating, the ringing relay R740, at its contacts 741, completes a circuit, in multiple with the contacts 721, for retaining the marginal relay R510 connected to the dial conductor C794 and, at its contacts 745, it completes an obvious circuit for operating the slow-to-release ring control relay R720. The relay R720 upon operating, at its contacts 721, opens the other multiple point in the circuit for the marginal relay R510. As soon as the ringing key is restored to normal, the ring relay R740 restores and, at its contacts 741, opens the remaining multiple point in the circuit of the marginal relay R510. At this instant, ground potential through the winding of relay R510 is removed from the conductor C794 thereby to interrupt the previously described circuit including the lower windings of relays R1130 and R1150 in the two-way trunk 210. As a further result of the restoration of the ring relay R740, it interrupts the circuit for the ring control relay R720 which slowly restores to normal and, at its contacts 721, reconnects ground potential through the winding of the marginal relay R510 to the conductor C794 in order to recomplete the previously described circuit including the lower windings of the relays R1130 and R1150 in the two-way trunk 210. The length of time that the dial conductor C794 is disconnected from the winding of the marginal relay R510 is determined by the release time of the slow-to-release ring control relay R720.

Referring now to the relays R1130 and R1150 in the two-way trunk 210, it should be understood that when the dial conductor C794 in the two-way trunk 204 is interrupted in the manner noted above, the relay R1130 will momentarily restore to normal. As a result thereof, at its contacts 1131, the relay R1130 will momentarily disconnect battery potential through the low resistance winding of the marginal relay R1060 from the EC conductor C1188 extending to the intertoll selector 110. The momentary disconnection of battery potential from the EC conductor C1188 controls the switching apparatus in the central office 100 to rering the called subscriber substation. In passing, it should be noted that the momentary restoration of the relay R1130 is not long enough to permit the slow-to-release incoming hold relay R1070 to restore to normal.

RELEASE OF THE NIGHT TRANSFER DIAL-BACK CONNECTION

The night transfer dial-back connection described above including the two-way trunks 204 and 210 and the calling and called ends of the connection which are respectively connected to the two-way trunk 210 is held under control of the toll operator at position 125 over the EC conductor C527 connected to the supervisory relay R580. This relay is retained in its operated position from the operator position either over the circuit including only its low resistance upper winding or over the circuit including its low resistance upper winding and its high resistance lower winding in series. The relay R580, in turn, controls the relays in the two-way trunk 204 to hold the two-way trunk 210 in the central office 100 in its operated position over the circuit including the dial conductor C794.

When either the calling or the called end of the connection is released and transmits an "on hook" supervisory signal to the operator at position 125, in the manner previously described, the marginal relay R510 and the relay R540 repeat the "on hook" supervisory signal over the EC conductor C527 to the toll operator at position 125. In response to the steady "on hook" supervisory disconnect signal, the toll operator may connect her headset to the — and + talking conductors of the connection and ascertain whether both the calling and the called party have disconnected. If the toll operator, upon challenging the connection, should find that both the calling and called subscribers have disconnected, she may initiate the release of the switching apparatus involved in the connection by actuating a release key at her position and causing the restoration of the link 126 thereat in the manner described in the previously mentioned Balzer application.

When the link 126 restores to normal, it interrupts the circuit for the supervisory relay R580 connected to the EC conductor C527. At the present time, the relays R510, R540, R550, R580, R590 and R620 are in their operated positions. Consequently, when the supervisory relay R580 is restored under control of the operator position 125, the relays noted above all restore to their normal positions. It should be noted that, at its contacts 581, the relay R580 disconnects the marginal relay R510 from the dial conductor C794 thereby to interrupt the previously described circuit for holding the relay R1130 in the two-way trunk 210 in its operated position. The two-way trunk 204 is now in its restored position and is available in its use in extending connections from the automatic exchange 203 to the central office 210.

Referring now to the two-way trunk 210, it will be seen that when the marginal relay R510 in the two-way trunk 204 is disconnected from the dial conductor C794, the series circuit including the lower windings of the relays R1130 and R1150 is interrupted. Due to the marginal characteristics of the relay R1150, it is only operated in series with the relay R1130 when positive 90 volt booster battery is transmitted over the dial conductor. However, the relay R1130 restores to normal when the series circuit including the dial conductor C794 is interrupted. As soon as the relay R1130 restores, it interrupts, at its contacts 1132, the circuit for the incoming hold relay R1170 which also restores to normal.

As a further result of the restoration of the relay R1130, at its contacts 1131, it disconnects the battery potential through the winding of the marginal relay R1060 from the EC conductor C1188. When the relay R1070 restores, it removes ground potential, at its contacts 1074, from the C conductor C1187, and, at its contacts 1071, it interrupts the circuit for the relay R1120 which also restores to normal. In response to the removal of ground potential from the conductor C1187 and battery potential from the EC conductor C1188 in the cable 1182, the intertoll selector 110, the local second selector 104 and the local connector 105 included in the connection to the called subscriber in the central office 100 are restored to normal in a conventional manner.

As a result of the restoration of the relay R1120, at its contacts 1129, it interrupts the circuit for the outgoing hold slave relay R930 which now restores to normal. At its contacts 1128, the relay R1120 interrupts the series holding circuit for the relays R1160 and R1170 thereby to restore these relays; and, at its contacts 1121, it disconnects the dial conductor C883 from the circuit including the windings of the relay R1130 and R1150. As a result of the restoration of relay R930, at its contacts 931, it disconnects battery potential through the winding of the relay R1040 from the EC conductor C764 in the cable 382 thereby to control the release of the switching apparatus included in the connection between the calling station and the two-way trunk 210.

In the present example, it was assumed that the calling end of the connection included the inward trunk 300. Consequently, this trunk will restore to normal in response to the removal of resistance battery from the EC conductor C764 and, upon restoring, will remove ground potential from the C-toll conductor C292. The removal of ground potential from the conductor C292 interrupts the circuit for the toll relay R910. The relay R910 now restores and, at its contacts 911, removes the busy marking ground potential from the C-local conductor C291 in the cable 382 thereby to render the two-way trunk 210 available for use in transferring calls extended to the CLR trunks 600 or 600A. As a further result of the restoration of the toll relay R910, at its contacts 913, it interrupts the circuit for the night transfer relay R1090 which now restores to normal. At its contacts 1098, the relay R1090 interrupts the circuit for the transfer slave relay R1030 and, at its contacts 1095, it removes the busy marking ground potential from the conductor C1185 in the cable 1181 thereby to render the two-way trunk 210 accessible to the selectors having access thereto. The two-way trunk 210 is now fully restored to normal and is available for completing connections in either direction between the automatic exchange 203 and the central office 100.

In the foregoing description of operation, it was assumed that the night transfer connection from the central office 100 to the automatic exchange 203 automatically occurred in response to a call being received at the inward trunk 300. However, it should be understood that the operation of the system in transferring toll calls received in the central office 100 to the toll operator in the automatic exchange 203 is substantially identical whether the call is received in the inward trunk 300, the toll ring-down trunk 800 or the TX trunk 1000. The principal difference in the operation occurs in the night transfer allotter 1200 where the relays R445, R450 and R455 are selectively controlled in accordance with the particular class of the trunk noted above upon which the call is received. Furthermore, the associated gate control relays R470, R475, R480 and R485 are also selectively controlled in accordance with the particular class of the trunk circuit to control the distributors 1600A, 1600B and 1600C, in the manner previously described, to automatically route the call over the two-way trunks 210 and 204, in series, to the toll operator at position 125 in the automatic exchange 203.

NIGHT TRANSFER OF CALLS RECEIVED ON THE CLR TRUNKS 600 AND 600A

It will now be assumed that a call intended for the operator position 2200 at the dial toll board in the central office 100 has been received on the CLR trunk 600 at a time when the night transfer key K423 is in its operated position. In accordance with the previous description, the CLR trunk distributor 1600A will apply ground potential to the PG1 conductor C2227 in order to operate the local relay R455 in the night transfer allotter 1200 and thereby, at its contacts 457, operate the local gate control relay R480. In response to the operation of relay R480, ground potential is applied, at its contacts 484, to the PA1 conductor C2237 in order to control the CLR trunk distributor 1600A. The relay R480, as previously noted, permits the ground potential to be applied to the conductor C2237 only in the event that a two-way trunk, such as the two-way trunk 210 is available for a night transfer connection. The trunk distributor 1600A now causes the CLR trunk 600 to control the associated link finder 700 to search for and find the idle two-way trunk.

It will be assumed that the link finder 700 connects with the two-way trunk 210 over the conductors C761, C762, C763 and C764 and as a result thereof ground potential on the C conductor C764 is extended via the contacts 1215 on the operated night transfer relay R1210 and the C-local conductor C291 in the cables 381 and 382, to the two-way trunk 210. In the two-way trunk 210, ground potential applied to the C-local conductor C291 is extended via the contacts 874, 925, and 912 to the local relay R880. At this point, it may be well to mention that the toll relay R910 instead of the local relay R880 is operated whenever the transfer call extended to the two-way trunk 210 is received from the trunks 300, 800 or 1000 and that the local relay R880 is operated whenever the call is received from the CLR trunk 600 or 600A and the toll and local information circuits 115 and 116.

When the local relay R880 is operated, it completes, at its contacts 885, an obvious circuit for applying ground potential to the C-toll conductor C292 in order to mark the two-way trunk 210 busy to the link finders, such as 391, 900 and 1100, having access thereto. Also, at its contacts 886, the relay R880 completes a circuit for operating the night transfer relay R1090. Further operations resulting from the operation of relay R1090 are exactly the same as those previously described in connection with the seizure of the two-way trunk 210 in response to the operation of the toll relay R910. At its contacts 881, the relay R880 completes a circuit for connecting the dial tone conductor C880 to the contacts 842 thereby to by-pass the contacts 851 and 852 on the tone-2 relay R850 and the contacts 861 on the tone-3 relay R860. The by-pass circuit is provided so that the operations of the tone relays R840, R850 and R860 in the manner previously described, will transmit to the operator at position 125 in the automatic exchange 203, a single long dial tone signal instead of the two short tone pulse signals. Consequently, the toll operatior at position 125 will receive a single long tone signal when the call transferred to her position is from the CLR trunk 600 the CLR trunk 600A, or the toll and local information circuits 115 or 116, in order to distinguish the local calls of this type from the toll calls of the type previously described which transmit two short tone signal pulses.

All of the operations whereby the night transfer call is routed to the operator position 125 and completed therefrom to a called subscriber in the automatic exchange 203 or completed over a dial-back connection to the switching apparatus in the central office 100, and whereby the control and supervisory signals are transmitted between the two exchanges, are the same as those previously described in connection with the night transfer of the toll call received at the inward trunk 300.

Generally stated, the night transfer of a call received on the CLR trunk 600 to the two-way trunk 210 operates the local relay R880 and the latter relay, at its contacts 886, operates the night transfer relay N1090. The relay R1090, in turn, at its contacts 1098, operates the transfer slave relay R1030, and, at its contacts 1093, it operates the stop dial relay R1050. In response to the operation of the transfer slave relay R1030, a circuit is completed, at its contacts 1036, for operating the signal-1 relay R180. The latter relay at its contacts 811 completes a circuit for operating the signal-2 relay R820. The relay R820, upon operating, at its contacts 823, operates the signal-3 relay R830 and, at its contacts 822, it connects the negative 90 volt booster battery to the dial conductor C883 in order to operate the relays R680 and R710 in the two-way trunk 204. When the relay R830 operates, as noted above, it completes, at its contacts 834, a locking circuit for itself, and at its contacts 835, it interrupts the circuit for the signal-2 relay R820 which now restores to normal to terminate the transmission of the pulse of negative 90 volt booster battery over the dial conductor C883 to the two-way trunk 204. As a further result of the restoration of the relay R820, at its contacts 821, it connects high resistance battery potential through the upper and lower windings of both relays R1130 and R1150 to the dial conductor C883.

The momentary transmission of the negative 90 volt booster battery over the dial conductor C883 causes the relays in the two way trunk 204 to operate, in the manner previously described and extend the connection via the link finder 500 to the link 126 and to control the operator position equipment to give the operator at position 125 the zip-zip tone signal. When the toll operator answers the call, the two-way trunk 204 returns a low resistance ground potential over the dial conductor C883 to the two-way trunk 210. The relay R1130 in the two-way trunk 210 now operates and, at its contacts 1132, completes the operating circuit for relay R1070. The latter relay, at its contacts 1071, operates the relay R1120. The relay R1120, in turn, at its contacts 1126, interrupts the circuit for the signal-1 relay R810. At its contacts 811, the relay R810 now interrupts the circuit for the signal-3 relay R830 and the latter relay, at its contacts 836, completes the operating circuit for the tone-1 relay R840. At this time, the relay R840, at its contacts 842 and 844, completes the circuit, including the contacts 881, for connecting the dial tone conductor C883 to the — and + conductors C881 and C882 to start the transmission of the single long tone pulse to the toll operator at position 125. As a further result of the operation of relay R840, at its contacts 847, it recompletes the operating circuit for the relay R810 and, at its contacts 845, it operates the tone-2 relay R850. The relay R850, in turn, at its contacts 855, operates the tone-3 relay R860 which relay, at its contacts 862, interrupts the circuit for the tone-2 relay R850. The relay R850, upon restoring, interrupts the circuit for the tone-1 relay R840, at its contacts 856, and the latter relay now restores and terminates the transmission of the single long tone signal. From the foregoing, it will be clearly understood that the tone relays R840, R850 and R860 function to transmit a single long tone pulse when the local relay R880 is operated and that the function to transmit two short tone pulses when the toll relay R910 is operated so that the toll operator at position 125 can readily determine whether the call transferred to her position is classified as a local call or as a toll call.

When the signal-1 relay R810 restores to normal, as noted above, it completes, at its contacts 812, the previously described circuit for operating the outgoing hold slave relay R930. At its contacts 931, the relay R930 connects battery potential via the resistor 1042, the winding of the marginal relay R1040, and the contacts 1031 and 931 to the EC conductor C764 in the cable 382. When the resistance battery potential is returned over the EC conductor C764 the calling CLB trunk operates to connect a discriminating tone signal to the — and + conductors C761 and C762 indicative of the class of the calling station. The CYR trunk 600, for example, may be arranged so that no discriminating tone signal is transmitted, but the CLR trunk 600A may be arranged to transmit a discriminating tone signal indicative of the fact that the call thereon originated in a subexchange served by the central office 100 or at a paystation. A discriminating tone signal transmitted from the calling CLR trunk will be repeated over the talking conductors of the connection to the toll operator position 125 via the two-way trunk 210, the toll line 212 and the two-way trunk 204.

If the toll operator position 125 should desire for any reason to check the single pulse tone signal transmitted to her position indicative of a local call and also the discriminating tone signal indicative of the particular class of the particular CLR call, she may do so by operating the tone check key at her position. In response to the operation of the tone check key at her position the two-way trunk 204 will transmit a pulse of positive 90 volt booster battery over the dial conductor C794 to the two-way trunk 210 and the relays thereat will function in the manner previously described to repeat the transmission of the single pulse of dial tone signal. Incident to the reoperation of the tone relays R840, R850 and R860 to repeat the transmission of the single pulse of dial tone, the relay R850, at its contacts 854, connects battery potential via the resistor 936, the contacts 932, 854, 883 and 832 to the + conductor C762 in the cable 382 extending to the calling CLR trunk. The calling CLR trunk, such as 600A, operates in response to the pulse of resistance battery transmitted thereto to resend the discriminating tone signal to the toll operator at position 125.

From the foregoing, it will be understood that when a CLR call is transferred over the toll line 212 to the toll operator position 125, a single long pulse of dial tone is first transmitted to indicate that the call is classified as a local call. Thereafter a short pulse of discriminating tone will be transmitted, if the CLR call is transferred from the CLR trunk 600A, to indicate the particular class of the CLR call.

The remaining operations, including the establishment of a dial-back connection, stop dial, busy condition, answering, supervision, and release are substantially the same as those previously described in connection with the night transfer of a toll call from the inward trunk 300 to the operator position 125 and consequently need not be repeated.

NIGHT TRANSFER OF INFORMATION CALLS INTENDED FOR THE INFORMATION OPERATOR POSITION 114 IN THE CENTRAL OFFICE 100

A description of the operation of the toll information circuit 115 and the local information circuit 116 will now be given. At the outset, it should be understood that the toll information circuit 115 is accessible to the toll selectors, such as 112, 113 and 1430, over the —, +, C and EC conductors C1288 to C1291 in the cable 134 and that it terminates in the information operator position 114. It should also be noted that the local information circuit 116 is accessible to the local connectors, such as 105, over the —, + and C conductors C1281 to C1283, inclusive, in the cable 133 and that it also terminates in the information operator position 114.

It will be assumed that an operator in the distant toll center 203 has completed a connection via the toll line 213, the intertoll trunk 400, the intertoll selector 110, the intertoll ring control circuit 111, to the intertoll selector 112 and that the latter circuit has been operated to select the toll information circuit 115 over the conductors C1288 to C1291 inclusive, in the cable 134.

Referring now to the toll information circuit 115, it will be seen that it is marked idle to the selectors having access thereto by resistance battery applied to the C conductor C1290 and by an absence of ground potential on the said conductor. As soon as the toll information circuit 115 is seized by the preceding selector, battery potential is applied to the EC conductor C1291 to operate the supervisory relay R1240 over a circuit including its low resistance upper winding and ground potential at contacts 1247. Upon operating, the relay R1240, at its contacts 1241, completes an obvious circuit for operating the hold relay R1255. Upon operating, the relay R1255, at its contacts 1258 and 1259 removes the resistance battery potential and applies a direct ground potential to the C conductor C1290 in order to mak this circuit busy to all of the selectors having access thereto. At its contacts 1260, the relay R1255 completes a circuit including the contacts 1253 and 1271 for illuminating the answer lamp L1279 at the information operator position 114. The illuminated condition of the lamp L1279 indicates to the information operator that a toll information call has been extended to her position to be answered.

In order to answer the call, the information operator actuates the talk key K1277, individually associated with the toll information circuit 115, in order to connect her telephone circuit 1280 to the — and + conductors C1238 and C1239 and in order to operate the answer relay R1245. The last mentioned circuit includes the contacts 3 of the talk key K1277. In response to the operation of relay R1245, a circuit is completed, at its contacts 1246, for operating the control relay R1250 and, at its contacts 1248, it completes a multiple holding circuit for the relay R1255. Finally, at its contacts 1247, the relay R1245 replaces the low resistance ground potential, through the upper winding of relay R1240, on the EC conductor C1291 with a high resistance ground potential, through the lower and uper windings of the relay R1240. The substitution of the high resistance ground potential for the low resistance ground potential on the EC conductor C1291 transmits an "off hook" answer supervisory signal to the calling operator in the distant toll center 206. In response to the operation of relay R1250, as noted above, the busy marking ground potential on the C conductor C1290 is now transferred to ground at the contacts 1252 and, at its contacts 1253, the relay R1250 extinguishes the answer lamp L1279. Finally, at its contacts, 1254, the relay R1250 completes a multiple holding circuit for itself from ground at contacts 1260.

In response to the above described operations, the information operator may now converse with the calling operator at the distant call center 206 in the usual manner. If it is necessary for the information operator to answer another call, she may hold the present connection by actuating the hold key K1276A and then restore the talk key K1277 to normal. In this manner, the relay R1245 is held in its operated position from ground potential via the contacts of the hold key K1276A and the operator's telephone circuit 1280 is disconnected from the toll information circuit 115. Consequently, the toll information circuit 115 is now held in its operated position while the information operator connects her telephone circuit 1280 to answer other information calls. In order to reconnect her telephone circuit 1280 to the toll information circuit 115, the information operator actuates the talk key K1277 and then restores the hold key K1276A.

The toll information circuit 115 is held under control of the last party to release the connection. If the information operator at the operator position 114 releases first by restoring the talk key K1277 without operating the hold key K1276A, the answer relay R1245 restores to normal and, at its contacts 1247, replaces the high resistance ground potential, including the upper and lower windings of the relay R1240, in the EC conductor C1291, with a low resistance ground potential, including only the upper winding of the relay R1240 at its contacts 1246 and 1248 the relay R1245 interrupts points in the multiple holding circuits for relays R1250 and R1255. The substitution of the low resistance ground potential on the EC conductor C1291 transmits an "on hook" release supervisory signal to the distant toll center 206. The subsequent release of the connection from the distant toll center 206 interrupts the circuit for the supervisory relay R1240 which now restores to normal and interrupts at its contacts 1241, the remaining holding circuit for the hold relay R1255. As soon as the relay R1255 restores, it interrupts the remaining holding circuit for the relay R1250 which also restores to normal to again render the toll information circuit 115 available for another call.

If the connection is first released by the operator at the distant toll center 206, the relay R1240 restores, as noted above, and, at its contacts 1241, interrupts one of the holding circuits for the relay R1255. However, the relay R1255 will remain in its operated position until the information operator restores both the talk key K1277 and the hold key, K1276A. It should be noted that when the connection is first released from the distant toll center 206, the information operator does not receive a disconnect supervisory signal. However, when the information operator challenges the connection and finds that it has been released, she may restore the keys to normal, as noted above, and thereby interrupt the circuit for the answer relay R1245. Upon restoring, the relay R1245 interrupts the circuit for the relay R1255 and the latter relay, at its contacts 1260, interrupts the circuit for the relay R1260. The toll information circuit 115 is now available for other calls.

It will now be assumed that a local subscriber in the central office 100 has extended a call in the conventional manner to the local connector 105 and that the connector has been operated to connect with the conductors C1281 to C1283, inclusive, in the cable 133 in order to extend a call to the local information circuit 116. This circuit is marked idle to the connector 105 by battery potential applied through the winding of the seize relay R1230 to the C conductor C1283 and by an absence of ground potential on said conductor. When the connector seizes the local information circuit 116, it transmits the usual ringing signal over either the — or the + conductor C1281 or C1282. In either event the ringing current will be transmitted via the contacts 1211 or 1212 and the resistors 1216 or 1217 to ground potential or battery potential. The circuit illustrated in Fig. 12 is arranged for connecting either battery or ground potential to the mid-point between the resistors 1216 and 1217. If the ringing current transmitted by the connector 105 is battery connected, then the ground will be connected to the mid-point of the resistors 1216 and 1217. If the ringing current transmitted by the connector 105 is ground connected, then the mid-point of the resistors will be connected to battery. It will be assumed that the ringing current transmitted by the connector 105 is battery connected and that the mid-point of the resistors 1216 and 1217 is connected to ground. Accordingly, the ringing current transmitted over the above described circuit will cause the ring-cut-off relay in the connector 105 to operate and switch the connection through to the local information circuit 116. In response to the switch through operation of the connector, ground potential is forwarded over the C conductor C1283 in order to operate the seize relay R1230. The relay R1230 now operates and, at its contacts 1231, connects the ring-back tone conductor C1242 to the positive conductor C1282 in the cable 133 thereby to transmit a ring-back tone signal to the calling subscriber to indicate that the information operator is being signalled. As a further result of the operation of relay R1230, at its contacts 1234, it locks itself to the grounded C conductor C1283. Finally, at its contacts 1237, it completes an obvious circuit for illuminating the answer lamp L1278 associated with the local information circuit 116.

Upon noting the illuminated condition of the lamp L1278, the information operator actuates the talk key K1275 in order to connect her telephone circuit 1280 to the − and + conductors C1281 and C1282 and to complete a circuit for operating the answer relay R1220. As soon as the relay R1220 operates, it interrupts, at its contacts 1223, the circuit for the relay R1230 which slowly restores to normal and, at its contacts 1224, it completes an operating circuit for the relay R1210. As soon as the relay R1230 restores, it disconnects the ring-back tone conductor C1242, at its contacts 1231 and, at its contacts 1237, it extinguishes the answer lamp L1278. Finally, the relay R1210 upon operating, at its contacts 1211 and 1212, disconnects ground potential, through the resistors 1216 and 1217, from the − and + conductors C1281 and C1282. At its contacts 1214, the relay R1210 locks itself to the grounded conductor C1283. The information operator and the calling subscriber may now converse and when the calling subscriber has obtained the desired information, the connection may be released.

The local information circuit 116 is arranged for last party release and consequently, the control relay R1210 will be retained in its operated position from the grounded conductor C1283 if the information operator is first to disconnect or it will be retained in its operated position from ground, at contacts 1224, if the calling subscriber is first to disconnect. The restoration of the answer relay R1220 is controlled by the restoration of both the talk key K1275 and the hold key K1276. As soon as both the calling subscriber and the information operator have released, the control relay R1210 restores to normal and renders the local information circuit 116 available for additional local information calls.

In the foregoing description of operation of the toll and local information circuits 115 and 116, it was assumed that the information operator at position 114 answered the connection. If the information operator position 114 is shut down, for example, during the night hours, the night transfer key K1297 thereat may be actuated so that the information calls received at either the toll or local information circuit 115 or 116 will be automatically transferred by way of the concentration units 215 or 215A, and idle two-way trunks, such as 210 and 204, to the toll operator position 125 in the distant automatic exchange 203.

When the night transfer key K1297 is actuated it completes a circuit for operating the night transfer relay R1265. This relay, at its contacts 1268—1269 and 1270—1271, transfers the circuits for the lamps L1278 and L1279 to a common start circuit C1296 extending to the night transfer allotter 1200. At its contacts 1266—1267 and 1272—1273, the relay R1265 prepares circuits which are effective to control the concentration units 215 or 215A.

If an information call is now extended to the toll information circuit 115, the relays R1240 and R1255 operate, in the order named, as previously described. The relay R1255 at its contacts 1260 now applies ground potential via the contacts 1253 and 1270 to the start conductor C1296. At its contacts 1262, the relay R1255 removes the busy marking ground potential from the C conductor C1295 in the cable 135 in order to mark the toll information circuit 115 as calling in the banks of the special service trunk finders 1204 and 1204A associated with the concentration units 215 and 215A. The ground potential applied to the start conductor C1296 is extended by way of the contacts 432, 461, 422 and 419, the 751 conductor, and the lower winding of the start relay R350, to battery. In the above traced circuit, the unit 1 relay R415 is shown in its operated position due to the fact that it is locked operated over a circuit which may be traced from ground via its contacts 418, the winding of the relay R415, the contacts 346 and the resistor 335, to battery. At its contacts 419, the relay R415 prepares the start circuit for the concentration unit 215 so that the last mentioned unit will be selected to transfer an information call to the automatic exchange 203.

When the start relay R350 operates, as noted above, it connects the C wiper 374, of the special service trunk finder 1204 to the winding of the magnet M355. Also, at its contacts 352, the relay R350 completes a circuit including the winding of the switching relay R340 and the winding of the magnet M355. The last mentioned circuit will be short-circuited as long as the C wiper 374 encounters ground potential on the associated bank contacts. All of the above mentioned bank contacts except the one connected to the calling toll information circuit 115 will have ground potential thereon. Consequently, a self-interrupting circuit, including the contacts 356, will be completed for the magnet M355 whereby the wipers 371 to 374 inclusive, of the finder 1204 will be advanced step-by-step until the C wiper 374 encounters the ungrounded contact terminating the conductor C1295 in the cable 135. When this occurs, the short circuit will be removed from the switching relay R350 and it will operate in series with the magnet M355, but due to the resistance of the relay, the magnet M355 does not operate. When the relay R340 operates, it completes, at its contacts 345, a circuit including the contacts 334, 326, 345 and 353 and the upper winding of the relay R350 for holding the last mentioned relay in its operated position. At its contacts 347, the relay R340 completes a circuit from battery via the contacts 317, the winding of the trunk start relay R320, the contacts 347 and 354, the TST conductor, the contacts 491 and ground for operating the relay R320. It should be noted at this time that the all-trunks-busy relay R490 is retained in its operated position, as previously described, only in the event that an idle two-way trunk circuit, such as the two-way trunk 210, is available for extending a connection to the distant automatic exchange 203. Consequently, if this relay is in its operated position the trunk start relay R320 will operate over the above traced circuit in order to start the operation of the trunk finder 1205 to search for the idle-two-way trunk. As a further result of the operation of relay R340, at its contacts 346, it interrupts the previously described holding circuit for the unit 1 relay R450 which now restores to normal. As a further result of the operation of the relay R340, at its contacts 343, it connects ground potential via the C wipe 374, the conductor C1295, the contacts 1272 and 1261 and the winding of the control relay R1250, to battery. The last mentioned relay now operates and locks itself via its upper winding and the contacts 1254 and 1260, to ground. As a further result of the operation of relay R1250, at its contacts 1253, it removes ground potential from the start conductor C1296. The removal of ground potential from the start conductor C1296 interrupts the circuit for the lower winding of the relay R350 but due to the locking circuit including the upper winding of the relay, it does not restore at this time.

When the relay R415 restores to normal, as noted above, it completes, at its contacts 416, an obvious circuit for operating the chain relay R420. As soon as the chain relay R420 operates, it interrupts, at its contacts 422, a point in the previously traced start circuit for the lower winding of relay R350. Also, at its contacts 421, the relay R420 now completes a circuit including the contacts 412, the winding of the unit 2 relay R410, the TK2 conductor extending to the concentration unit 215A. If the concentration unit 215A is idle and available for use, battery potential will be returned therefrom over the TK2 to operate the relay R410. It should be noted at this time that the concentration unit 215A is wired and connected in exactly the same manner as the illustrated concentration unit 215. As soon as the relay R410 operates, it locks itself in its operated position via its contacts 413 to battery potential on the TK2 conductor in the concentration unit 215A. Also, at its contacts 411, the relay R410 interrupts the circuit for the chain relay R420 which now restores to normal and, at its contacts 414, it prepares a circuit, including the TS2 conductor, for operating the start relay (not shown) in the concentration unit 215A in response to another information call. As soon as the chain relay R420 restores to normal, it again completes, at its contacts 422, a further point in the start circuit including the conductor C1296. Since the unit 1 relay R415 is now in its restored position, the concentration unit 215A will be utilized in transferring the next information call to an idle two-way trunk.

In the above description of the operation of the concentration unit 215, it was pointed out that the trunk start relay R320 operated if an idle two-day trunk, such as 210, was available to transfer the information call. As soon as the relay R320 operates, it connects the C wiper 364 via the contacts 314, 321 and 358 to the winding of the magnet M357 of the trunk finder 1205. Also, at its contacts 322, the relay R320 completes a circuit including the contacts 344, the winding of the trunk switching relay R310, the contacts 358 and the winding of the magnet M357, to battery. The relay R310, however, is short-circuited as long as the C wiper 364 engages contacts in its banks terminating grounded C conductors, such as the conductor C291, associated with busy two-way trunks, such as the two-way trunk 210. Ground potential encountered by the wiper 364 will complete a self-interrupting circuit for the magnet M357 whereby the wipers 361 to 364, inclusive, will be advanced step-by-step until the wiper 364 engages an ungrounded contact.

For the purpose of this description, it will be assumed that the wipers 361 to 364, inclusive, engage the contacts terminating the conductors C761, C762, C764 and C291 in the cable 382 terminated in the idle two-way trunk 210. When this occurs, the short-circuit is removed from the winding of the trunk switching relay R310 and the relay now operates in series with the magnet M357, but due to the resistance of the relay, the magnet does not operate. As soon as the relay R310 operates, it completes a multiple locking circuit for itself from ground at contacts 316. As a further result of the operation of relay R310, at its contacts 311 and 312, it connects the − and + conductors C1292 and C1293 in the cable 135 from the information trunk 113 to the − and + conductors C761 and C762 in the cable 382 extending to the two-way trunk 210. At its contacts 313, the relay R310 connects ground potential by way of the winding of the hold relay R330 to the EC conductor C764 in the cable 382 extending to the two-way trunk 210 and, at its contacts 315, it connects ground potential to the C-local conductor C291 in the cable 382. Finally, at its contacts 317, the relay R310 interrupts the circuit for the trunk start relay R320 which now restores to normal.

From the foregoing description of operation, it will be understood that the information call extended to the toll information circuit 115, at a time when the information operator position 114 is arranged for night transfer service, the concentration unit 215 is controlled to find the calling toll information circuit 115 and then extend the call thereon via the trunk finder 1205 to the two-way trunk 210. As soon as the trunk finder 1205 finds the two-way trunk 210 ground potential is forwarded over the C-local conductor C291 to operate the local relay R860. The remaining operations of the two-way trunk circuit 210 and the two-way trunk circuit 204, whereby a call is automatically transferred to the toll operator position 125 in the distant automatic exchange 203, is the same as has been described previously in connection with night transfer of a CLR call received on the CLR trunk 600 in the central office 100.

When the toll information call is transferred to the operator position 125, the position equipment thereat will function to give the toll operator the usual zip-zip tone; when the toll operator answers, the two-way trunks 204 and 210 will function, in the manner described, so that a single long dial tone signal will be transmitted to the toll operator indicating that the call transferred to her position is classified as a local call; and the two-way trunk 210 will function thereafter to connect resistance battery potential via the winding of the marginal relay R1040 to the EC conductor C764 in the cable 382 to transmit an "off hook" answer supervisory signal.

Referring now to the concentration unit 215, it should be noted that when the resistance battery potential is applied to the EC conductor C764, a circuit is completed for operating the hold relay R330. In other words, the relay R330 is operated as a result of the answering of the call by the toll operator at position 125 in the automatic exchange 203. As soon as the relay R330 operates, it completes, at its contacts 333, a multiple holding circuit for the switching relay R340, at its contacts 334, it interrupts the holding circuit for the start relay R350 which now restores to normal, and, at its contact 331, it applies ground potential via the contacts 341 and the EC wiper 373 to the EC conductor C1294 in the cable 135.

Referring now to the toll information circuit 115, it will be seen that when ground potential is returned over the EC conductor C1294 in the cable 135, a circuit is completed including the contacts 1257, for operating the answer relay R1245. As soon as the relay R1245 operates, it completes, at its contacts 1246, a multiple holding circuit for the upper winding of the relay R1250 and, at its contacts 1248, it completes a multiple holding circuit for the relay R1255. Finally, at its contacts 1247, the relay R1245 replaces the low resistance ground potential on the EC conductor C1291, including the upper winding of relay R1240, with a high resistance ground potential, including the two windings of relay R1240. The substitution of the high resistance ground potential for the low resistance ground potential on the EC conductor C1291 transmits an "off hook" answer supervisory signal to the calling operator in the distant toll center 206. Accordingly, the calling operator may now converse with the answering toll operator at position 125 and may obtain the desired information.

RELEASE

The release of the present connection is under control of the last party to disconnect. It will now be assumed that the distant operator at position 125 releases the two-way trunk 204 and the two-way trunk 210, in the manner previously described in connection with the night transfer of a CLR call. During the release of the two-way trunk 210, the outgoing hold slave relay R930 therein restores to normal and, at its contacts 931, disconnects battery potential, through the winding of the marginal relay R1040, from the EC conductor C764 in the cable 382 and thereby interrupts the circuit to the hold relay R330 in the concentration unit 215. As soon as the relay R330 restores to normal, it interrupts, at its contacts 331, the previously described circuit, including the conductor C1294 in the cable 135, for the answer relay R1245 in the toll information circuit 115. The latter relay, upon restoring to normal, at its contacts 1247, substitutes a low resistance ground potential, including the upper winding of the relay R1240, for the high resistance ground potential, including the two windings of relay R1240, on the EC conductor C1291. This substitution transmits an "on hook" disconnect supervisory signal to the calling operator in the distant toll center 206.

Before describing the disconnect by the calling toll operator, it should be noted that when the relay R330, in the concentration unit 215, restores to normal, it interrupts, at its contacts 333, the holding circuit for the relay R340 which now restores to normal. At its contacts 344, the relay R340 interrupts the circuit for the trunk switching relay R310 which now restores to normal and, at its contacts 346, it applies battery potential to the conductor TK1 in order to mark the concentration unit 215 available to transfer another information call. As soon as the relay R310 restores to normal, it disconnects the —, +, and EC conductors C761, C762 and C764 in the cable 382 from the concentration unit 215, and at its contacts 315, it removes ground potential from the C-local conductor C291 in order to interrupt the circuit for the local relay R880 in the two-way trunk 210. As soon as the relay R880 restores to normal, it causes the restoration of the remaining operated relays in the two-way trunk 210 thereby to render the same available for an additional call.

Returning again to the toll information circuit 115, it will be seen that when the relay R1245 restores to normal, as previously noted, it interrupts, at its contacts 1246 and 1248, points in the multiple holding circuits for the relays R1250 and R1255. The last mentioned relays, however, are now retained in their operated positions until the calling operator at the distant toll center 206 disconnects. When the calling operator at the distant toll center 206 receives the "on hook" disconnect supervisory signal, she releases the switching apparatus in the central office 100 which has been utilized in extending the information call to the toll information circuit 115. In response to the release of the switching apparatus, the circuit, including the EC conductor C1291, is interrupted in order to restore the supervisory relay R1240. Upon restoring, the relay R1240, at its contacts 1241, interrupts the circuit for the hold relay R1255 which also restores to normal. At its contacts 1260, the relay R1255 interrupts the final holding circuit for the relay R1250 and the latter relay, upon restoring, at its contacts 1252, removes busy marking ground potential from the C conductor C1290 in order to render the toll information circuit 115 available for an additional call.

In describing the release of the connection, it was assumed that the calling operator at position 125 was first to release and that the calling operator at the distant toll center 206 released thereafter. It will now be assumed that the established connection is first released by the calling operator in the distant toll center 206. When the calling operator is first to release the connection, the switching apparatus in the central office 100 is restored to normal, as previously described, and interrupts the circuit including the EC conductor C1291 and the relay R1240. The relay R1240 now restores to normal and, at its contacts 1241, interrupts a point in one of the multiple holding circuits for the relay R1255. The restoration of relay R1240, however, does not transmit an "on hook" disconnect supervisory signal to the called operator at position 125 in the automatic exchange 203. However, the operator thereat, having served as an information operator, is in a position to challenge the connection and determine whether or not it has been released by the calling operator. The distant operator may then release the connection, in the manner noted above, and thereby cause the restoration of the hold relay R330 in the concentration unit 215. In response to the restoration of the relay R330, at its contacts 333, it interrupts the circuit for the switching relay R340. The relay R340 now restores and causes the remaining relays in the concentration unit to restore to normal, in the manner previously described. Finally, at its contacts 331, the relay R330 removes ground potential from the EC conductor C1294 thereby to cause the restoration of the relay R1245 in the toll information circuit 115. The latter relay, upon restoring, at its contacts 1248, interrupts the remaining holding circuit for relay R1255 and the latter relay, at its contacts 1260, interrupts the final holding circuit for the relay R1250. The toll information circuit 115 is now fully restored and available for another information call.

NIGHT TRANSFER OF LOCAL INFORMATION CALLS

In the above description, it was assumed that the information operator position 114 was conditioned for night transfer operation by the actuation of the night transfer key K1297 and that a toll information call extended to the toll information circuit 115 was automatically transferred via the concentration unit 215 and the two-way trunk 210 and 204 to the toll operator at position 125 in the automatic exchange 203. It will now be assumed that a local information call has been extended to the local information circuit 116, in the manner previously described, at a time when the information operator position 114 is conditioned for night transfer operation. As previously described, when the local information circuit 116 is seized by a local connector over the cable 133, the seize relay R1230 is operated in order to transmit the ring-back tone signal to the calling subscriber and to prepare the circuit for answering the information call. With the night transfer key K1297 in its operated position, the operation of the seize relay R1230 connects the lower winding of the control relay R1210 via the contacts 1235 and 1266 to the C conductor C1287 in the cable 135. Also, at its contacts 1237, the relay R1230 applies ground potential, via the contacts 1215 and 1268, to the start conductor C1296 extending to the night transfer allotter 1200. Finally, at its contacts 1233, the relay R1230 connects the winding of the answer relay R1220 to the EC conductor C1286 in the cable 135.

In response to the application of ground potential to the start conductor C1296, the start relay R350 in the concentration unit 215 is operated in order to control the special service trunk finder 1204 to rotate its wipers to search for the calling local information circuit 116, in the manner previously described. As soon as the wipers 371 to 374, inclusive, engage the contacts in the associated banks terminating conductors C1284 to C1287, inclusive, of the calling local information circuit 116, the switching relay R340 operates and terminates further rotary stepping of the wipers, at its contacts 344 the relay R340 completes the circuit for the trunk start relay R320. As a further result of the operation of the switching relay R340, at its contacts 343, it returns ground potential via the C wiper 374 and the C conductor C1287 to the local information circuit 116 in order to operate the control relay R1210. At its contacts 1211 and 1212, the relay R1210 disconnects the resistors 1216 and 1217 from the talking conductors C1281 and C1282 at its contacts 1214, it locks itself, over a circuit including its upper winding, to the grounded C conductor C1283; and, at its contacts 1215, it removes the ground potential from the start conductor C1296. The remaining operations whereby the trunk finder 1205 searches for and finds an idle two-way trunk, such as 210, is exactly the same as has been described previously. Consequently, the call extended to the local information trunk 116 is automatically transferred via the concentration unit 215 and the two-way trunks 210 and 204 to the toll operator at position 125 in the automatic exchange 203.

When the called operator answers the call, the two-way trunks 204 and 210 operate, in the manner previously described in connection with the transfer of the toll information call, to return battery potential over the conductor C764 to operate the hold relay R330 in the concentration unit 215. This relay only operates in response to the answer of the call by the toll operator at position 125. As soon as the relay R330 operates, it completes, at its contacts 331, a circuit for applying ground potential to the EC conductor C1286 extending to the local information circuit 116. Also, at its contacts 333, the relay R330 completes a holding circuit for the switching relay R340 and, at its contacts 334, it interrupts the holding circuit for the start relay R350 which now restores to normal.

Referring to the local information circuit 116, it will be seen that when ground potential applied to the EC conductor C1286, a circuit is completed, via the contacts 1233, for operating the answer relay R1220. Upon operating, the relay R1220, at its contacts 1224, completes a holding circuit for the upper winding of the control relay R1210; at its contacts 1223, it interrupts the circuit for the slow-to-release seize relay R1220 which now restores to normal; and, at its contacts 1222, it locks itself to the grounded conductor C1286. As soon as the seize relay R1230 restores to normal, it disconnects, at its contacts 1231, the ring-back tone signal to indicate to the calling subscriber that the information call has been answered. The calling subscriber may now converse with the toll operator at position 125 in the automatic exchange 203 and obtain the desired information.

The conversational connection between the calling subscribers in the central office 100 and the toll operator at position 125 in the automatic exchange 203 includes, for example, the calling subscriber substation T1, the line circuit 106, the line switch 107, the local first selector 103, the local second selector 104, the local connector 105, the − and + conductors C1281 and C1282 in the cable 133 extending to the local information circuit 116, the − and + conductors C1284 and C1285 in the cable 135, the − and + wipers 371 and 372, the contacts 311 and 312, the − and + wipers 361 and 362, the − and + conductors C761 and C762 in the cable 302 and the previously traced path including the two-way trunk 210, the toll line 212, the two-way trunk 204, the link finder 500, the cable 129, the link 126, and the operator position 125 in the automatic exchange 203.

The release of the established transferred information connection including the local information circuit 116, is substantially the same as has been described previously in connection with the release of the transferred information connection including the toll information circuit 115. In other words, the release of the local information circuit 116 is controlled by the last party to disconnect from the established connection. More specifically, when the toll operator at position 125 releases the established connection, the two-way trunk circuits 204 and 210 function in the manner perviously described, to cause the restoration of the hold relay R330 in the concentration unit 215. The remaining operations whereby the concentration unit 215 is restored to normal are the same as has been previously described. In conjunction with the restoration of the concentration unit 215, ground potential is removed from the EC conductor C1286 thereby to restore the answer relay R1220 in the local information circuit 116. The relay R1220, upon restoring, at its contacts 1224, interrupts one of the multiple holding circuits for the upper winding of the relay R1210 but the last mentioned relay does not restore to normal until the calling party releases the connection.

When the calling party replaces the receiver on the switchhook of the associated telephone instrument, the previously noted switching apparatus in the central office 100, over which the information call is extended to the information circuit 116, is restored to normal in a conventional manner and thereby removes ground potential from the C conductor C1283 in the cable 133. The removal of ground potential from the conductor C1283 interrupts the final holding circuit for the upper winding of the relay R1210 and the relay now restores to normal to render the local information circuit 116 avialable for additional calls.

If the calling subscriber should release the connection before the operator at position 125, the ground potential will be removed from the C conductor C1283, as noted above, but the control relay R1210 will remain in its operated position from the multiple holding ground at contacts 1224. The answer relay R1220 in the local information circuit 116 will be held in its operated position until the concentration unit 215 is restored to normal by the release of the connection from the operator position 125 as described above. When this occurs, ground potential will be removed from the EC conductor C1286 in response to the restoration of the hold relay R330 in the concentration unit 215. The answer relay R1220 now restores to normal and interrupts, at its contacts 1224, the remaining holding circuit for the control relay R1210. The relay R1210, upon restoring, reconditions the local information circuit 116 to be utilized in an additional call. It should be noted, however, that prior to the release of the answer relay R1220, the holding ground potential, at the contacts 1224, for the upper winding of the control relay R1210, is also extended via the contacts 1214 to the C conductor C1283 in order to maintain the local information circuit 116 busy to the selectors having access thereto until the answer relay R1220 is restored.

In the foregoing description of the operation of the toll and local information circuits 115 and 116 to automatically transfer information calls received thereon, by way of the concentration unit 215 and the two-way trunk circuits 210 and 204 to the operator position 125, it was assumed that the calling ends of the connections were not released or abandoned until after the connection was answered by the toll operator. It will now be assumed that an information call has been extended to the concentration unit 215 and that the calling end of the connection is released before the distant toll operator answers the call. Referring now to the concentration unit 215, it will be recalled that the start relay R350 is operated when a call is received on either the toll or the local information circuits 115 or 116. Thereafter, the magnet M355 controls its wipers 371 to 374, inclusive, to find and connect with the calling information circuit and, when this occurs, the switching relay R340 is operated. Operation of the switching relay R340 controls the trunk start relay R320 and the magnet M357 to further extend the connection to the toll operator position 125, via the two-way trunks 210 and 204. The answering of the connection by the toll operator, as previously noted, operates the hold relay R330 in the concentration unit 215. If the connection, extended to the toll operator is abandoned by the calling party before the hold relay R330 is operated, a circuit is completed for the release relay R325 in order to release the concentration unit 215 and the two-way trunk circuits 210 and 204.

Referring to the toll information circuit 115, it will be seen that when the calling end of the connection is released, the supervisory relay R1240 restores, in the manner previously described, and, at its contacts 1241, it opens the circuit for the hold relay R1255. The latter relay, upon restoring, disconnects the answer relay R1245, at its contacts 1257 and at its contacts 1256, it applies ground potential to the EC conductor C1294 in the cable 135. In the concentration unit 215, the ground potential applied to the conductor C1294 completes a circuit via the wiper 373, the contacts 341 and 322 for operating the release relay R325. The relay R325 upon operating, at its contacts 326, interrupts the holding circuit for the start relay R350 which also restores to normal. The latter relay, at its contacts 352, now interrupts the circuit for the switching relay R340 and the latter relay, upon restoring to normal, at its contacts 341, interrupts a circuit for the release relay R325 which also restores to normal. Finally, at its contacts 344, the relay R340 interrupts the circuit for the relay R310 and the latter relay, at its contacts 315, removes the ground potential from the C-local conductor C291 in order to restore the relay R880 and thus cause the release of the two-way trunk 210. In this manner, an information call which is abandoned, before the toll operator answers the same, causes the release of the information circuit 115, the concentration unit 215 and the two-way trunk circuit 210 and 204.

The above described operations for automatically releasing the concentration unit 215 in response to the abandonment of a call received on the toll information circuit 115 before the toll operator answers are substantially the same as the operations which occur when a call received on the local information circuit 116 is abandoned before the toll operator answers. In the local information circuit 116, however, the release of the connection by the calling subscriber, before it has been answered by the toll operator position 125, causes the restoration of the seize relay R1230. The latter relay, at its contacts 1232, applies ground potential via the contacts 1221 to the EC conductor C1286 in the cable 135 in order to operate the release relay R325 in the concentration unit 215. The remaining operations whereby the concentration unit 215 is restored to normal, are the same as have been described above in connection with the abandonment of a toll information call received on the toll information circuit 115.

In the foregoing description of the operation of the system whereby information calls received on the toll and local information circuit 115 and 116 are automatically routed via the concentration unit 215 to the two-way trunk circuit 210, it was assumed that the transfer relay R430 in the night transfer allotter 1200 was in its restored position. In other words, the start circuit, including the conductor C1296, for the concentration unit 215 was completed via the contacts 432, 461, 422 and 419 in order to operate the start relay R350. However, if the night transfer key K423 associated with the toll operator position 2200 is also in its operated position in order to transfer CLR, inward, toll ring-down and TX toll calls to the automatic exchange 203, the night transfer relay R430 is in its operated position so that the information calls will also be allotted in a predetermined order under control of the gate control relays R470, R475, R480 and R485, in the manner described hereinbefore. With the transfer relay R430 in its operated position, the start conductor C1296 from the information circuits 115 and 116 is first extended via the contracts 433 and 441 to the winding of the information relay R460. If a call is now received on either information circuit the relay R460 will operate and lock itself in its operated position via its contacts 463. Further operations now depend upon whether or not the toll relay R445, the TX relay R450 or the local relay R455 are simultaneously operated in response to the simultaneous receipt of corresponding classes of calls which are to be transferred to the automatic exchange 203. Any one or more of the relays noted above may be simultaneously operated at the present time but the gate control relays R470, R475, R480 and R485 are so arranged, by means of the locking chain circuits, that the toll relay R470 will cause the distribution of the locked-in toll calls received on the inward and toll ringdown trunks 300 and 800 to the distant exchange before any of the remaining calls can be distributed. Thereafter, the relay R470 will restore to normal and permit the TX relay R475 to operate. The latter relay will remain in its operated position until all of the locked-in TX calls received on the TX trunks 1000 have been distributed to the distant automatic exchange 203. When these calls have been distributed, the relay R475 will restore to enable the local relay R480 to operate and cause the locked-in CLR calls on the CLR trunks 600 and 600A to be distributed to the automatic exchange 203. When all of these calls have been distributed, the relay R480 will restore to normal and, at this time, the operated information relay R460 will complete a circuit via its contacts 465 for operating the gate control information relay R485. When the last mentioned relay operates and locks, it completes, at its contacts 486, a circuit, including the contacts 434, 486, 462, 422 and 419 for operating the start relay R350 in the concentration unit 215. If the information circuits 115 and 116 have calls waiting thereon to be distributed, the relays R460 and R485 will remain in their operated positions until the concentration unit 215 has distributed one of the information calls to the automatic exchange 203 and the relays R410 and R415 have cooperated to control the concentration unit 215A to distribute the information call waiting on the other information circuit. Thereafter, the starting ground potential will be removed from the conductor C1296 and cause the restoration of the information relay R460 and the gate control information relay R485 in the night transfer allotter 1200.

In the present disclosure, two separate night transfer keys K1297 and K423 have been illustrated which are associated respectively with the information operator position 114 and the operator position 2200. However, it should be understood that one master night transfer key could be provided for the entire operator switchboard. This master key can be arranged so that it will operate the night transfer relay R1265, associated with the circuits 115 and 116, and the transfer relay R430 associated with the night transfer allotter 1200. With this arrangement, all of the calls intended for the operator switchboard in the central office 100 will be automatically transferred, when the relays R1265 and R430 are operated, to the operator position 125 in the automatic exchange 203 in a predetermined order by means of the gate control relays in the night transfer allotter 1200.

While one embodiment of the invention has been described, it will be understood that various modifications may be made therein without departing from the true spirit and scope of the invention.

What is claimed is:

1. In a telephone system having first and second exchanges interconnected by a two-conductor line, a trunk circuit in each of said exchanges terminating said line, two paths connected to said first exchange trunk circuit over which connections are extended thereto, means in said first exchange trunk circuit selectively controlled in accordance with the path over which a connection is extended thereto for transmitting one of two selective controls of different potentials over the two conductors of said line to said second exchange trunk circuit, two paths connected to said second exchange trunk circuit over which connections are extended therefrom, and means in said second exchange trunk circuit controlled by one of said selective controls transmitted over said line for selecting one of said two paths connected thereto and controlled by the other of said selective controls transmitted over said line for selecting the other of said two paths.

2. In a telephone system having first and second exchanges interconnected by a two-conductor line, a trunk circuit in each of said exchanges terminating said line, two paths connected to said first exchange trunk circuit over which connections are extended thereto, first means in said first exchange trunk circuit operated responsive to a connection extended thereto over the first of said two paths for transmitting a first signal of predetermined voltage over said line to said second exchange trunk circuit, second means in said first exchange trunk circuit operated responsive to a connection extended thereto over the second of said two paths for transmitting a second type signal of another predetermined voltage over said line to said second exchange trunk circuit, two outgoing paths connected to said second exchange trunk circuit over which connections are extended therefrom, first means in said second exchange trunk circuit selectively controlled responsive to said first signal for selecting the first of said two outgoing paths, and second means in said second exchange trunk circuit selectively controlled responsive to said second type signal for selecting the second of said two outgoing paths.

3. In a telephone system having first and second exchanges interconnected by a two-conductor line, a trunk circuit in each of said exchanges terminating said line, two paths connected to said first exchange trunk circuit over which connections are extended thereto, a first source of potential, a second source of potential, first means in said first exchange trunk circuit operated responsive to a connection extended thereto for connecting said first source of potential to said line in order to transmit a first type signal to said second exchange trunk circuit, second means in said first exchange trunk circuit operated responsive to a connection extended thereto for connecting said second source of potential to said line in order to transmit a second type signal to said second exchange trunk circuit, two outgoing paths connected to said second exchange trunk circuit over which connections are extended therefrom, first means and second means in said second exchange trunk circuit connected in series to said line, said first means in said second exchange trunk circuit operated in response to said first type signal transmitted over said line for selecting the first of said two outgoing paths, and said first and second means in said second exchange trunk circuit operated in response to said second type signal transmitted over said line for selecting the second of said two outgoing paths.

4. In a telephone system having first and second exchanges interconnected by a two-conductor line, a trunk circuit in each of said exchanges terminating said line, two paths connected to said first exchange trunk circuit over which connections are extended thereto, a source of battery potential, a source of booster battery potential, first means in said first exchange trunk circuit operated responsive to a connection extended thereto for connecting said source of battery potential to said line in order to transmit a first type signal to said second exchange trunk circuit, second means in said first exchange trunk circuit operated responsive to a connection extended thereto for connecting said source of booster battery potential to said line in order to transmit a second type signal to said second exchange trunk circuit, two outgoing paths connected to said second exchange trunk circuit over which connections are extended therefrom, first means and second means in said second exchange trunk circuit connected in series to said line, said first means in said second exchange trunk circuit operated in response to said first type signal transmitted over said line for selecting the first of said two outgoing paths, and said first and second means in said second exchange trunk circuit operated in response to said second type signal transmitted over said line for selecting the second of said two outgoing paths.

5. In a telephone system having first and second exchanges interconnected by a two-conductor line, a trunk circuit in each of said exchanges terminating said line, two paths connected to said first exchange trunk circuit over which connections are extended thereto, a source of potential, a source of booster potential, first means in said first exchange trunk circuit operated responsive to a connection extended thereto for connecting said source of potential to said line in order to transmit a first type signal to said second exchange trunk circuit, second means in said first exchange trunk circuit operated responsive to a connection extended thereto for connecting said source of booster potential to said line in order to transmit a second type signal to said second exchange trunk circuit, two outgoing paths connected to said second exchange trunk circuit over which connections are extended therefrom, first means and second means in said second exchange trunk circuit connected in series to said line, said first means in said second exchange trunk circuit operated in response to said first type signal transmitted over said line, means controlled responsive to the operation of said first means in said second exchange trunk circuit for selecting the first of said two outgoing paths, said first and said second means in said second exchange trunk circuit operated in response to said second type signal transmitted over said line, and means controlled responsive to the operation of said second means in said second exchange trunk circuit for selecting the second of said two outgoing paths and for rendering operation of said first means thereat ineffective to select the first of said two outgoing paths.

6. In a telephone system having first and second exchanges interconnected by a two-conductor line, a trunk circuit in each of said exchanges terminating said line, a first and a second path over which connections are extended to said first exchange trunk circuit, each of said paths including a pair of line conductors a control conductor and an extra control conductor, means in said first exchange trunk circuit selectively controlled over the control conductor included in the path over which a connection is extended thereto for preventing the extension of a connection thereto over the other of said paths, means in said first exchange trunk circuit selectively controlled over said first path extra control conductor for transmitting a first seizure signal over said line to said second trunk circuit, additional means in said first exchange trunk circuit selectively controlled over said second path control conductor for transmitting a second seizure signal over said line to said second trunk circuit, a third and a fourth path over which connections are extended from said second exchange trunk circuit, means in said second trunk circuit selectively controlled responsive to said first seizure signal transmitted thereto for selecting said third path, and means in said second trunk circuit selectively controlled responsive to said second seizure signal transmitted thereto for selecting said fourth path.

7. In a telephone system having first and second exchanges interconnected by a two-conductor toll line, a trunk circuit in each of said exchanges terminating said toll line, a first trunk line terminating in said first exchange trunk circuit, a first automatic switch having access to said first trunk line, a second trunk line terminating in said first exchange trunk circuit, an operator position in said first exchange, a rotary switch having access to said second trunk line and to said operator position, said rotary switch controlled responsive to a connection received thereon for normally extending said connection to said operator position, means controllable by the operator at said position for operating said first automatic switch to seize said first exchange trunk circuit via said first trunk line, a first means in said first exchange trunk circuit operated responsive to seizure thereof over said first trunk line for transmitting a first type seizing signal to said second exchange trunk circuit over said toll line, means selectively controllable by the operator at said position for rendering the normal operation of said rotary switch to extend a connection to said operator position ineffective and for causing said rotary switch to directly seize said first exchange trunk circuit via said second trunk line, a second means in said first exchange trunk circuit operated responsive to said seizure over said second trunk line for transmitting a second type seizing signal to said second exchange trunk circuit over said toll line, a first trunk line terminating in said second exchange trunk circuit, a rotary switch in said second exchange trunk circuit, a second trunk line accessible to said second exchange rotary switch, means in said second exchange trunk circuit selectively controlled responsive to said first type signal transmitted thereto for seizing said second exchange first trunk line in order further to extend the connection from said first exchange rotary switch via said operator position and said first trunk line in said first exchange to said first trunk line in said second exchange, and means in said second exchange trunk circuit selectively controlled responsive to said second type signal transmitted thereto for seizing said rotary switch and for controlling said rotary switch to select said second trunk line in said second exchange in order further to extend the connection from said first exchange rotary switch via said second trunk line thereat to said second trunk line in said second exchange.

8. In a telephone system having first and second exchanges interconnected by a two-conductor toll line, a trunk circuit in each of said exchanges terminating said toll line, a first trunk line terminating in said first exchange trunk circuit, a first automatic switch having access to said first trunk line, a second trunk line terminating in said first exchange trunk circuit, an operator position in said first exchange, a non-numerical switch having access to said second trunk line and to said operator position, said non-numerical switch controlled responsive to a connection received thereat for normally extending said connection to said operator position, means controllable by the operator at said position in response to said connection for operating said first automatic switch to further extend said connection to said first exchange trunk circuit via said first trunk line, a first means in said first exchange trunk circuit operated responsive to said connection over said first trunk line for transmitting a first type seizing signal to said second exchange trunk circuit over said toll line, means selectively controllable by the operator at said position for rendering the normal operation of said non-numerical switch to extend a connection received thereat to said operator position ineffective and for causing said non-numerical switch to directly extend a connection received thereat to said first exchange trunk circuit via said second trunk line, a second means in said first exchange trunk circuit operated responsive to said connection over said second trunk line for transmitting a second type seizing signal to said second exchange trunk circuit over said toll line, a first trunk line terminating in said second exchange trunk circuit, a non-numerical switch in said second exchange trunk circuit, a second trunk line accessible to said second exchange non-numerical switch, means in said second exchange trunk circuit selectively controlled responsive to said first type signal transmitted thereto for seizing said second exchange first trunk line in order further to extend the connection received at said first exchange trunk circuit over said first trunk line in said first exchange to said first trunk line in said second exchange, and means in said second exchange trunk circuit selectively controlled responsive to said second type signal transmitted thereto for controlling said second exchange non-numerical switch to select said second trunk line in said second exchange in order further to extend the connection received at said first exchange trunk circuit over said second trunk line in said first exchange to said second trunk line in said second exchange.

9. In a telephone system having first and second exchanges interconnected by a two-conductor toll line, a trunk circuit in each of said exchanges terminating said toll line, a first trunk line terminating in said first exchange trunk circuit, a first automatic switch having access to said first trunk line, a second trunk line terminating in said first exchange trunk circuit, an operator position in said first exchange, a link at said position, an incoming toll trunk circuit provided with a rotary switch having access to said link and to said second trunk line, transfer means having a normal first position for rendering said link accessible to said rotary switch and for rendering said second trunk line inaccessible to said rotary switch and having an operated second position for rendering said link inaccessible to said rotary switch and for rendering said second trunk accessible to said second trunk line, means controlled responsive to an incoming call received on said incoming toll trunk for operating said rotary switch to extend said call to said link or to said second trunk line depending upon the position of said transfer means, means at said position controllable by the operator thereat responsive to the extension of said incoming call to said link for operating said first automatic switch to further extend said incoming call to said first trunk line, means in said first exchange trunk circuit selectively controlled over said first or said second trunk line responsive to the extension of a call thereto, means controlled by said last mentioned means for transmitting a pulse of regular exchange battery over said toll line to said second exchange trunk circuit responsive to a call on said first trunk line and for transmitting a pulse of booster battery over said toll line to said second exchange trunk circuit responsive to a call on said second trunk line, first and second trunk lines terminating in said second exchange trunk circuit, and means in said second exchange trunk circuit selectively controlled by said pulse of regular exchange battery transmitted thereto for selecting said first trunk line and selectively controlled by said pulse of booster battery transmitted thereto for selecting said second trunk line, whereby a call received at said incoming trunk in said first exchange and extended by the operator thereat to said first trunk line in said first exchange is routed via said first and second trunk circuits to said first trunk line in said second exchange and whereby a call received at said incoming trunk in said first exchange and automatically extended therefrom to said second trunk line in said first exchange is automatically routed via said first and second trunk circuits to said second trunk line in said second exchange.

10. In a telephone system, a first exchange, an incoming trunk line including an associated rotary switch in said exchange, an operator position at said exchange, means controlled responsive to a call received on said incoming trunk line for controlling said rotary switch to normally route said call to said operator position to be answered, means selectively controlled from said operator position for blocking the routing of further incoming calls to said operator position, a second exchange, an incoming trunk circuit in said second exchange including an associated rotary switch, an outgoing trunk circuit in said first exchange connected to said incoming trunk circuit in said second exchange via a two conductor toll line, means controlled responsive to a call received on said first exchange incoming trunk line after said blocking means has been selectively controlled from said first exchange operator position for operating the rotary switch associated with said incoming trunk line to automatically select said outgoing trunk circuit and for extending said incoming call to said second exchange incoming trunk circuit, a second exchange operator position including a plurality of links, and means in said second exchange incoming trunk circuit controlled responsive to the extension of said call thereto for controlling the rotary switch associated with said incoming trunk circuit to select a link at said second exchange operator position in order to extend said call thereto to be answered.

11. In a telephone system, an incoming trunk circuit terminating in a rotary switch, an outgoing trunk circuit, an operator position, a trunk line including a pair of line conductors interconnecting said rotary switch with said operator position and said outgoing trunk circuit, transfer means having a normal first position and operative to a second position, a control conductor included in said trunk line interconnecting said rotary switch and said operator position through the normal first position of said transfer means and interconnecting said rotary switch and said outgoing trunk circuit through the second position of said transfer means, means controlled responsive to a call on said incoming trunk for controlling said rotary switch to select said trunk line to complete said call to said operator position over said pair of line conductors and to signal the operator at said position over said control conductor in the event said transfer means is in its normal first position, means controlled by the operator at said position for operating said transfer means to its second position so that thereafter said rotary switch will be controlled responsive to a call on said incoming trunk to complete the call to said outgoing trunk circuit over said pair of line conductors and signal said outgoing trunk circuit over said control conductor.

12. In a telephone system, a first exchange, an incoming trunk line and an outgoing trunk line terminating in said first exchange, an operator position having a link at said first exchange, an incoming trunk circuit connected to said incoming trunk line including a rotary switch operative to extend a call received thereon to said link to be answered by the operator at said position, a second exchange terminating said outgoing trunk line, and transfer means at said first exchange selectively operated by the operator at said position for preventing said rotary switch from selecting said link and for causing said rotary switch to extend a call received on said incoming trunk circuit over said outgoing trunk line to said second exchange.

13. In a telephone system having first and second exchanges interconnected by a two-conductor line, a two-way trunk circuit in said first exchange and in said second exchange terminating said line, an operator position at each of said exchanges, means in said first exchange for normally distributing toll calls received or originated at said first exchange to said first exchange operator position, means at said first exchange operator position for completing said toll calls over said first exchange two-way trunk circuit and said two-conductor line and said second exchange two-way trunk circuit to said second exchange operator position, means selectively controlled at will by the operator at said first exchange operator position for controlling said distributing means to automatically route toll calls thereafter received or originated at said first exchange over said first exchange two-way trunk circuit and said two-conductor line and second exchange two-way trunk circuit to said second exchange operator position.

14. In a telephone system having first and second exchanges interconnected by a two-conductor line, a trunk circuit in said first exchange and in said second exchange terminating said line, an operator position at each of said exchanges, means in said first exchange for normally distributing toll calls received or originated at said first exchange to said first exchange operator position, means at said first exchange operator position for completing said toll calls distributed thereto over said first exchange trunk circuit and said two-conductor line and said second exchange trunk circuit to said second exchange operator position, means selectively controlled at will by the operator at said first exchange operator position for controlling said distributing means to by-pass said first exchange operator position by thereafter automatically routing toll calls directly over said first exchange trunk circuit and said two-conductor line and second exchange trunk circuit to said second exchange operator position.

15. In a telephone system having first and second exchanges interconnected by a two-conductor line, a two-way trunk circuit in said first exchange and in said second exchange terminating said line, an operator position at each of said exchanges, links at each of said positions, toll trunk circuits in said first exchange each having a stepping switch, means in first exchange controlled responsive to the extension of a toll call to one of said toll trunk circuits for controlling the associated stepping switch to extend said call to said first exchange operator position via a link thereat to be answered, means at said first exchange operator position for selecting said first exchange two-way trunk circuit, switching apparatus in said second exchange, said last mentioned means thereafter controlling said first exchange and said second exchange two-way trunk circuits to selectively control said second exchange switching apparatus to complete said toll call to a desired called subscriber, means selectively controlled by the operator at said first exchange operator position for preventing said stepping switches from extending toll calls received on any of said toll trunk circuits to said first exchange operator position via any of the links thereat and for connecting said first exchange two-way trunk circuit to said stepping switches, whereby the extension thereafter of a toll call to any one of said toll trunk circuits controls the associated stepping switch to select said two-way trunk circuit in said first exchange, and means in said first exchange two-way trunk circuit controlled responsive to selection thereof by one of said stepping switches for controlling said second exchange two-way trunk circuit over said two-conductor line to automatically route said last mentioned toll call to said second exchange operator position via a link thereat to be answered.

16. In a telephone system having first and second exchanges interconnected by a toll line, a trunk circuit in each of said exchanges terminating said line, an operator position in said second exchange, first and second paths connected to said first exchange trunk circuit over which connections are extended thereto, an individual contol conductor for said first path, an individual control conductor for said second path, first means in said first exchange trunk circuit connected to said first path control conductor operated responsive to a connection extended thereover to said first exchange trunk circuit for controlling said second exchange trunk circuit over said line to complete a connection from said first path to said operator position and for thereafter transmitting a signal over said connection identifying said first path, and second means in said first exchange trunk circuit connected to said second path control conductor and operated responsive to a connection extended thereover to said first exchange trunk circuit for controlling said second exchange trunk circuit over said line to complete a connection from said second path to said operator position and for thereafter transmitting a signal over said connection identifying said second path.

17. In a telephone system having first and second exchanges interconnected by a toll line, a trunk circuit in each of said exchanges terminating said line, an operator position in said second exchange, first and second paths connected to said first exchange trunk circuit over which connections are extended thereto, an individual control conductor for said first path, an individual control conductor for said second path, first means in said first exchange trunk circuit connected to said first path control conductor operated responsive to a connection extended to said first exchange trunk circuit over said first path, means controlled in response to the operation of said first means for marking said second path busy and for controlling said second exchange trunk circuit over said line to complete a connection from said first path to said operator position via said first exchange trunk circuit and said line and said second exchange trunk circuit, means in said first exchange trunk circuit operated in response to answering said connection at said operator position for transmitting a signal to said operator position indicating that said connection extended thereto originated over said first path, second means in said first exchange trunk circuit connected to said second path control conductor operated responsive to a connection extended to said first exchange trunk circuit over said second path, means controlled responsive to the operation of said second means for marking said first path busy and for controlling said second exchange trunk circuit over said line to complete a connection from said second path to said operator position via said first exchange trunk circuit and said line and said second exchange trunk circuit, and means in said first exchange trunk circuit operated responsive to answering said last mentioned connection at said operator position for transmitting a signal to said operator position indicating that said last mentioned connection extended thereto originated over said second path.

18. In a telephone system having first and second exchanges interconnected by a toll line, a trunk circuit in each of said exchanges terminating said line, an operator position in said second exchange, first and second paths connected to said first exchange trunk circuit over which connections are extended thereto, an individual control conductor for said first path, an individual control conductor for said second path, first means in said first exchange trunk circuit connected to said first path control conductor operated responsive to a connection extended to said first exchange trunk circuit over said first path, means controlled in response to the operation of said first means for marking said second path busy and for controlling said second exchange trunk circuit over said line to complete a connection from said first path to said operator position via said first exchange trunk circuit and said line and said second exchange trunk circuit, means in said first exchange trunk circuit operated in response to answering said connection at said operator position for transmitting a signal to said operator position indicating that said connection extended thereto originated over said first path, second means in said first exchange trunk circuit connected to said second path control conductor operated responsive to a connection extended to said first exchange trunk circuit over said second path, means controlled responsive to the operation of said second means for marking said first path busy and for controlling said second exchange trunk circuit over said line to complete a connection from said second path to said operator position via said first exchange trunk circuit and said line and said second exchange trunk circuit, means in said first exchange trunk circuit operated responsive to answering said last mentioned connection at said operator position for transmitting a signal to said operator position indicating that said last mentioned connection extended thereto originated over said second path, and means in said first exchange trunk circuit selectively controllable from said operator position for controlling said first exchange trunk circuit to repeat the transmission of the said signal indicative of the particular path over which the connection extended to said position originated.

19. In a telephone system having first and second exchanges interconnected by a toll line, a trunk circuit in each of said exchanges terminating said line, an operator position in said second exchange, first and second paths connected to said first exchange trunk circuit over which connections are extended thereto, an individual control conductor for said first path, an individual control conductor for said second path, first means in said first exchange trunk circuit connected to said first path control conductor operated responsive to a connection extended to said first exchange trunk circuit over said first path, means controlled in response to the operation of said first means for marking said second path busy and for controlling said second exchange trunk circuit over said line to complete a connection from said first path to said operator position via said first exchange trunk circuit and said line and said second exchange trunk circuit, means in said first exchange trunk circuit operated in response to answering said connection at said operator position for transmitting a signal to said operator position indicating that said connection extended thereto originated over said first path, second means in said first exchange trunk circuit connected to said second path control conductor operated responsive to a connection extended to said first exchange trunk circuit over said second path, means controlled responsive to the operation of said second means for marking said first path busy and for controlling said second exchange trunk circuit over said line to complete a connection from said second path to said operator position via said first exchange trunk circuit and said line and said second exchange trunk circuit, means in said first exchange trunk circuit operated responsive to answering said last mentioned connection at said operator position for transmitting a signal to said operator position indicating that said last mentioned connection extended thereto originated over said second path, a check relay in said second exchange trunk circuit selectively operated from said operator position, means controlled in response to said operation of said check relay for transmitting a repeat signal over said line to said first exchange trunk circuit, and means in said first exchange trunk circuit selectively operated in response to said repeat signal for controlling said signal transmitting means to repeat the transmission of the said signal indicative of the path over which the connection originated to said operator position.

20. In a telephone system having first and second exchanges interconnected by a toll line, a trunk circuit in each of said exchanges terminating said line, an operator position having a plurality of associated links in said second exchange, a distributor at said position, a non-numerical switch individual to said second exchange trunk circuit and having access to each of said links, first and second paths over which connections are extended to said first exchange trunk circuit, an individual control conductor for said first path, an individual control conductor for said second path, first means in said first exchange trunk circuit connected to said first path control conductor operated responsive to a connection extended over said first path for transmitting a seizure control over said toll line to said second exchange trunk circuit, second means in said first exchange trunk circuit connected to said second path control conductor operated responsive to a connection extended over said second path for transmitting said seizure control over said toll line to said second exchange trunk circuit, means in said second exchange trunk circuit selectively operated responsive to said seizure control for operating said distributor to connect with said second exchange trunk circuit, means controlled in response to said distributor connecting with said second exchange trunk circuit for controlling said non-numerical switch to complete a connection from either said first path or said second path to a link at said position, means in said second exchange trunk circuit operated responsive to answering a connection at said operator position for transmitting an answer signal over said toll line to said first exchange trunk circuit, and means in said first exchange trunk circuit operated responsive to said answer signal for transmitting a first tone signal or a second tone signal over said toll line to said operator position depending upon whether the connection extended to said position originated on said first path or on said second path.

21. In a telephone system having first and second exchanges interconnected by a toll line, a trunk circuit in each of said exchanges terminating said line, an operator position having a plurality of associated links in said second exchange, a distributor at said position, a non-numerical switch individual to said second exchange trunk circuit and having access to each of said links, first and second paths over which connections are extended to said first exchange trunk circuit, an individual control conductor for said first path, an individual control conductor for said second path, first means in said first exchange trunk circuit connected to said first path control conductor operated responsive to a connection extended over said first path for transmitting a seizure control over said toll line to said second exchange trunk circuit, second means in said first exchange trunk circuit connected to said second path control conductor operated responsive to a connection extended over said second path for transmitting said seizure control over said toll line to said second exchange trunk circuit, means in said second exchange trunk circuit selectively operated responsive to said seizure control for operating said distributor to connect with said second exchange trunk circuit, means controlled in response to said distributor connecting with said second exchange trunk circuit for controlling said non-numerical switch to complete a connection from either said first path or said second path to a link at said position, means in said second exchange trunk circuit operated responsive to answering a connection at said operator position for transmitting an answer signal over said toll line to said first exchange trunk circuit, means in said first exchange trunk circuit operated responsive to said answer signal for transmitting a first tone signal or a second tone signal over said toll line to said operator position depending upon whether the connection extended to said position originated on said first path or on said second path, a check relay in said second exchange trunk circuit selectively operable from said operator position, means controlled responsive to operation of said tone check relay for transmitting a control signal to said first exchange trunk circuit, and means in said first exchange trunk circuit selectively operated in response to said control signal for controlling said signal transmitting means to retransmit said first tone signal or said second tone signal to said operator position.

22. In a telephone system, a first exchange, a plurality of groups of trunk circuits in said first exchange, each of said groups corresponding to a different class, a non-numerical switch individual to each of said trunk circuits, a distributor for each of said groups, an operator position at said first exchange, a link at said position including a pair of talking conductors and a supervisory conductor accessible to each of said non-numerical switches, a plurality of control conductors in said link corresponding respectively to said plurality of groups of trunks and respectively accessible only to the non-numerical switches individual to the trunk circuits in the corresponding groups, means controlled responsive to the extension of a call to a trunk circuit in any one of said groups for controlling the corresponding group distributor to connect with said calling trunk circuit and for controlling the non-numerical switch individual thereto to connect said calling trunk circuit to said link over said talking conductors and said supervisory conductor and the control conductor corresponding to the particular group including said calling trunk circuit in order to indicate to the operator at said position the class of the particular trunk group including said calling trunk, a second exchange, an outgoing trunk circuit in said first exchange over which calls are completed to said second exchange, means at said operator position for answering said call and for completing the same over said outgoing trunk circuit to said second exchange, transfer means in said first exchange selectively operated to render said link at said position inaccessible to said non-numerical switches and for rendering said outgoing trunk circuit directly accessible thereto, said outgoing trunk circuit including a pair of talking conductors, a supervisory conductor, and a plurality of control conductors corresponding respectively to the different classes of said plurality of groups of trunks, means controlled responsive to the extension of a call to a trunk circuit in any of said groups after said transfer means is operated for controlling the corresponding group distributor to connect with said calling trunk circuit and for controlling the non-numerical switch individual thereto to connect said calling trunk circuit to said outgoing trunk circuit via said talking conductors and said supervisory conductor and the one of said control conductors corresponding to the class of the trunk group including said calling trunk circuit, and means in said outgoing trunk circuit controlled over the particular control conductor for automatically completing said call to a predetermined called destination in said second exchange and for transmitting a particular signal thereto identifying the class of the particular trunk group including said calling trunk circuit.

23. In a telephone system, an incoming trunk circuit, an operator position, a signal at said position, means in said incoming trunk circuit controlled responsive to an incoming call for controlling said signal, means in said position for answering said call and for controlling said incoming trunk circuit to terminate said signal, a transfer device, means operating said transfer device whenever said position is unattended, an outgoing trunk circuit, and incoming trunk circuit finder, an outgoing trunk circuit finder, means in said incoming trunk circuit finder operated by said incoming trunk circuit signal control means in the event said transfer device is in its operated position for controlling said incoming trunk circuit finder to find and connect with said calling incoming trunk circuit, and means controlled responsive to said connection for operating said outgoing trunk finder to find and connect with said outgoing trunk circuit in order automatically to route the call on said incoming trunk circuit via said incoming and outgoing trunk finders to said outgoing trunk.

24. In a telephone system, a first exchange, a first trunk circuit in said exchange, an operator position, switching apparatus in said first exchange for extending a connection to said first trunk circuit, means in said first trunk circuit controlled responsive to said connection for transmitting a signal to the operator at said position, means at said position for answering said connection, means in said first trunk circuit controlled responsive to answering said connection for terminating transmission of said signal, a transfer device, means operating said transfer device whenever said position is unattended, a second exchange, an operator position at said second exchange, outgoing trunk circuits in said first exchange, means in said first exchange rendered effective responsive to said operation of said transfer device and controlled by said first trunk circuit signal means responsive to a connection extended thereto for connecting said first trunk circuit with an idle one of said outgoing trunk circuits, and means in said one outgoing trunk circuit controlled responsive to said connection for transmitting a signal to said second exchange operator position, whereby a connection extended to said first incoming trunk circuit during the time said transfer device is in its operated position is automatically routed over an idle outgoing trunk circuit in said first exchange to said second exchange operator position to be answered.

25. In a telephone system, a first exchange, a first trunk circuit in said exchange, an operator position, switching apparatus in said first exchange for extending a connection to said first trunk circuit, means in said first trunk circuit controlled responsive to said connection for transmitting a signal to the operator at said position, means at said position for answering said connection, means in said first trunk circuit controlled responsive to answering said connection for terminating transmission of said signal, a transfer device, means operating said transfer device whenever said position is unattended, a second exchange, an operator position at said second exchange, outgoing trunk circuits in said first exchange, means in said first exchange rendered effective responsive to said operation of said transfer device and controlled by said first trunk circuit signal means responsive to a connection extended thereto for connecting said first trunk circuit with an idle one of said outgoing trunk circuits, means in said one outgoing trunk circuit controlled responsive to said connection for transmitting a signal to said second exchange operator position, whereby a connection extended to said first incoming trunk circuit during the time said transfer device is in its operated position is automatically routed over an idle outgoing trunk circuit in said first exchange to said second exchange operator position to be answered, and means in said outgoing trunk circuit controlled responsive to answering said connection at said second exchange operator position for controlling said first trunk circuit signal terminating means.

26. In a telephone system, a first exchange, a first trunk circuit in said exchange, an operator position, switching apparatus in said first exchange for extending a connection to said first trunk circuit, means in said first trunk circuit controlled responsive to said connection for transmitting a signal to the operator at said position, means at said position for answering said connection, means in said first trunk circuit controlled responsive to answering said connection for terminating transmission of said signal, a transfer device, means operating said transfer device whenever said position is unattended, a second exchange, an operator position at said second exchange, outgoing trunk circuits in said first exchange, means in said first exchange rendered effective responsive to said operation of said transfer device and controlled by said first trunk circuit signal means responsive to a connection extended thereto for connecting said first trunk circuit with an idle one of said outgoing trunk circuits, means in said one outgoing trunk circuit controlled responsive to said connection for transmitting a signal to said second exchange operator position, whereby a connection extended to said first incoming trunk circuit during the time said transfer device is in its operated position is automatically routed over an idle outgoing trunk circuit in said first exchange to said second exchange operator position to be answered, means in said outgoing trunk circuit controlled responsive to answering said connection at said second exchange operator position for controlling said first trunk circuit signal terminating means, and means in said first trunk circuit controlled both from the calling end and from the answering end of said connection for holding said first trunk circuit until both ends of the connection are released.

27. In a telephone system having first and second exchanges, a plurality of outgoing trunk circuits in said first exchange connected via two-conductor toll lines to said second exchange, a plurality of incoming trunk circuits in said first exchange, each of said incoming trunk circuits including a non-numerical switch having access to said outgoing trunk circuits, a gate control network in said first exchange, means in said gate control network operated responsive to one or more calls received on said incoming trunk circuits for locking in said incoming trunk circuits having calls waiting thereon to be answered and for locking out subsequent calls received thereon until all of the locked-in calls have been disposed of, means controlled in response to said operation of said gate control network for controlling the non-numerical switches of only said locked-in incoming trunk circuits to find and connect with available ones of said outgoing trunk circuits, an operator position in said second exchange, and means in said first exchange trunk circuits controlled responsive to said connection for completing each of said connections to said second exchange operator position.

28. In a telephone system having first and second exchanges, a plurality of incoming trunk circuits in said first exchange divided into a local group and a toll group, a non-numerical switch associated with each of said incoming trunk circuits, a plurality of outgoing trunks in said first exchange accessible to all of said non-numerical switches and connected via associated toll lines to said second exchange, an operator position in said second exchange, a gate control network in said first exchange, means in said gate control network operated responsive to simultaneous calls received on incoming trunk circuits in said local group and said toll group for locking in the said incoming trunk circuits having calls waiting thereon and for locking out the remaining incoming trunk circuits in said groups until all waiting locked-in calls in said groups have been answered, first control means in said gate control network for first controlling the non-numerical switches associated with only said locked-in incoming trunk circuits in said toll group to find and connect with available ones of said outgoing trunk circuits in order further to extend said waiting calls on said locked-in incoming trunk circuits in said toll group to said second exchange operator position to be answered, additional control means in said gate control network rendered effective after all of said locked-in calls on said incoming trunk circuit in said toll group have been connected to said outgoing trunk circuits for thereafter controlling the non-numerical switches associated with only said locked-in incoming trunk circuits in said local group to find and connect with available ones of said outgoing trunk circuits in order further to extend said waiting calls on said locked-in incoming trunk circuits in said local group to said second exchange operator position to be answered.

29. In a telephone system, a first exchange, a plurality of groups of trunk circuits in said first exchange, each of said groups corresponding to a different class, a non-numerical switch individual to each of said trunk circuits, a distributor for each of said groups, a second exchange, an outgoing trunk circuit in said first exchange over which calls are completed to said second exchange, said outgoing trunk circuit including a pair of talking conductors, a supervisory conductor, and a plurality of control conductors corresponding respectively to the different classes of said plurality of group of trunks, means controlled responsive to the extension of a call to a trunk circuit in any of said groups for controlling the corresponding group distributor to connect with said calling trunk circuit and for controlling the non-numerical switch individual thereto to connect said calling trunk circuit to said outgoing trunk circuit via said talking conductors and said supervisory conductor and the one of said control conductors corresponding to the class of the trunk group including said calling trunk circuit, and means in said outgoing trunk circuit controlled over the particular control conductor for automatically completing said call to a predetermined called destination in said second exchange and for transmitting a particular signal thereto identifying the class of the particular trunk group including said calling trunk.

30. In a telephone system, a first exchange, a plurality of groups of trunk circuits in said first exchange, each of said groups corresponding to a different class, a non-numerical switch individual to each of said trunk circuits, a distributor for each of said groups, a second exchange, an outgoing trunk circuit in said first exchange over which calls are completed to said second exchange, said outgoing trunk circuit including a pair of talking conductors, a supervisory conductor, and a plurality of control conductors corresponding respectively to the different classes of said plurality of group of trunks, an allotter in said first exchange, means in said allotter controlled responsive to the extension of a call to a trunk circuit in any of said groups for controlling the corresponding group distributor to connect with said calling trunk circuit and for controlling the non-numerical switch individual thereto to connect said calling trunk circuit to said outgoing trunk circuit via said talking conductors and said supervisory conductor and the one of said control conductors corresponding to the class of the trunk group including said calling trunk circuit, and means in said outgoing trunk circuit controlled over the particular control conductor for automatically completing said call to a predetermined called destination in said second exchange and for transmitting a particular signal thereto identifying the class of the particular trunk group including said calling trunk.

31. In a telephone system having first and second exchanges interconnected by two-conductor toll lines, a two-way trunk circuit in each of said exchanges terminating said lines, an operator position at each of said exchanges, links at each of said positions, trunk circuits of different classes in said first exchange each having a stepping switch, means in said first exchange controlled responsive to the extension of calls to said trunk circuits for controlling the associated stepping switches to extend said calls to said first exchange operator position via links thereat to be answered and for indicating to the operator thereat the different classes of calls extended to said position, means at said first exchange operator position for selecting said two-way trunk circuits to further extend said calls to said second exchange, switching apparatus in said second exchange, said last mentioned means thereafter controlling said second exchange switching apparatus to complete said calls to desired called subscribers, means selectively controlled by the operator at said first exchange operator position for preventing said stepping switches from extending calls received on any of said trunk circuits to said first exchange operator position via any of the links thereat and for connecting said first exchange two-way trunk circuits to said stepping switches, a gate control circuit, means controlled by said gate control circuit responsive to the extension of subsequent calls of different classes to said trunk circuits for controlling the associated stepping switches of the different classes of trunk circuits in a predetermined order to select said two-way trunk circuits in said first exchange, and means in said first exchange two-way trunk circuits operated responsive to selection thereof via said stepping switches for controlling the associated second exchange two-way trunk circuit to automatically route said subsequent calls to said second exchange operator position via links thereat to be answered and for indicating to the operator thereat the different classes of said subsequent calls extended to said position.

32. In a telephone system, a first exchange, a second exchange, a toll line interconnecting said exchanges, a trunk circuit in each of said exchanges terminating said toll line, an operator position in said second exchange, an incoming trunk in said first exchange, means associated with said incoming trunk circuit operated responsive to an incoming call intended for a called subscriber in said first exchange for automatically controlling said first exchange trunk circuit to extend said incoming call over said toll line and said second exchange trunk circuit to said operator position, means in said second exchange trunk circuit controlled from said operator position in response to answering said call for controlling said first exchange trunk circuit to hold said incoming call and for completing a talking connection therewith, means in said second exchange trunk circuit thereafter controlled from said operator position for transmitting a dial-back signal to said first exchange trunk circuit, switching apparatus in said first exchange, means in said first exchange trunk circuit selectively controlled by said dial-back signal for seizing said switching apparatus, and means also controlled from said operator position for controlling respectively said second exchange and said first exchange trunk circuits to selectively operate said switching apparatus to complete a talking connection between said incoming trunk and said called subscriber in said first exchange and said second exchange operator position.

33. In a telephone system having first and second exchanges interconnected by a toll line, a trunk circuit in each of said exchanges terminating said line, an operator position having a plurality of associated links in said second exchange, a distributor at said position, a non-numerical switch individual to said second exchange trunk circuit and having access to each of said links, first and second paths over which connections are extended to said first exchange trunk circuit, an individual control conductor for said first path, an individual control conductor for said second path, first means in said first exchange trunk circuit connected to said first path control conductor operated responsive to a connection extended over said first path for transmitting a seizure control over said toll line to said second exchange trunk circuit, second means in said first exchange trunk circuit connected to said second path control conductor operated responsive to a connection extended over said second path for transmitting said seizure control over said toll line to said second exchange trunk circuit, means in said second exchange trunk circuit selectively operated responsive to said seizure control for operating said distributor to connect with said second exchange trunk circuit, means controlled in response to said distributor connecting with said second exchange trunk circuit for controlling said non-numerical switch to complete a connection from either said first path or said second path to a link at said position, means in said second exchange trunk circuit operated responsive to answering a connection at said operator position for transmitting an answer signal over said toll line to said first exchange trunk circuit, means in said first exchange trunk circuit operated responsive to said answer signal for transmitting a first tone signal or a second tone signal over said toll line to said operator position depending upon whether the connection extended to said position originated on said first path or on said second path, a check relay in said second exchange trunk circuit selectively operated one or more times from said operator position to transmit one or more control signals over said toll line to said first exchange trunk circuit, control means in said first exchange trunk circuit selectively operated each time said control signal is transmitted, means controlled in response to a first operation of said control means for controlling said signal transmitting means to retransmit said first tone signal or said second tone signal to said operator position, an automatic switch connected to said first exchange trunk circuit, and means controlled responsive to a second operation of said control means for seizing said automatic switch.

34. In a telephone system having first and second exchanges interconnected by a toll line, a trunk circuit in each of said exchanges terminating said line, an operator position having a plurality of associated links in said second exchange, a distributor at said position, a non-numerical switch individual to said second exchange trunk circuit and having access to each of said links, first and second paths over which connections are extended to said first exchange trunk circuit, an individual control conductor for said first path, an individual control conductor for said second path, first means in said first exchange trunk circuit connected to said first path control conductor operated responsive to a connection extended over said first path for transmitting a seizure control over said toll line to said second exchange trunk circuit, second means in said first exchange trunk circuit connected to said second path control conductor operated responsive to a connection extended over said second path for transmitting said seizure control over said toll line to said second exchange trunk circuit, means in said second exchange trunk circuit selectively operated responsive to said seizure control for operating said distributor to connect with said second exchange trunk circuit, means controlled in response to said distributor connecting with said second exchange trunk circuit for controlling said non-numerical switch to complete a connection from either said first path or said second path to a link at said position, means in said second exchange trunk circuit operated responsive to answering a connection at said operator position for transmitting an answer signal over said toll line to said first exchange trunk circuit, means in said first exchange trunk circuit operated responsive to said answer signal for transmitting a first tone signal or a second tone signal over said toll line to said operator position depending upon whether the connection extended to said position originated on said first path or on said second path, a check relay in said second exchange trunk circuit selectively operated one or more times from said operator position to transmit one or more control signals over said toll line to said first exchange trunk circuit, control means in said first exchange trunk circuit selectively operated each time said control signal is transmitted, means controlled in response to a first operation of said control means for controlling said signal transmitting means to retransmit said first tone signal or said second tone signal to said operator position, an automatic switch connected to said first exchange trunk circuit, means controlled responsive to a second operation of said control means for seizing said automatic switch, and means thereafter controlled from said operator position for controlling said automatic switch to complete a three-way connection at said first exchange trunk circuit including said first path or said second path and said operator position and said automatic switch.

35. In a telephone system, a first exchange, a second exchange, a first exchange two-way trunk circuit, a second exchange two-way trunk circuit, a two-conductor line interconnecting said two-way trunks, a dial conductor in each of said trunk circuits connected to said two conductor line, a pulse-in relay in each of said trunk circuits normally connected to said dial conductor thereat, a dial control relay in each of said trunk circuits normally disconnected from said dial conductor thereat, an outgoing seizure relay and a pulse-out relay in each of said trunk circuits, an incoming line and an outgoing line, each of said lines comprising a pair of line conductors and a control conductor and an extra control conductor terminating in each of said trunk circuits, means for seizing one of said trunk circuits over its outgoing line in order to operate the associated outgoing seizure and pulse-out relays over the respective control and extra control conductors, means controlled by said operated relays for transferring the dial conductor in said one trunk circuit from the associated pulse-in relay to the associated dial control relay in order to operate said dial control relay thereat in series with the pulse-in relay in the other of said trunk circuits, means controlled responsive to the operation of said pulse-in relay in said other trunk circuit for preventing the same from being seized over its associated outgoing trunk line and for seizing its associated incoming trunk line over its control and extra control conductors, means for thereafter transmitting impulses to said one trunk circuit over the extra control conductor of its outgoing trunk line in order to control said pulse-out relay thereat to repeat said impulses to said other trunk circuit pulse-in relay by interrupting said series circuit including said dial control relay in said one trunk circuit and said pulse-in relay in said other trunk circuit, and means controlled by said last mentioned pulse-in relay for repeating said impulses over the extra control conductor of the said seized incoming trunk line, whereby connections are completed in either direction over said two-way trunk circuits and the interconnecting two-conductor line from the incoming line in one of said exchanges to the outgoing trunk line in the other of said exchanges.

36. In a telephone system, a first exchange, a second exchange, a first exchange two-way trunk circuit, a second exchange two-way trunk circuit, a two-conductor line interconnecting said two-way trunks, a dial conductor in each of said trunk circuits connected to said two conductor line, a pulse-in relay in each of said trunk circuits normally connected to said dial conductor thereat, a dial control relay in each of said trunk circuits normally disconnected from said dial conductor thereat, an outgoing seizure relay and a pulse-out relay in each of said trunk circuits, an incoming line and an outgoing line, each of said lines comprising a pair of line conductors and a control conductor and an extra control conductor terminating in each of said trunk circuits, means for seizing one of said trunk circuits over its outgoing line in order to operate the associated outgoing seizure and pulse-out relays over the respective control and extra control conductors, means controlled by said operated relays for transferring the dial conductor in said one trunk circuit from the associated pulse-in relay to the associated dial control relay in order to operate said dial control relay thereat in series with the pulse-in relay in the other of said trunk circuits, means controlled responsive to the operation of said pulse-in relay in said other trunk circuit for preventing the same from being seized over its associated outgoing trunk line and for seizing its associated incoming trunk line over its control and extra control conductors, means for thereafter transmitting impulses to said one trunk circuit over the extra control conductor of its outgoing trunk line in order to control said pulse-out relay thereat to repeat said impulses to said other trunk circuit pulse-in relay by interrupting said series circuit including said dial control relay in said one trunk circuit and said pulse-in relay in said other trunk circuit, means controlled by said last mentioned pulse-in relay for repeating said impulses over the extra control conductor of the said seized incoming trunk line, whereby connections are completed in either direction over said two-way trunk circuits and the interconnecting two-conductor line from the incoming trunk line in one of said exchanges to the outgoing trunk line in the other of said exchanges, an additional outgoing trunk line in said first exchange, an additional incoming trunk line in said second exchange, each of said additional trunk lines comprising a pair of line conductors and a control conductor and an extra control conductor, a control relay normally connected to said extra control conductor of said additional outgoing trunk line, means for seizing said first exchange two-way trunk circuit over said additional outgoing trunk line in order to operate said control relay, a source of booster battery potential, means controlled responsive to the operation of said control relay for disconnecting said dial control relay in said first exchange two-way trunk circuit from said dial conductor and for connecting said dial conductor to said source of booster battery potential, means in said second exchange two-way trunk circuit connected to said dial conductor thereat in series with said pulse-in relay thereat operated responsive to said booster battery potential applied to said dial conductor, and means controlled in response to the operation of said last mentioned means for completing a connection from said additional outgoing trunk line in said first exchange to said additional incoming trunk line in said second exchange via said first and second exchange two-way trunk circuits and interconnecting two-conductor line.

HARVEY W. BALZER.

No references cited.